(12) United States Patent
Chang et al.

(10) Patent No.: US 10,228,539 B2
(45) Date of Patent: *Mar. 12, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Yao-Wei Liu, Taichung (TW); Nai-Yuan Tang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,241

(22) Filed: Jul. 6, 2017

(65) Prior Publication Data

US 2018/0188494 A1    Jul. 5, 2018

(30) Foreign Application Priority Data

Jan. 5, 2017   (TW) .............................. 106100339 A

(51) Int. Cl.
*G02B 3/02*     (2006.01)
*G02B 13/00*    (2006.01)
*G02B 9/62*     (2006.01)

(52) U.S. Cl.
CPC ........... *G02B 13/0045* (2013.01); *G02B 9/62* (2013.01)

(58) Field of Classification Search
CPC .................................................. G02B 13/0045
USPC ........................................................ 359/713
See application file for complete search history.

(56) References Cited

U.S. PATENT DOCUMENTS

2017/0108668 A1*  4/2017  Sekine ............... G02B 13/0045

FOREIGN PATENT DOCUMENTS

TW            201641978 A    12/2016

* cited by examiner

*Primary Examiner* — James Jones
(74) *Attorney, Agent, or Firm* — Muncy, Geissler, Olds & Lowe, P.C.

(57) ABSTRACT

The invention discloses a six-piece optical lens for capturing image and a six-piece optical module for capturing image. In order from an object-side surface to an image-side surface, the optical lens along the optical axis comprises a first lens with refractive power; a second lens with refractive power; a third lens with refractive power; a fourth lens with refractive power; a fifth lens with refractive power; a sixth lens with refractive power; and at least one of the image-side surface and object-side surface of each of the six lens elements is aspheric. The optical lens can increase aperture value and improve the imagining quality for use in compact cameras.

25 Claims, 24 Drawing Sheets

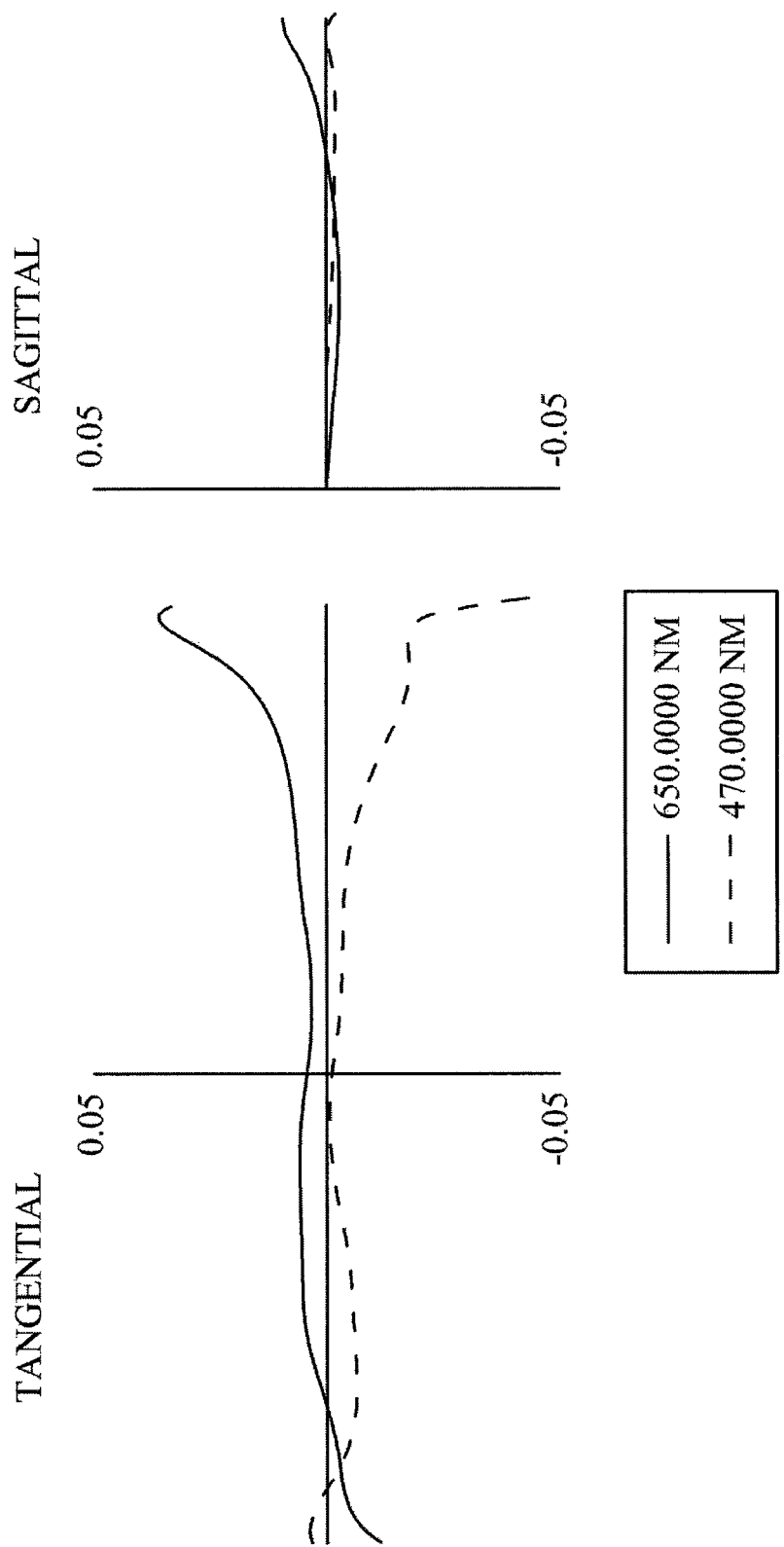

OPTICAL IMAGE CAPTURING SYSTEM

CROSS-REFERENCE TO RELATED APPLICATION

This application claims priority from Taiwan Patent Application No. 106100339, filed on Jan. 5, 2017, in the Taiwan Intellectual Property Office, the disclosure of which is hereby incorporated by reference in its entirety for all purposes.

BACKGROUND OF THE INVENTION

1. Field of the Invention

The present invention relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical system. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel field by degrees. Therefore, it increases daily the demand of the quality of the image.

Conventional optical systems of portable electronic devices usually adopt four lenses or five lenses structure as main structure. However, since the pixel of the portable electronic devices continuously raises, and more end-users are demanding for cameras having large aperture, which is equipped with functionalities such as low light mode or night mode. The conventional optical image capturing systems may not be satisfied to meet those advanced photography requirements.

Therefore, it is an important issue about how to effectively increase the amount of light admitted into the optical image capturing system and further elevate the image quality thereof.

SUMMARY OF THE INVENTION

The aspect of embodiment of the present invention directs to an optical image capturing system and an optical image capturing lens which use combination of refractive powers, convex surfaces and concave surfaces of six lenses (the convex surface or concave surface in the present invention is the description of the change of geometrical shape of an object-side surface or an image-side surface of each lens at different heights from an optical axis in principle) to further increase the amount of light admitted into the optical image capturing system, and to improve quality of image formation, so as to be applied to minimized electronic products.

The terms and their definition for the lens parameters in the embodiment of the present invention are shown as below for further reference.

The Lens Parameter Related to the Length or the Height

The maximum height of an image of the optical image capturing system is expressed as HOI. The height of the optical image capturing system is expressed as HOS. The distance from the object-side surface of the first lens of the optical image capturing system to the image-side surface of the sixth lens of the optical image capturing system is expressed as InTL. The distance from a fixed aperture (stop) of the optical image capturing system to the image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); a refractive index of the first lens is expressed as Nd1 (example).

The Lens Parameter Related to View Angle

A view angle is expressed as AF. Half of the view angle is expressed as HAF. An angle of a chief ray is expressed as MRA.

The Lens Parameter Related to the Exit/Entrance Pupil

An entrance pupil diameter of the optical image capturing system is expressed as HEP. The maximum effective half diameter (EHD) of any surface of a single lens refers to a perpendicular height between the optical axis and an intersection point, where the incident ray at the maximum view angle passing through the most marginal entrance pupil intersects with the surface of the lens. For example, the maximum effective half diameter of the object-side surface of the first lens is expressed as EHD11. The maximum effective half diameter of the image-side surface of the first lens is expressed as EHD 12. The maximum effective half diameter of the object-side surface of the second lens is expressed as EHD21. The maximum effective half diameter of the image-side surface of the second lens is expressed as EHD22. The maximum effective half diameters of any surfaces of other lens in the optical image capturing system are expressed in the similar way.

The Lens Parameter Related to the Arc Length of the Lens Shape and the Outline of Surface of the Lens The outline curve length of the maximum effective half diameter of any surface of single lens refers to an arc length of a curve, which starts from an intersection point as an initial point where the surface of the lens intersects the optical axis of the optical image capturing system, travels along the surface outline of the lens, and ends at the point which defines the maximum effective half diameter; the arc length between the aforementioned two points is the outline curve length of the maximum effective half diameter, and denoted as ARS. For example, the length of the maximum effective half diameter outline curve of the object-side surface of the first lens is denoted as ARS11. The length of the maximum effective half diameter outline curve of the image-side surface of the first lens is denoted as ARS12. The length of the maximum effective half diameter outline curve of the object-side surface of the second lens is denoted as ARS21. The length of the maximum effective half diameter outline curve of the image-side surface of the second lens is denoted as ARS22. The outline curve lengths of the maximum effective half diameter of any surface of the other lenses in the optical image capturing system are denoted according to the regular pattern shown above.

The outline curve length of ½ entrance pupil diameter (HEP) of any surface of single lens refers to an arc length of curve, which starts from an intersection point as an initial point where the surface of the lens intersects the optical axis of the optical image capturing system, travels along the surface outline of the lens, and ends at a coordinate point on the surface where the vertical height from the optical axis to the coordinate point is equivalent to ½ entrance pupil diameter; the arc length between the aforementioned two points is the outline curve length of the ½ entrance pupil diameter (HEP), and denoted as ARE. For example, the outline curve length of the ½ entrance pupil diameter (HEP) of the object-side surface of the first lens is denoted as ARE11. The outline curve length of the ½ entrance pupil diameter (HEP) of the image-side surface of the first lens is denoted as ARE12. The outline curve length of the ½ entrance pupil diameter (HEP) of the object-side surface of the second lens is denoted as ARE21. The outline curve length of the ½ entrance pupil diameter (HEP) of the image-side surface of the second lens is denoted as ARS22. The outline curve lengths of the ½ entrance pupil diameter (HEP) of any surface of the other lenses in the optical image capturing system are denoted according to the regular pattern shown above.

The Lens Parameter Related to the Surface Depth of the Lens

The distance paralleling an optical axis, which is measured from the intersection point where the object-side surface of the sixth lens crosses the optical axis to the terminal point of the maximum effective half diameter of the object-side surface of the sixth lens is expressed as InRS61 (depth of the EHD). The distance paralleling an optical axis, which is measured from the intersection point where the image-side surface of the sixth lens crosses the optical axis to the terminal point of the maximum effective half diameter of the image-side surface of the sixth lens is expressed as InRS62 (depth of the EHD). The depths of the EHD (sinkage values) on the object-side surface or the image-side surface of other lens are expressed in similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, for example, the perpendicular distance between the critical point C51 on the object-side surface of the fifth lens and the optical axis is HVT51 (example). The perpendicular distance between a critical point C52 on the image-side surface of the fifth lens and the optical axis is HVT52 (example). The perpendicular distance between the critical point C61 on the object-side surface of the sixth lens and the optical axis is HVT61 (example). The perpendicular distance between a critical point C62 on the image-side surface of the sixth lens and the optical axis is HVT62 (example). The perpendicular distances between the critical point on the image-side surface or object-side surface of other lens and the optical axis are expressed in similar way.

The inflection point on the object-side surface of the sixth lens that is nearest to the optical axis is expressed as IF611, and the sinkage value of that inflection point IF611 is expressed as SGI611 (example). That is, the sinkage value SGI611 is a horizontal displacement distance paralleling the optical axis, which is measured from the intersection point crossing the optical axis on the object-side surface of the sixth lens to the inflection point nearest to the optical axis on the object-side surface of the sixth lens. The perpendicular distance between the inflection point IF611 and the optical axis is HIF611 (example). The inflection point on the image-side surface of the sixth lens that is nearest to the optical axis is expressed as IF621, and the sinkage value of the inflection point IF621 is expressed as SGI621 (example).

That is, the sinkage value SGI621 is a horizontal displacement distance paralleling the optical axis, which is measured from the intersection point crossing the optical axis on the image-side surface of the sixth lens to the inflection point nearest to the optical axis on the image-side surface of the sixth lens. The perpendicular distance between the inflection point IF621 and the optical axis is HIF621 (example).

The inflection point on object-side surface of the sixth lens that is second nearest to the optical axis is expressed as IF612, and the sinkage value of the inflection point IF612 is expressed as SGI612 (example). That is, the sinkage value SGI612 is a horizontal displacement distance paralleling the optical axis, which is measured from the intersection point crossing the optical axis on the object-side surface of the sixth lens to the inflection point second nearest to the optical axis on the object-side surface of the sixth lens. The perpendicular distance between the inflection point IF612 and the optical axis is HIF612 (example). The inflection point on image-side surface of the sixth lens that is second nearest to the optical axis is expressed as IF622, and the sinkage value of that inflection point IF622 is expressed as SGI622 (example). That is, the sinkage value SGI622 is a horizontal displacement distance paralleling the optical axis, which is measured from the intersection point crossing the optical axis on the image-side surface of the sixth lens to the inflection point second nearest to the optical axis on the image-side surface of the sixth lens. The perpendicular distance between the inflection point IF622 and the optical axis is HIF622 (example).

The inflection point on the object-side surface of the sixth lens that is third nearest to the optical axis is expressed as IF613, and the sinkage value of the inflection point IF613 is expressed as SGI613 (example). That is, the sinkage value SGI613 is a horizontal displacement distance paralleling the optical axis, which is measured from the intersection point crossing the optical axis on the object-side surface of the sixth lens to the inflection point third nearest to the optical axis on the object-side surface of the sixth lens. The perpendicular distance between the inflection point IF613 and the optical axis is HIF613 (example). The inflection point on image-side surface of the sixth lens that is third nearest to the optical axis is expressed as IF623, and the sinkage value of the inflection point IF623 is expressed as SGI623 (example). That is, the sinkage value SGI623 is a horizontal displacement distance paralleling the optical axis, which is measured from the intersection point crossing the optical axis on the image-side surface of the sixth lens to the inflection point third nearest to the optical axis on the image-side surface of the sixth lens. The perpendicular distance between the inflection point IF623 and the optical axis is HIF623 (example).

The inflection point on object-side surface of the sixth lens that is fourth nearest to the optical axis is expressed as IF614, and the sinkage value of the inflection point IF614 is expressed as SGI614 (example). That is, the sinkage value SGI614 is a horizontal displacement distance paralleling the optical axis, which is measured from the intersection point crossing the optical axis on the object-side surface of the sixth lens to the inflection point fourth nearest to the optical axis on the object-side surface of the sixth lens. The perpendicular distance between the inflection point IF614 and the optical axis is HIF614 (example). The inflection point on image-side surface of the sixth lens that is fourth nearest to the optical axis is expressed as IF624, and the sinkage value of the inflection point IF624 is expressed as SGI624 (example). That is, the sinkage value SGI624 is a horizontal displacement distance paralleling the optical axis, which is measured from the intersection point crossing the optical axis on the image-side surface of the sixth lens to the inflection point fourth nearest to the optical axis on the image-side surface of the sixth lens. The perpendicular distance between the inflection point IF624 and the optical axis is HIF624 (example).

The inflection points on the object-side surface or the image-side surface of the other lens and the perpendicular distances between them and the optical axis, or the sinkage values thereof are expressed in the similar way described above.

The Lens Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the formed image. The offset of the spherical aberration is expressed as DFS. The offset of the coma aberration is expressed as DFC.

The transverse aberration of the edge of the aperture is denoted as STOP Transverse Aberration (STA), which assesses the performance of specific optical image capturing system. The tangential fan or sagittal fan may be utilized to calculate the STA of any fields of view, and in particular, to calculate the STAs of the longest operation wavelength (e.g. 650 nm) and the shortest operation wavelength (e.g. 470 nm) respectively, which serve as the standard indicating the performance thereof. The coordinate directions of the aforementioned tangential fan may be further defined as the positive (upper-light) and negative (lower-light) directions. The STA of the longest operation wavelength is defined as the distance between the position of the image formed when the longest operation wavelength passing through the edge of the aperture strikes a specific field of view on the image plane and the position of the image formed via the primary light of the reference wavelength (e.g. 555 nm) on the specific field of view on the image plane. Whereas the STA of the shortest operation wavelength is defined as the distance between the position of the image formed when the shortest operation wavelength passing through the edge of the aperture strikes a specific field of view on the image plane and the position of the image formed via the primary light of the reference wavelength on the specific field of view on the image plane. The criteria for assessing whether an optical image capturing system has an excellent performance may be set as: both STAs of the incident longest operation wavelength and the incident shortest operation wavelength at 0.7 field of view on the image plane (i.e. 0.7 height of image (HOI)) must be less than 100 μm or, furthermore, even less than 80 μm.

The optical image capturing system has a maximum height of image HOI on the image plane perpendicular to the optical axis. A transverse aberration of the longest operation wavelength of visible light of a positive direction tangential fan of the optical image capturing system passing through an edge of the entrance pupil and incident at the position of 0.7 HOI on the image plane is denoted as PLTA. A transverse aberration of the shortest operation wavelength of visible light of the positive direction tangential fan of the optical image capturing system passing through the edge of the entrance pupil and incident at the position of 0.7 HOI on the image plane is denoted as PSTA. A transverse aberration of the longest operation wavelength of visible light of a negative direction tangential fan of the optical image capturing system passing through the edge of the entrance pupil and incident at the position of 0.7 HOI on the image plane is denoted as NLTA. A transverse aberration of the shortest operation wavelength of visible light of a negative direction tangential fan of the optical image capturing system passing through the edge of the entrance pupil and incident at the position of 0.7 HOI on the image plane is denoted as NSTA. A transverse aberration of the longest operation wavelength of visible light of a sagittal fan of the optical image capturing system passing through the edge of the entrance pupil and incident at the position of 0.7 HOI on the image plane is denoted as SLTA. A transverse aberration of the shortest operation wavelength of visible light of the sagittal fan of the optical image capturing system passing through the edge of the entrance pupil and incident at the position of 0.7 HOI on the image plane is denoted as SSTA.

The present invention provides the optical image capturing system. The object-side surface or the image-side surface of the sixth lens of the optical image capturing system may be provided with the inflection point which can adjust each angle of view striking the sixth lens and conduct amendment for the optical distortion and TV distortion. Besides, the surface of the sixth lens can be provided with the function of the preferable adjustment about the optical path so as to elevate the quality of the image.

An optical image capturing system is provided in accordance with the present invention. In the order from an object-side surface to an image-side surface, the optical image capturing system includes a first lens, a second lens, a third lens, a fourth lens, a fifth lens, a sixth lens and an image plane. The first lens has refractive power. Both the object-side surface and the image-side surface of the sixth lens are aspheric. The focal lengths of the six lenses are respectively f1, f2, f3, f4, f5 and f6. A focal length of the optical image capturing system is f. An entrance pupil diameter of the optical image capturing system is HEP. A distance on the optical axis from an object-side surface of the first lens to the image plane is HOS. A distance on the optical axis from the object-side surface of the first lens to an image-side surface of the sixth lens is InTL. An outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: $1.2 \le f/HEP \le 10.0$, $0 \le InTL/HOS \le 0.9$, and $0.9 \le 2(ARE/HEP) \le 1.5$.

Another optical image capturing system is further provided in accordance with the present invention. In the order from an object-side surface to an image-side surface, the optical image capturing system includes a first lens, a second lens, a third lens, a fourth lens, a fifth lens, a sixth lens and an image plane. The first lens has negative refractive power, and the object-side surface thereof near the optical axis may be a convex surface. The second lens has refractive power. The third lens has refractive power. The fourth lens has refractive power. The fifth lens has refractive power. The sixth lens has refractive power, and both the object-side surface and the image-side surface thereof are aspheric. The optical image capturing system has a maximum image height HOI perpendicular to the optical axis on the image plane. At least one lens among the first lens to the sixth lens is made of glasses. At least one lens among the second lens to the sixth lens has positive refractive power. The focal lengths of the six lenses are respectively f1, f2, f3, f4, f5 and f6. A focal length of the optical image capturing system is f. An entrance pupil diameter of the optical image capturing system is HEP. A distance on the optical axis from an object-side surface of the first lens to the image plane is HOS. A distance on the optical axis from the object-side surface of the first lens to an image-side surface of the sixth lens is InTL. An outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: $1.2 \leq f/HEP \leq 10.0$, $0 \leq InTL/HOS \leq 0.9$, and $0.9 \leq 2(ARE/HEP) \leq 1.5$.

Yet another optical image capturing system is further provided in accordance with the present invention. In the order from an object-side surface to an image-side surface, the optical image capturing system includes a first lens, a second lens, a third lens, a fourth lens, a fifth lens, a sixth lens and an image plane. Wherein, the optical image capturing system has six lenses with refractive power. The optical image capturing system has a maximum image height HOI perpendicular to the optical axis on the image plane. At least two lenses among the first lens to the sixth lens are made of glasses. The object-side surface and the image-side surface of at least one lens among the six lenses are aspheric. At least one lens among the first lens to the sixth lens has at least one inflection point on at least one surface thereof. The first lens has negative refractive power. The second lens has refractive power. The third lens has refractive power. The fourth lens has refractive power. The fifth lens has positive refractive power. The sixth lens has refractive power. The focal lengths of the six lenses are respectively f1, f2, f3, f4, f5 and f6. A focal length of the optical image capturing system is f. An entrance pupil diameter of the optical image capturing system is HEP. A distance on the optical axis from an object-side surface of the first lens to the image plane is HOS. A distance on the optical axis from the object-side surface of the first lens to an image-side surface of the sixth lens is INTL. An outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: $1.2 \leq f/HEP \leq 3.5$, $0 \leq InTL/HOS \leq 0.9$, and $0.9 \leq 2(ARE/HEP) \leq 1.5$.

The length of the outline curve of any surface of single lens within the range of maximum effective half diameter affects the capability for correcting the surface aberration and the optical path difference between the rays in each field of view. Longer outline curve length may lead to a better capability for aberration correction, but the difficulty of production may simultaneously become higher as well. Hence, the length of the outline curve of any surface of single lens within the range of the maximum effective half diameter has to be controlled, and especially, the proportional relationship (ARS/TP) between the length of the outline curve (ARS) of the surface within the range of the maximum effective half diameter and the central thickness (TP) of the lens to which the surface belongs on the optical axis has to be controlled. For example, the length of the maximum effective half diameter outline curve of the object-side surface of the first lens is denoted as ARS11, and the central thickness of the first lens on the optical axis is TP1, wherein the ratio between both of them is ARS11/TP1. The length of the maximum effective half diameter outline curve of the image-side surface of the first lens is denoted as ARS12, and the ratio between the ARS12 and TP1 is ARS12/TP1. The length of the maximum effective half diameter outline curve of the object-side surface of the second lens is denoted as ARS21, and the central thickness of the second lens on the optical axis is TP2, wherein the ratio between both of them is ARS21/TP2. The length of the maximum effective half diameter outline curve of the image-side surface of the second lens is denoted as ARS22, wherein the ratio between ARS22 and TP2 is ARS22/TP2. The proportional relationships between the lengths of the maximum effective half diameter outline curve of any surface of the other lenses and the central thicknesses (TP) of the other lenses to which the surfaces belong on the optical axis are denoted according to the regular pattern shown above.

The outline curve length within a range of ½ entrance pupil diameter height (HEP) of any surface of single lens specifically affects the capability for correcting the aberration in the shared region of each field of view on the surface and the capability for correcting the optical path difference among each field of view. Longer outline curve length may lead to a better capability for aberration correction, but the difficulty in production of such lens may simultaneously become higher as well. Hence, the outline curve length within a range of ½ entrance pupil diameter height (HEP) of any surface of single lens has to be controlled, and especially, the proportional relationship between the outline curve length within a range of ½ entrance pupil diameter height (HEP) of any surface of single lens and the central thickness (TP) on the optical axis has to be controlled. For example, the outline curve length of the ½ entrance pupil diameter height (HEP) of the object-side surface of the first lens is denoted as ARE11, and the central thickness of the first lens on the optical axis is TP1, wherein the ratio thereof is ARE11/TP1. The outline curve length of the ½ entrance pupil diameter height (HEP) of the image-side surface of the first lens is denoted as ARE12, wherein the ratio of the ARE12 to TP1 is ARE12/TP1. The outline curve length of the ½ entrance pupil diameter height (HEP) of the object-side surface of the second lens is denoted as ARE21, and the central thickness of the second lens on the optical axis is TP2, wherein the ratio thereof is ARE21/TP2. The outline curve length of the ½ entrance pupil diameter height (HEP) of the image-side surface of the second lens is denoted as ARE22, wherein the ratio of the ARE22 to TP2 is ARE22/TP2. The proportional relationships of outline curve lengths of the ½ entrance pupil diameter height (HEP) on any surface of the other lenses of the optical image capturing system to the central thicknesses (TP) on the optical axis of the other lenses to which the surfaces belong are denoted according to the regular pattern shown above.

The height of optical system (HOS) may be reduced to achieve the minimization of the optical image capturing system when the absolute value of f1 is larger than f6 ($|f1|>|f6|$).

When $|f2|+|f3|+|f4|+|f5|$ and $|f1|+|f6|$ meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to the fifth in the optical image capturing system has the weak positive refractive power, the positive refractive power of the first lens can be shared by it, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image-side surface thereof may be a concave surface. With this configuration, the back focal length of the optical image capturing system may be shortened to keep the optical image capturing system minimized. Moreover, at least one surface of the sixth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fifth embodiment of the present disclosure.

DESCRIPTION OF THE PREFERRED EMBODIMENTS

Figure 1A:
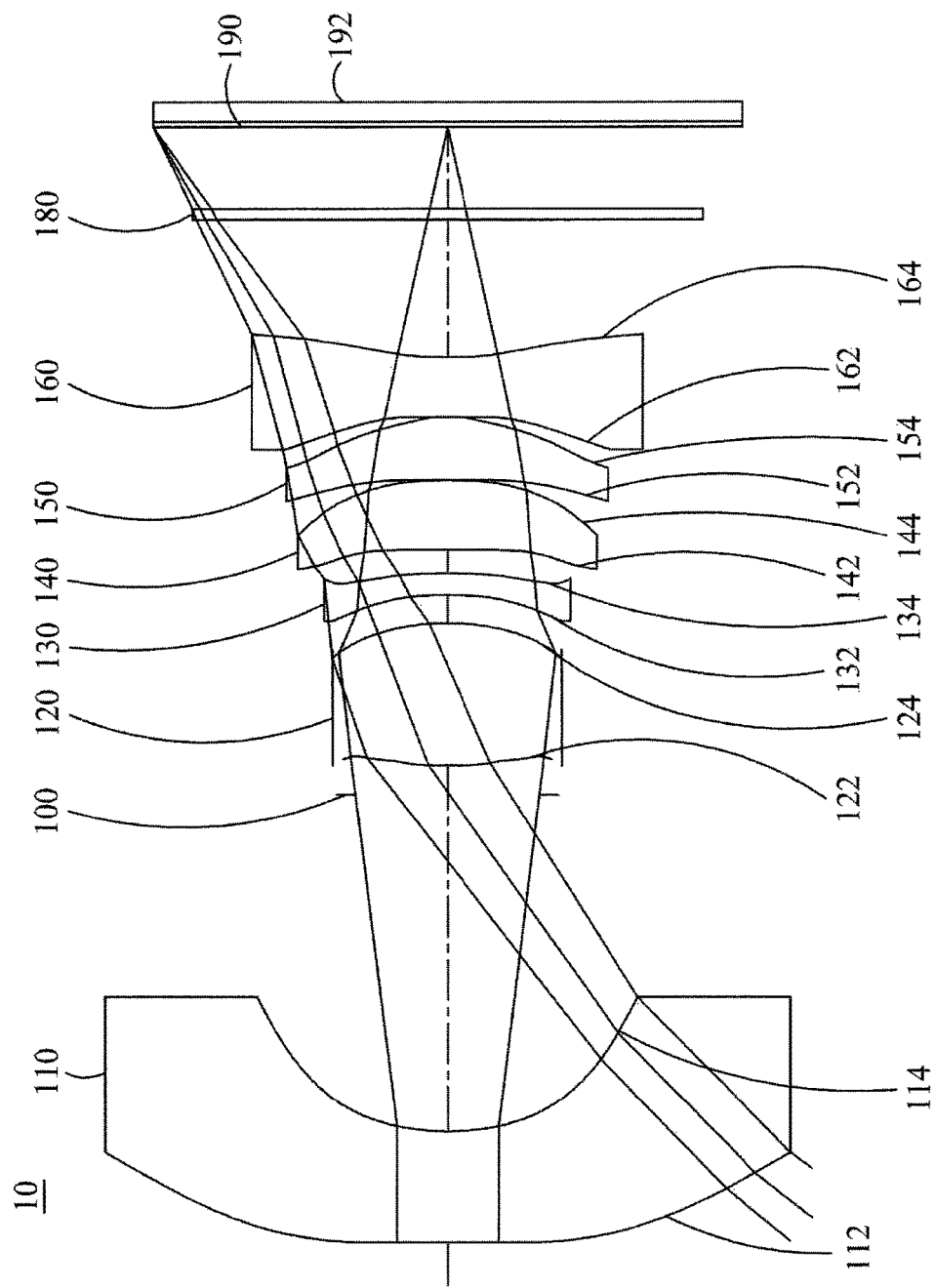
FIG. 1A is a schematic view of the optical image capturing system according to the first embodiment of the present invention.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in the order from an object-side surface to an image-side surface, includes a first lens with the refractive power, a second lens with the refractive power, a third lens with the refractive power, a fourth lens with the refractive power, a fifth lens with the refractive power, and a sixth lens with the refractive power and an image plane. The optical image capturing system may further include an image sensing device, which is disposed on an image plane.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive powers is $\Sigma$ PPR. The sum of the NPR of all lenses with negative refractive powers is $\Sigma$ NPR. The total refractive power and the total length of the optical image capturing system can be controlled easily when meeting following conditions: $0.5 \leq \Sigma$ PPR/|$\Sigma$ NPR|$\leq 15$. Preferably, the following condition may be satisfied: $1 \leq \Sigma$ PPR/|$\Sigma$ NPR|$\leq 3.0$.

The optical image capturing system may further include an image sensing device which is disposed on an image plane. Half of a diagonal of an effective detection field of the image sensing device (imaging height or the maximum image height of the optical image capturing system) is HOI. The distance on the optical axis from the object-side surface of the first lens to the image plane is HOS. They meet the following conditions: HOS/HOI$\leq$50 and $0.5 \leq$HOS/f$\leq$150. Preferably, the following conditions may be satisfied: $1 \leq$HOS/HOI$\leq$40 and $1 \leq$HOS/f$\leq$140. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and it is helpful to elevate the imaging quality.

In the optical image capturing system of the present invention, the aperture may be a front or middle aperture. Wherein, the front aperture is the aperture disposed between a photographed object and the first lens and the middle aperture is the aperture disposed between the first lens and the image plane. In the case that the aperture is the front aperture, it can make the optical image capturing system generate a longer distance between the exit pupil and the image plane thereof, such that the optical image capturing system can accommodate more optical elements and the efficiency of the image sensing device in receiving image can be increased; In the case that the aperture is the middle aperture, it is helpful to expand the angle of view of the optical image capturing system, such that the optical image capturing system has an advantage of the wide angle camera lens. The distance from the foregoing aperture to the image plane is InS. It meets following condition: $0.1 \leq$InS/HOS$\leq 1.1$. Therefore, the configuration can keep the optical image capturing system miniaturization with the character of wide angle of view at the same time.

In the optical image capturing system of the present invention, the distance from the object-side surface of the first lens to the image-side surface of the sixth lens is InTL. The sum of thicknesses of all lenses with refractive power on the optical axis is $\Sigma$ TP. It meets the following condition: $0.1 \leq \Sigma$ TP/InTL$\leq 0.9$. Therefore, it can keep the contrast ratio of the optical image capturing system and the yield rate about manufacturing lens at the same time, and provide the proper back focal length to accommodate other elements.

The curvature radius of the object-side surface of the first lens is R1. The curvature radius of the image-side surface of the first lens is R2. They meet the following condition: $0.001 \leq |R1/R| \leq 25$. Therefore, the first lens may have a suitable magnitude of positive refractive power, so as to prevent the spherical aberration from increasing too fast. Preferably, the following condition may be satisfied: $0.01 \leq |R1/R2| \leq 12$.

The curvature radius of the object-side surface of the sixth lens is R11. The curvature radius of the image-side surface of the sixth lens is R12. They meet the following condition: $-7 \leq (R11-R12)/(R11+R12) \leq 50$. Hereby, this configuration is beneficial to the correction of the astigmatism generated by the optical image capturing system.

The distance between the first lens and the second lens on the optical axis is IN12. The following condition is satisfied: IN12/f$\leq$60. Hereby, this configuration is helpful to improve the chromatic aberration of the lens in order to elevate their performance.

The distance between the fifth lens and the sixth lens on the optical axis is IN56. The following condition is satisfied:

IN56/f≤3.0. Hereby, this configuration is helpful to improve the chromatic aberration of the lens in order to elevate their performance.

The thicknesses of the first lens and the second lens on the optical axis are TP1 and TP2, respectively. The following condition is satisfied: 0.1 (TP1+IN12)/TP2≤10. Therefore, this configuration is helpful to control the sensitivity of the optical image capturing system, and improve their performance.

The thicknesses of the fifth lens and the sixth lens on the optical axis are TP5 and TP6, respectively, and the distance between the foregoing two lens on the optical axis is IN56. They meet the following condition: 0.1≤(TP6+IN56)/TP5≤15. Therefore, this configuration is helpful to control the sensitivity of the optical image capturing system, and decrease the total height of the optical image capturing system.

The thicknesses of the second lens, third lens and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object-side surface of the first lens and the image-side surface of the sixth lens is InTL. They meet the following condition: 0.1≤TP4/(IN34+TP4+IN45)≤1. Therefore, this configuration is helpful to slightly correct the aberration of the propagating process of the incident light layer by layer, and decrease the total height of the optical image capturing system.

In the optical image capturing system of the present invention, a perpendicular distance between a critical point C61 on an object-side surface of the sixth lens and the optical axis is HVT61. A perpendicular distance between a critical point C62 on an image-side surface of the sixth lens and the optical axis is HVT62. A horizontal distance from an intersection point on the object-side surface of the sixth lens crossing the optical axis to the critical point C61 on the optical axis is SGC61. A horizontal distance from an intersection point on the image-side surface of the sixth lens crossing the optical axis to the critical point C62 on the optical axis is SGC62. The following conditions can be satisfied: 0 mm≤HVT61≤3 mm; 0 mm≤HVT62≤6 mm; 0<HVT61/HVT62; 0 mm≤|SGC61|≤0.5 mm; 0 mm≤|SGC62|≤2 mm, and 0≤|SGC62|/(|SGC62|+TP6)≤0.9. Therefore, this configuration is helpful to correct the off-axis aberration effectively.

The optical image capturing system of the present invention meets the following condition: 0.2≤HVT62/HOI≤0.9. Preferably, it may meet the following condition: 0.3 HVT62/HOI≤0.8. Therefore, this configuration is helpful to correct the aberration of surrounding field of view for the optical image capturing system.

The optical image capturing system of the present invention may meet the following condition: 0<HVT62/HOS≤0.5. Preferably, the following condition can be satisfied: 0.2≤HVT62/HOS≤0.45. Therefore, this configuration is helpful to correct the aberration of surrounding field of view for the optical image capturing system.

In the optical image capturing system of the present invention, the distance in parallel with an optical axis from an inflection point on the object-side surface of the sixth lens that is nearest to the optical axis to an intersection point on the object-side surface of the sixth lens crossing the optical axis is expressed as SGI611. The distance in parallel with an optical axis from an inflection point on the image-side surface of the sixth lens that is nearest to the optical axis to an intersection point on the image-side of the sixth lens crossing the optical axis is expressed as SGI621. The following conditions can be satisfied: 0<SGI611/(SGI611+TP6)≤0.9 and 0<SGI621/(SGI621+TP6)≤0.9. Preferably, they may meet the following conditions: 0.1≤SGI611/(SGI611+TP6)≤0.6 and 0.1≤SGI621/(SGI621+TP6)≤0.6.

The distance in parallel with the optical axis from the inflection point on the object-side surface of the sixth lens that is second nearest to the optical axis to an intersection point on the object-side surface of the sixth lens crossing the optical axis is expressed as SGI612. The distance in parallel with an optical axis from an inflection point on the image-side surface of the sixth lens that is second nearest to the optical axis to an intersection point on the image-side surface of the sixth lens crossing the optical axis is expressed as SGI622. The following conditions can be satisfied: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The distance perpendicular to the optical axis between the inflection point on the object-side surface of the sixth lens that is the nearest to the optical axis and the optical axis is expressed as HIF611. The distance perpendicular to the optical axis between an intersection point on the image-side surface of the sixth lens crossing the optical axis and an inflection point on the image-side surface of the sixth lens that is the nearest to the optical axis is expressed as HIF621. They may meet the following conditions: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The distance perpendicular to the optical axis between the inflection point on the object-side surface of the sixth lens that is second nearest to the optical axis and the optical axis is expressed as HIF612. The distance perpendicular to the optical axis between an intersection point on the image-side surface of the sixth lens crossing the optical axis and an inflection point on the image-side surface of the sixth lens that is second nearest to the optical axis is expressed as HIF622. The following conditions can be satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The perpendicular distance between the inflection point on the object-side surface of the sixth lens that is third nearest to the optical axis and the optical axis is expressed as HIF613. The perpendicular distance between an intersection point on the image-side surface of the sixth lens crossing the optical axis and an inflection point on the image-side surface of the sixth lens that is third nearest to the optical axis is expressed as HIF623. The following conditions can be satisfied: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|3.5 mm.

The perpendicular distance between the inflection point on the object-side surface of the sixth lens that is fourth nearest to the optical axis and the optical axis is expressed as HIF614. The perpendicular distance between an intersection point on the image-side surface of the sixth lens crossing the optical axis and an inflection point on the image-side surface of the sixth lens that is fourth nearest to the optical axis is expressed as HIF624. The following conditions can be satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and low coefficient of dispersion in an interlaced manner.

The Aspheric equation for the lens can be represented by:

$$z=ch^2/[1+[1-(k+1)c^2h^2]^{0.5}]+A_4h^4+A_6h^6+A_8h^8+A_{10}h^{10}+A_{12}h^{12}+A_{14}h^{14}+A_{16}h^{16}+A_{18}h^{18}+A_{20}h^{20}+ \quad (1),$$

wherein z is a position value of the position along the optical axis and at the height h which refers to the surface apex; k is the cone coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic material. If the lens is made of the plastic material, it can reduce the cost of manufacturing as well as the weight of the lens effectively. If lens is made of glass, it can control the heat effect and increase the design space of the configuration of the lens with refractive powers in the optical image capturing system. Besides, the object-side surface and the image-side surface of the first lens through sixth lens may be aspheric, which can gain more control variables and even reduce the number of the used lens in contrast to traditional glass lens in addition to the use of reducing the aberration. Thus, the total height of the optical image capturing system can be reduced effectively.

Furthermore, in the optical image capturing system provided by the present disclosure, when the surface of lens is a convex surface, the surface of that lens is basically a convex surface in the vicinity of the optical axis. When the surface of lens is a concave surface, the surface of that lens is basically a concave surface in the vicinity of the optical axis.

The optical image capturing system of the present invention can be applied to the optical image capturing system with automatic focus based on the demand and have the characters of a good aberration correction and a good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system of the present invention, at least one lens among the first lens, second lens, third lens, fourth lens, fifth lens and sixth lens may further be a light filtering element for light with wavelength of less than 500 nm based on the design requirements. The light filtering element may be achieved by coating film on at least one surface of that lens with certain filtering function, or forming that lens with material that can filter light with short wavelength.

The image plane of the optical image capturing system of the present invention may be a plane or a curved surface based on the design requirement. When the image plane is a curved surface (e.g. a spherical surface with curvature radius), it is helpful to decrease the required incident angle that make the rays focus on the image plane. In addition to the aid of the miniaturization of the length of the optical image capturing system (TTL), it is helpful to elevate the relative illumination at the same time.

According to the foregoing implementation method, the specific embodiments with figures are presented in detail as below.

The First Embodiment

Figure 1B:
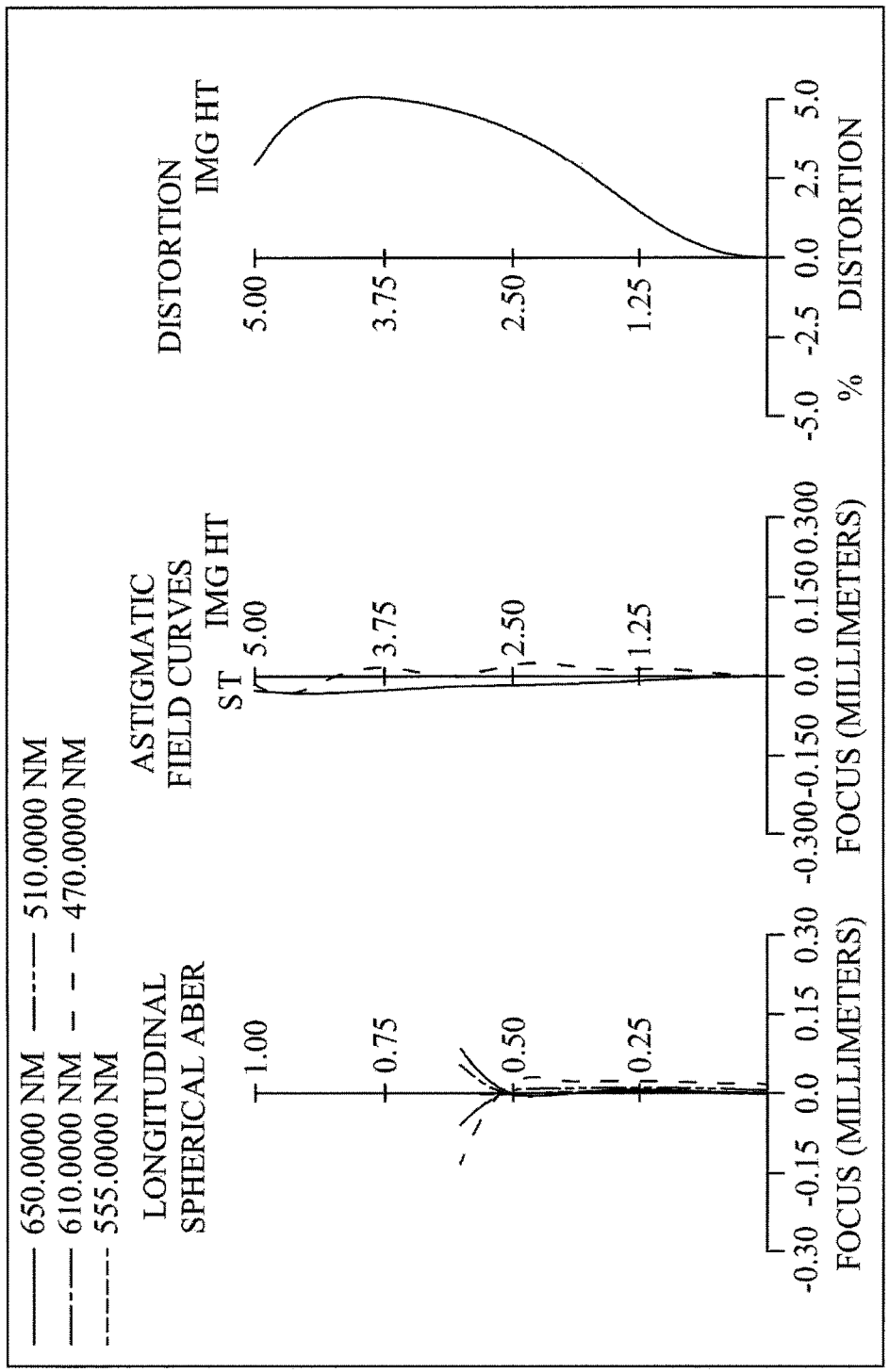
FIG. 1B shows the longitudinal spherical aberration curves, astigmatic field curves, and optical distortion curve of the optical image capturing system in the order from left to right according to the first embodiment of the present invention.
Figure 1C:
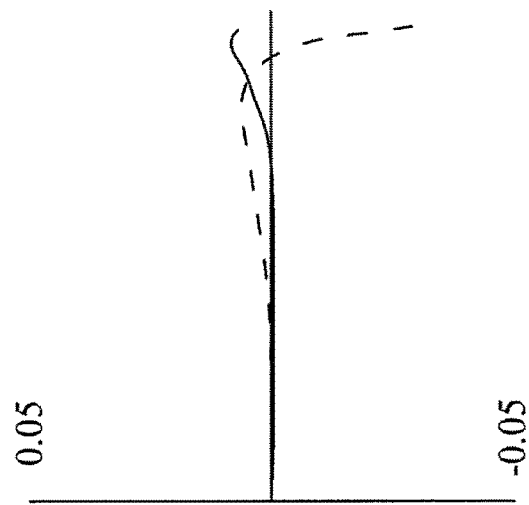
FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the first embodiment of the present disclosure.
Figure 1C:
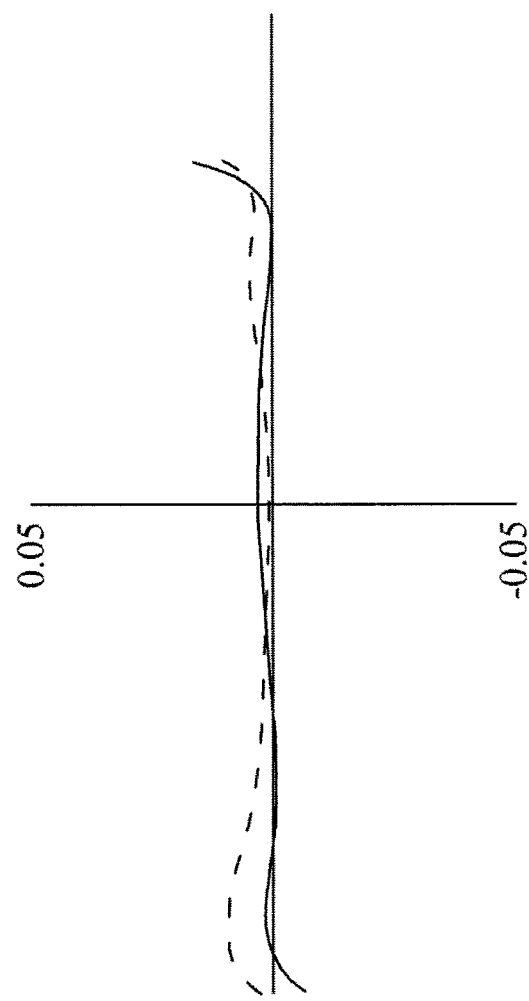

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the first embodiment of the present disclosure. As shown in FIG. 1A, in order from an object-side surface to an image-side surface, the optical image capturing system includes a first lens 110, an aperture 100, a second lens 120, a third lens 130, a fourth lens 140, a fifth lens 150, a sixth lens 160, an infrared filter 180, an image plane 190, and an image sensing device 192.

The first lens 110 has negative refractive power and is made of plastic material. An object-side surface 112 of the first lens 110 is a concave surface and an image-side surface 114 of the first lens 110 is a concave surface, and both the object-side surface 112 and the image-side surface 114 are aspheric. The object-side surface 112 thereof has two inflection points. The length of the maximum effective half diameter outline curve of the object-side surface of the first lens is denoted as ARS11, and the length of the maximum effective half diameter outline curve of the image-side surface of the first lens is denoted as ARS12. The outline curve length of the ½ entrance pupil diameter (HEP) of the object-side surface of the first lens is denoted as ARE11, and the outline curve length of the ½ entrance pupil diameter (HEP) of the image-side surface of the first lens is denoted as ARE12. The central thickness of the first lens on the optical axis is denoted as TP1.

The distance paralleling an optical axis from an inflection point on the object-side surface of the first lens which is nearest to the optical axis to an intersection point on the object-side surface of the first lens crossing the optical axis is expressed as SGI111. The distance paralleling an optical axis from an inflection point on the image-side surface of the first lens which is nearest to the optical axis to an intersection point on the image-side surface of the first lens crossing the optical axis is expressed as SGI121. They meet the following conditions: SGI111=−0.0031 mm, and |SGI111|/(|SGI111|+TP1)=0.0016.

The distance in parallel with an optical axis from an inflection point on the object-side surface of the first lens that is second nearest to the optical axis to an intersection point on the object-side surface of the first lens crossing the optical axis is expressed as SGI112. The distance in parallel with an optical axis from an inflection point on the image-side surface of the first lens that is second nearest to the optical axis to an intersection point on the image-side surface of the first lens crossing the optical axis is expressed as SGI122. They meet the following conditions: SGI112=1.3178 mm and |SGI112|/(|SGI112|+TP1)=0.4052.

The distance perpendicular to the optical axis from the inflection point on the object-side surface of the first lens that is nearest to the optical axis to an optical axis is expressed as HIF111. The distance perpendicular to the optical axis from the inflection point on the image-side surface of the first lens that is nearest to the optical axis to an intersection point on the image-side surface of the first lens crossing the optical axis is expressed as HIF121. It meets the following conditions: HIF111=0.5557 mm and HIF111/HOI=0.1111.

The distance perpendicular to the optical axis from the inflection point on the object-side surface of the first lens that is second nearest to the optical axis to an optical axis is expressed as HIF112. The distance perpendicular to the optical axis from the inflection point on the image-side surface of the first lens that is second nearest to the optical axis to an intersection point on the image-side surface of the first lens crossing the optical axis is expressed as HIF122. It meets the following conditions: HIF112=5.3732 mm and HIF112/HOI=1.0746.

The second lens 120 has positive refractive power and is made of plastic material. An object-side surface 122 of the second lens 120 is a convex surface and an image-side surface 124 of the second lens 120 is a convex surface, and both the object-side surface 122 and the image-side surface 124 are aspheric. The object-side surface 122 of the second lens 120 has one inflection point. The length of the maximum effective half diameter outline curve of the object-side surface of the second lens is denoted as ARS21, and the length of the maximum effective half diameter outline curve of the image-side surface of the second lens is denoted as ARS22. The outline curve length of the ½ entrance pupil diameter (HEP) of the object-side surface of the second lens is denoted as ARE21, and the outline curve length of the ½ entrance pupil diameter (HEP) of the image-side surface of the second lens is denoted as ARE22. The central thickness of the second lens on the optical axis is denoted as TP2.

The distance in parallel with an optical axis from an inflection point on the object-side surface of the second lens that is nearest to the optical axis to the intersection point on the object-side surface of the second lens crossing the optical axis is expressed as SGI211. The distance in parallel with an optical axis from an inflection point on the image-side surface of the second lens that is nearest to the optical axis to the intersection point on the image-side surface of the second lens crossing the optical axis is expressed as SGI221. They meet the following conditions: SGI211=0.1069 mm, |SGI211|/(|SGI211|+TP2)=0.0412, SGI221=0 mm and |SGI221|/(|SGI221|+TP2)=0.

The perpendicular distance from the inflection point on the object-side surface of the second lens that is nearest to the optical axis to the optical axis is expressed as HIF211. The distance perpendicular to the optical axis from the inflection point on the image-side surface of the second lens that is nearest to the optical axis to the intersection point on the image-side surface of the second lens crossing the optical axis is expressed as HIF221. They meet the following conditions: HIF211=1.1264 mm, HIF211/HOI=0.2253, HIF221=0 mm and HIF221/HOI=0.

The third lens 130 has negative refractive power and is made of plastic material. An object-side surface 132 of the third lens 130 is a concave surface and an image-side surface 134 of the third lens 130 is a convex surface, and both the object-side surface 132 and the image-side surface 134 are aspheric. The object-side surface 132 and the image-side surface 134 both have one inflection point. The length of the maximum effective half diameter outline curve of the object-side surface of the third lens is denoted as ARS31, and the length of the maximum effective half diameter outline curve of the image-side surface of the third lens is denoted as ARS32. The outline curve length of the ½ entrance pupil diameter (HEP) of the object-side surface of the third lens is denoted as ARE31, and the outline curve length of the ½ entrance pupil diameter (HEP) of the image-side surface of the third lens is denoted as ARE32. The central thickness of the third lens on the optical axis is denoted as TP3.

The distance in parallel with an optical axis from an inflection point on the object-side surface of the third lens that is nearest to the optical axis to an intersection point on the object-side surface of the third lens crossing the optical axis is expressed as SGI311. The distance in parallel with an optical axis from an inflection point on the image-side surface of the third lens that is nearest to the optical axis to an intersection point on the image-side surface of the third lens crossing the optical axis is expressed as SGI321. The following conditions can be satisfied: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object-side surface of the third lens that is nearest to the optical axis and the optical axis is expressed as HIF311. The distance perpendicular to the optical axis between the inflection point on the image-side surface of the third lens that is nearest to the optical axis and the intersection point on the image-side surface of the third lens crossing the optical axis is expressed as HIF321. The following conditions can be satisfied: HIF311=1.5907 mm, HIF311/HOI=0.3181, HIF321=1.3380 mm and HIF321/HOI=0.2676.

The fourth lens 140 has positive refractive power and is made of plastic material. An object-side surface 142 of the fourth lens 140 is a convex surface and an image-side surface 144 of the fourth lens 140 is a concave surface, and both of the object-side surface 142 and the image-side surface 144 are aspheric. The object-side surface 142 thereof has two inflection points, and the image-side surface 144 thereof has one inflection point. The length of the maximum effective half diameter outline curve of the object-side surface of the fourth lens is denoted as ARS41, and the length of the maximum effective half diameter outline curve of the image-side surface of the fourth lens is denoted as ARS42. The outline curve length of the ½ entrance pupil diameter (HEP) of the object-side surface of the fourth lens is denoted as ARE41, and the outline curve length of the ½ entrance pupil diameter (HEP) of the image-side surface of the fourth lens is denoted as ARE42. The central thickness of the fourth lens on the optical axis is denoted as TP4.

The distance in parallel with the optical axis from an inflection point on the object-side surface of the fourth lens that is nearest to the optical axis to the intersection point on the object-side surface of the fourth lens crossing the optical axis is expressed as SGI411. The distance in parallel with the optical axis from an inflection point on the image-side surface of the fourth lens that is nearest to the optical axis to the intersection point on the image-side surface of the fourth lens crossing the optical axis is expressed as SGI421. The following conditions can be satisfied: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object-side surface of the fourth lens that is second nearest to the optical axis to the intersection point on the object-side surface of the fourth lens crossing the optical axis is expressed as SGI412. The distance in parallel with an optical axis from an inflection point on the image-side surface of the fourth lens that is second nearest to the optical axis to the intersection point on the image-side surface of the fourth lens crossing the optical axis is expressed as SGI422. The following conditions can be satisfied: SGI412=−0.2078 mm and |SGI412|/(|SGI412|+TP4)=0.1439.

The perpendicular distance between the inflection point on the object-side surface of the fourth lens that is nearest to the optical axis and the optical axis is expressed as HIF411. The distance perpendicular to the optical axis between the inflection point on the image-side surface of the fourth lens that is nearest to the optical axis and the intersection point on the image-side surface of the fourth lens crossing the optical axis is expressed as HIF421. The following conditions can be satisfied: HIF411=0.4706 mm, HIF411/HOI=0.0941, HIF421=0.1721 mm and HIF421/HOI=0.0344.

The perpendicular distance between the inflection point on the object-side surface of the fourth lens that is second nearest to the optical axis and the optical axis is expressed as HIF412. The distance perpendicular to the optical axis between the inflection point on the image-side surface of the fourth lens that is second nearest to the optical axis and the intersection point on the image-side surface of the fourth lens crossing the optical axis is expressed as HIF422. The following conditions can be satisfied: HIF412=2.0421 mm and HIF412/HOI=0.4084.

The fifth lens 150 has positive refractive power and is made of plastic material. An object-side surface 152 of the fifth lens 150 is a convex surface and an image-side surface 154 of the fifth lens 150 is a convex surface, and both the object-side surface 152 and the image-side surface 154 are aspheric. The object-side surface 152 thereof has two inflection points and the image-side surface 154 thereof has one inflection point. The length of the maximum effective half diameter outline curve of the object-side surface of the fifth lens is denoted as ARS51, and the length of the maximum effective half diameter outline curve of the image-side surface of the fifth lens is denoted as ARS52. The outline curve length of the ½ entrance pupil diameter (HEP) of the object-side surface of the fifth lens is denoted as ARE51, and the outline curve length of the ½ entrance pupil diameter (HEP) of the image-side surface of the fifth lens is denoted as ARE52. The central thickness of the fifth lens on the optical axis is denoted as TP5.

The distance in parallel with an optical axis from an inflection point on the object-side surface of the fifth lens that is nearest to the optical axis to the intersection point on the object-side surface of the fifth lens crossing the optical axis is expressed as SGI511. The distance in parallel with an optical axis from an inflection point on the image-side surface of the fifth lens that is nearest to the optical axis to the intersection point on the image-side surface of the fifth lens crossing the optical axis is expressed as SGI521. The following conditions can be satisfied: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object-side surface of the fifth lens that is second nearest to the optical axis to the intersection point on the object-side surface of the fifth lens crossing the optical axis is expressed as SGI512. The distance in parallel with an optical axis from an inflection point on the image-side surface of the fifth lens that is second nearest to the optical axis to the intersection point on the image-side surface of the fifth lens crossing the optical axis is expressed as SGI522. The following conditions can be satisfied: SGI512=−0.32032 mm and |SGI512|/(|SGI512|+TP5) =0.23009.

The distance in parallel with an optical axis from an inflection point on the object-side surface of the fifth lens that is third nearest to the optical axis to the intersection point on the object-side surface of the fifth lens crossing the optical axis is expressed as SGI513. The distance in parallel with an optical axis from an inflection point on the image-side surface of the fifth lens that is third nearest to the optical axis to the intersection point on the image-side surface of the fifth lens crossing the optical axis is expressed as SGI523. The following conditions can be satisfied: SGI513=0 mm, |SGI513|/(|SGI513|+TP5)=0, SGI523=0 mm and |SGI523|/(|SGI523|+TP5)=0.

The distance in parallel with an optical axis from an inflection point on the object-side surface of the fifth lens that is fourth nearest to the optical axis to the intersection point on the object-side surface of the fifth lens crossing the optical axis is expressed as SGI514. The distance in parallel with an optical axis from an inflection point on the image-side surface of the fifth lens that is fourth nearest to the optical axis to the intersection point on the image-side surface of the fifth lens crossing the optical axis is expressed as SGI524. The following conditions can be satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object-side surface of the fifth lens that is nearest to the optical axis is expressed as HIF511. The perpendicular distance between the optical axis and the inflection point on the image-side surface of the fifth lens that is nearest to the optical axis is expressed as HIF521. The following conditions can be satisfied: HIF511=0.28212 mm, HIF511/HOI=0.05642, HIF521=2.13850 mm and HIF521/HOI=0.42770.

The perpendicular distance between the inflection point on the object-side surface of the fifth lens that is second nearest to the optical axis and the optical axis is expressed as HIF512. The perpendicular distance between the inflection point on the image-side surface of the fifth lens that is second nearest to the optical axis and the optical axis is expressed as HIF522. The following conditions can be satisfied: HIF512=2.51384 mm and HIF512/HOI=0.50277.

The perpendicular distance between the inflection point on the object-side surface of the fifth lens that is third nearest to the optical axis and the optical axis is expressed as HIF513. The perpendicular distance between the inflection point on the image-side surface of the fifth lens that is third nearest to the optical axis and the optical axis is expressed as HIF523. The following conditions can be satisfied: HIF513=0 mm, HIF513/HOI=0, HIF523=0 mm and HIF523/HOI=0.

The perpendicular distance between the inflection point on the object-side surface of the fifth lens that is fourth nearest to the optical axis and the optical axis is expressed as HIF514. The perpendicular distance between the inflection point on the image-side surface of the fifth lens that is fourth nearest to the optical axis and the optical axis is expressed as HIF524. The following conditions can be satisfied: HIF514=0 mm, HIF514/HOI=0, HIF524=0 mm and HIF524/HOI=0.

The sixth lens 160 has negative refractive power and it is made of plastic material. An object-side surface 162 of the sixth lens 160 is a concave surface and an image-side surface 164 of the sixth lens 160 is a concave surface, and the object-side surface 162 thereof has two inflection points and the image-side surface 164 thereof has one inflection point. Therefore, the incident angle of each field of view on the sixth lens can be effectively adjusted and the spherical aberration can thus be improved. The length of the maximum effective half diameter outline curve of the object-side surface of the sixth lens is denoted as ARS61, and the length of the maximum effective half diameter outline curve of the image-side surface of the sixth lens is denoted as ARS62. The outline curve length of the ½ entrance pupil diameter (HEP) of the object-side surface of the sixth lens is denoted as ARE61, and the outline curve length of the ½ entrance pupil diameter (HEP) of the image-side surface of the sixth lens is denoted as ARE62. The central thickness of the sixth lens on the optical axis is denoted as TP6.

The distance in parallel with an optical axis from an inflection point on the object-side surface of the sixth lens that is nearest to the optical axis to the intersection point on the object-side surface of the sixth lens crossing the optical axis is expressed as SGI611. The distance in parallel with an optical axis from an inflection point on the image-side surface of the sixth lens that is nearest to the optical axis to the intersection point on the image-side surface of the sixth lens crossing the optical axis is expressed as SGI621. They meet the following conditions: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object-side surface of the sixth lens that is second nearest to the optical axis to an intersection point on the object-side surface of the sixth lens crossing the optical axis is expressed as SGI612. The distance in parallel with an optical axis from an inflection point on the image-side surface of the sixth lens that is second nearest to the optical axis to the intersection point on the image-side surface of the sixth lens crossing the optical axis is expressed as SGI622. They meet the following conditions: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object-side surface of the sixth lens that is nearest to the optical axis and the optical axis is expressed as HIF611. The perpendicular distance between the inflection point on the image-side surface of the sixth lens that is nearest to the optical axis and the optical axis is expressed as HIF621. They meet the following conditions: HIF611=2.24283 mm, HIF611/HOI=0.44857, HIF621=1.07376 mm and HIF621/HOI=0.21475.

The perpendicular distance between the inflection point on the object-side surface of the sixth lens that is second nearest to the optical axis and the optical axis is expressed as HIF612. The perpendicular distance between the inflection point on the image-side surface of the sixth lens that is second nearest to the optical axis and the optical axis is expressed as HIF622. They meet the following conditions: HIF612=2.48895 mm and HIF612/HOI=0.49779.

The perpendicular distance between the inflection point on the object-side surface of the sixth lens that is third nearest to the optical axis and the optical axis is expressed as HIF613. The perpendicular distance between the inflection point on the image-side surface of the sixth lens that is third nearest to the optical axis and the optical axis is expressed HIF623. They meet the following conditions: HIF613=0 mm, HIF613/HOI=0, HIF623=0 mm and HIF623/HOI=0.

The perpendicular distance between the inflection point on the object-side surface of the sixth lens that is fourth nearest to the optical axis and the optical axis is expressed as HIF614. The perpendicular distance between the inflection point on the image-side surface of the sixth lens that is fourth nearest to the optical axis and the optical axis is expressed as HIF624. They meet the following conditions: HIF614=0 mm, HIF614/HOI=0, HIF624=0 mm and HIF624/HOI=0.

The infrared filter 180 is made of glass material. The infrared filter 180 is disposed between the sixth lens 160 and the image plane 190, and it does not affect the focal length of the optical image capturing system.

In the optical image capturing system of the first embodiment, the focal length of the optical image capturing system is f, the entrance pupil diameter of the optical image capturing system is HEP, and a half maximum view angle of the optical image capturing system is HAF. The value of the parameters are shown as below: f=4.075 mm, f/HEP=1.4, HAF=50.001° and tan(HAF)=1.1918.

In the optical image capturing system of the first embodiment, the focal length of the first lens 110 is f1 and the focal length of the sixth lens 160 is f6. The following conditions are satisfied: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. The following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object-side surface 112 of the first lens to the image-side surface 164 of the sixth lens is InTL. The distance from the object-side surface 112 of the first lens to the image plane 190 is HOS. The distance from an aperture 100 to an image plane 190 is InS. Half of a diagonal length of an effective detection field of the image sensing device 192 is HOI. The distance from the image-side surface 164 of the sixth lens to the image plane 190 is BFL. They meet the following conditions: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is Σ TP. It meets the following conditions: Σ TP=8.13899 mm and Σ TP/InTL=0.52477. Therefore, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object-side surface 112 of the first lens is R1. The curvature radius of the image-side surface 114 of the first lens is R2. The following condition is satisfied: |R1/R2|=8.99987. Hereby, the first lens has a suitable magnitude of positive refractive power, so as to prevent the longitudinal spherical aberration from increasing too fast.

In the optical image capturing system of the first embodiment, the curvature radius of the object-side surface 162 of the sixth lens is R11. The curvature radius of the image-side surface 164 of the sixth lens is R12. They meet the following conditions: (R11−R12)/(R11+R12)=1.27780. Therefore, it is beneficial to correct the astigmatism generated by the optical image capturing system.

In the optical image capturing system of the first embodiment, a sum of focal lengths of all lenses with positive refractive power is ΣPP. The following conditions are satisfied: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical image capturing system.

In the optical image capturing system of the first embodiment, the sum of focal lengths of all lenses with negative refractive power is Σ NP. It meets the following conditions: Σ NP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. It meets the following conditions: IN12=6.418 mm and IN12/f=1.57491. Therefore, it is helpful to improve the chromatic aberration of the lens in order to elevate their performance.

In the optical image capturing system of the first embodiment, a distance between the fifth lens 150 and the sixth lens 160 on the optical axis is IN56. It meets the following conditions: IN56=0.025 mm and IN56/f=0.00613. Therefore, it is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are satisfied: TP1=1.934 mm, TP2=2.486 mm and (TP1+IN12)/TP2=3.36005. Therefore, it is helpful to control the sensitivity generated by the optical image capturing system and elevate their performance.

In the optical image capturing system of the first embodiment, central thicknesses of the fifth lens 150 and the sixth lens 160 on the optical axis are TP5 and TP6, respectively, and the distance between the aforementioned two lenses on the optical axis is IN56. The following conditions are satisfied: TP5=1.072 mm, TP6=1.031 mm and (TP6+IN56)/TP5=0.98555. Therefore, it is helpful to control the sensitivity generated by the optical image capturing system and reduce the total height of the optical image capturing system.

In the optical image capturing system of the first embodiment, a distance between the third lens 130 and the fourth lens 140 on the optical axis is IN34. The distance between the fourth lens 140 and the fifth lens 150 on the optical axis is IN45. The following conditions are satisfied: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a distance in parallel with an optical axis from a maximum effective half diameter position on the object-side surface 152 of the fifth lens to an intersection point on the object-side surface 152 of the fifth lens crossing the optical axis is InRS51. The distance in parallel with an optical axis from a maximum effective half diameter position on the image-side surface 154 of the fifth lens to an intersection point on the image-side surface 154 of the fifth lens crossing the optical axis is InRS52. The thickness of the fifth lens 150 is TP5. The following conditions are satisfied: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeping the miniaturization of the optical image capturing system effectively.

In the optical image capturing system of the first embodiment, the perpendicular distance between a critical point C51 on the object-side surface 152 of the fifth lens and the optical axis is HVT51. The perpendicular distance between a critical point C52 on the image-side surface 154 of the fifth lens and the optical axis is HVT52. The following conditions are satisfied: HVT51=0.515349 mm and HVT52=0 mm.

In the optical image capturing system of the first embodiment, a distance in parallel with an optical axis from a maximum effective half diameter position on the object-side surface 162 of the sixth lens to an intersection point on the object-side surface 162 of the sixth lens crossing the optical axis is InRS61. A distance in parallel with an optical axis from a maximum effective half diameter position on the image-side surface 164 of the sixth lens to an intersection point on the image-side surface 164 of the sixth lens crossing the optical axis is InRS62. The thickness of the sixth lens 160 is TP6. The following conditions are satisfied: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system effectively.

In the optical image capturing system of the first embodiment, the perpendicular distance between a critical point C61 on the object-side surface 162 of the sixth lens and the optical axis is HVT61. The perpendicular distance between a critical point C62 on the image-side surface 164 of the sixth lens and the optical axis is HVT62. The following conditions are satisfied: HVT61=0 mm and HVT62=0 mm.

In the optical image capturing system of the first embodiment, the following condition is satisfied: HVT51/HOI=0.1031. Therefore, it is helpful to correct the aberration of surrounding field of view of the optical image capturing system.

In the optical image capturing system of the first embodiment, the following condition is satisfied: HVT51/HOS=0.02634. Therefore, it is helpful to correct the aberration of surrounding field of view of the optical image capturing system.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens is NA6. They meet the following condition: NA6/NA2≤1. Therefore, it is helpful to correct the chromatic aberration of the optical image capturing system.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

In the first embodiment of the optical image capturing system, the transverse aberration of the longest operation wavelength of the visible light of a positive direction tangential fan passing through the edge of aperture and striking at the position of 0.7 field of view on the image plane is denoted as PLTA, which is 0.006 mm. The transverse aberration of the shortest operation wavelength of the visible light of a positive direction tangential fan passing through the edge of aperture and striking at the position of 0.7 field of view on the image plane is denoted as PSTA, which is 0.005 mm. The transverse aberration of the longest operation wavelength of the visible light of the negative direction tangential fan passing through the edge of aperture and striking at the position of 0.7 field of view on the image plane is denoted as NLTA, which is 0.004 mm. The transverse aberration of the shortest operation wavelength of the visible light of the negative direction tangential fan passing through the edge of aperture and striking at the position of 0.7 field of view on the image plane is denoted as NSTA, which is −0.007 mm. The transverse aberration of the longest operation wavelength of the visible light of the sagittal fan passing through the edge of aperture and striking at the position of 0.7 field of view on the image plane is denoted as SLTA, which is −0.003 mm. The transverse aberration of the shortest operation wavelength of the visible light of the sagittal fan passing through the edge of aperture and striking at the position of 0.7 field of view on the image plane is denoted as SSTA, which is 0.008 mm.

The contents in Tables 1 and 2 below should be incorporated into the reference of the present embodiment.

TABLE 1

Lens Parameters for the First Embodiment
f(focal length) = 4.075 mm; f/HEP = 1.4; HAF(half angle of view) = 50.000 deg

| Surfaces No. | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | Infrared filter | Plane | 0.200 | | 1.517 | 64.13 | |
| 15 | | Plane | 1.420 | | | | |
| 16 | Image Plane | Plane | | | | | |

Reference Wavelength: 555 nm; Shield Position: The 1st surface with effective aperture = 5.800 mm; The 3rd surface with effective aperture radius = 1.570 mm; The 5th surface with the effective aperture radius = 1.950 mm

TABLE 2

Aspheric Coefficients in the First Embodiment
Table 2: Aspheric Coefficients

| Surface No | 1 | 2 | 4 | 5 | 6 | 7 | 8 |
|---|---|---|---|---|---|---|---|
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| Surface No | 9 | 10 | 11 | 12 | 13 |
|---|---|---|---|---|---|
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |

TABLE 2-continued

Aspheric Coefficients in the First Embodiment
Table 2: Aspheric Coefficients

| A14 | 3.768879E−05  | 2.280473E−05  | −9.943196E−06 | −8.788363E−06 | −9.396920E−08 |
| A16 | −1.052467E−06 | −5.165452E−07 | 2.898397E−07  | 2.494302E−07  | 2.728360E−09  |

The values pertaining to the outline curve lengths are obtainable according to the data in Table 1 and Table 2:

| First Embodiment (Primary Reference Wavelength Used = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS − EHD | (ARS/EHD)% | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structural data for the first embodiment in FIG. 1A, of which the unit for the curvature radius, the thickness, the distance, and the focal length is millimeters (mm). Surfaces 0-16 illustrate the surfaces from the object-side surface to the image-side surface in the optical image capturing system. Table 2 shows the aspheric coefficients of the first embodiment, where k is the cone coefficient in the aspheric surface equation, and A1-A20 are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
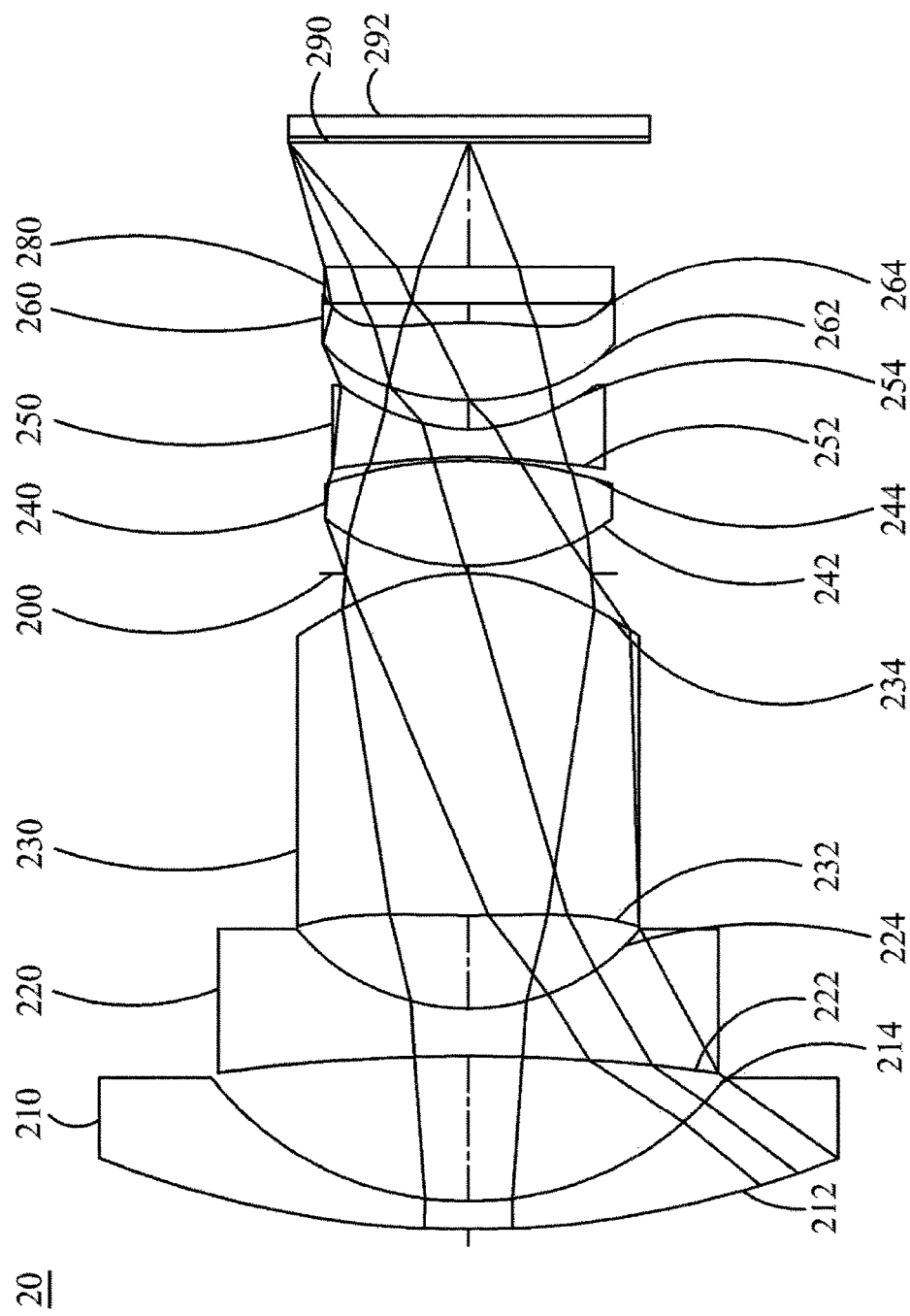
FIG. 2A is a schematic view of the optical image capturing system according to the second embodiment of the present invention.
Figure 2B:
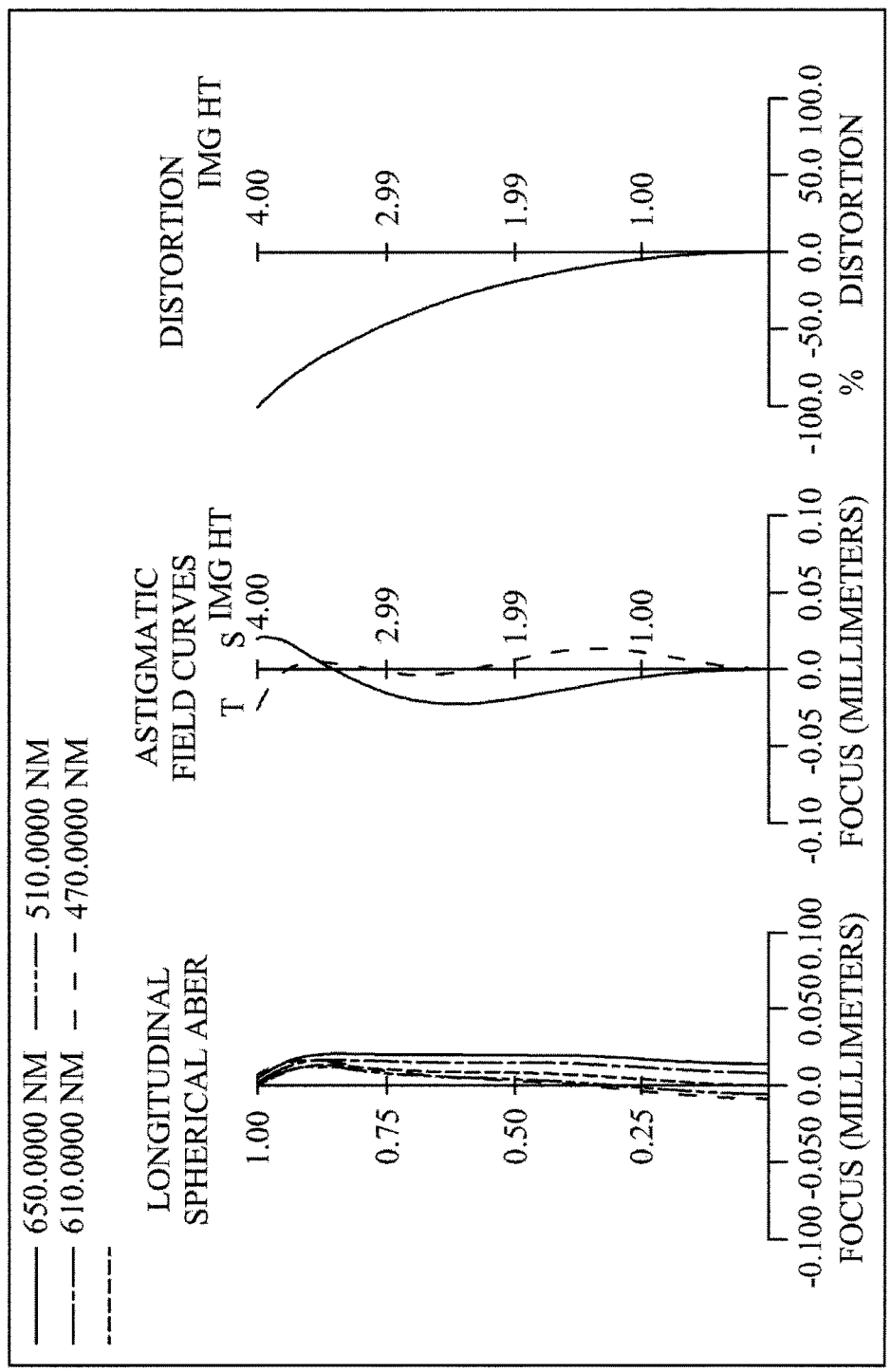
FIG. 2B shows the longitudinal spherical aberration curves, astigmatic field curves, and optical distortion curve of the optical image capturing system in the order from left to right according to the second embodiment of the present invention.
Figure 2C:
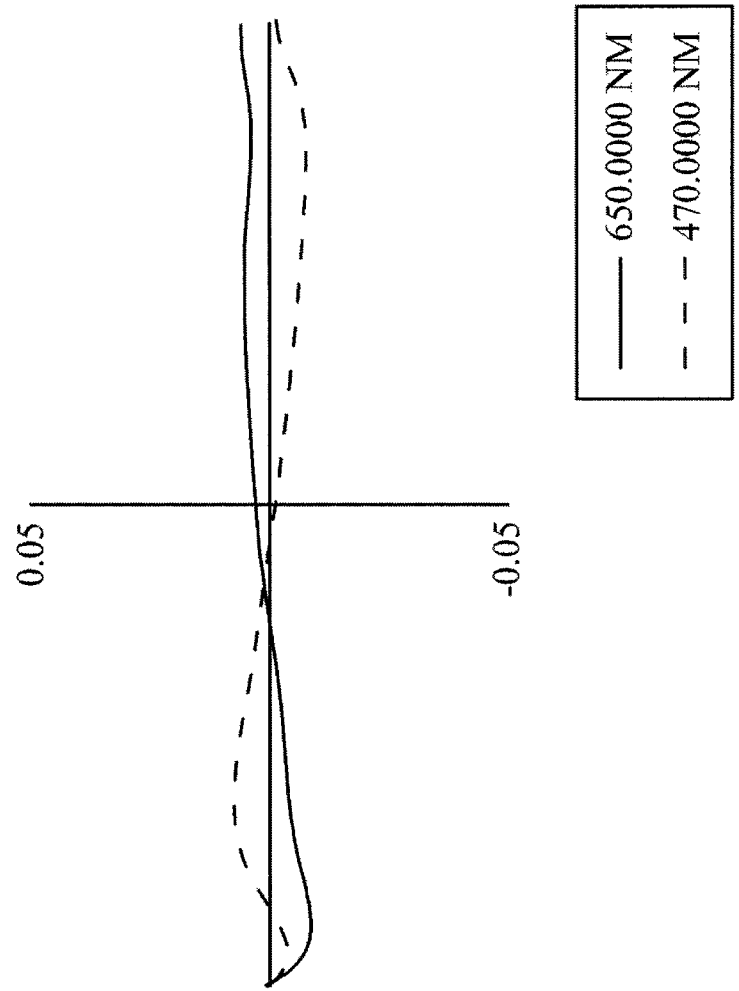
FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the second embodiment of the present disclosure.

Please refer to FIG. 2A and FIG. 2B, wherein FIG. 2A is a schematic view of the optical image capturing system according to the second embodiment of the present invention and FIG. 2B shows the longitudinal spherical aberration curves, astigmatic field curves, and optical distortion curve of the optical image capturing system in the order from left to right according to the second embodiment of the present invention. FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the second embodiment of the present disclosure. As shown in FIG. 2A, in the order from the object-side surface to the image-side surface, the optical image capturing system includes a first lens 210, a second lens 220, a third lens 230, an aperture 200, a fourth lens 240, a fifth lens 250, a sixth lens 260, an Infrared filter 280, an image plane 290, and an image sensing device 292.

The first lens 210 has negative refractive power and is made of glass material. The object-side surface 212 of the first lens 210 is a convex surface and the image-side surface 214 of the first lens 210 is a concave surface.

The second lens 220 has negative refractive power and is made of glass material. The object-side surface 222 of the second lens 220 is a concave surface and the image-side surface 224 of the second lens 220 is a concave surface.

The third lens 230 has positive refractive power and is made of plastic material. The object-side surface 232 of the third lens 230 is a convex surface and the image-side surface 234 of the third lens 230 is a convex surface, and both the object-side surface 232 and the image-side surface 234 are aspheric. Besides, the object-side surface 232 has one inflection point.

The fourth lens 240 has positive refractive power and is made of glass material. The object-side surface 242 of the fourth lens 240 is a convex surface and the image-side surface 244 of the fourth lens 240 is a convex surface.

The fifth lens 250 has negative refractive power and is made of plastic material. The object-side surface 252 of the fifth lens 250 is a concave surface and the image-side surface 254 of the fifth lens 250 is a concave surface.

The sixth lens 260 has positive refractive power and is made of plastic material. The object-side surface 262 of the sixth lens 260 is a convex surface and the image-side surface 264 of the sixth lens 260 is a convex surface. Both the object-side surface 262 and the image-side surface 264 are aspheric. Wherein the image-side surface 264 has one inflection point. Hereby, the configuration is beneficial to shorten the back focal length of the optical image capturing system so as to keep its miniaturization. Besides, it can reduce the incident angle of the off-axis rays effectively, and thereby further correcting the off-axis aberration.

The infrared filter 280 is made of glass material and is disposed between the sixth lens 260 and the image plane 290. The infrared filter 280 does not affect the focal length of the optical image capturing system.

The contents in Tables 3 and 4 below should be incorporated into the reference of the present embodiment.

In the second embodiment, the form of the aspheric surface equation therein is presented as that in the first embodiment. Besides, the definition of parameters in the following tables is equivalent to that in the first embodiment, so that the repetitive details are not stated here.

The following conditional values may be obtained according to the data in Table 3 and Table 4.

| Second Embodiment (Primary reference wavelength = 555 nm) | | | | | |
|---|---|---|---|---|---|
| $\|f/f1\|$ | $\|f/f2\|$ | $\|f/f3\|$ | $\|f/f4\|$ | $\|f/f5\|$ | $\|f/f6\|$ |
| 0.20091 | 0.31507 | 0.38608 | 0.38425 | 0.70304 | 0.44273 |
| ΣPPR | ΣNPR | ΣPPR/\|ΣNPR\| | IN12/f | IN56/f | TP4/(IN34 + TP4 + IN45) |
| 1.21306 | 1.21902 | 0.99511 | 1.23100 | 0.24394 | 0.90537 |
| \|f1/f2\| | \|f2/f3\| | (TP1 + IN12)/TP2 | | (TP6 + IN56)/TP5 | |
| 1.56825 | 1.22536 | 3.65484 | | 3.80308 | |
| HOS | InTL | HOS/HOI | InS/HOS | ODT % | TDT % |
| 24.99340 | 20.84960 | 6.39217 | 0.39623 | −92.74180 | 66.15630 |
| HVT51 | HVT52 | HVT61 | HVT62 | HVT62/HOI | HVT62/HOS |
| 0 | 0 | 0.00000 | 1.83451 | 0.46918 | 0.07340 |
| TP2/ | | | | | |

TABLE 3

Lens Parameters for the Second Embodiment
f(focal length) = 3.142 mm; f/HEP = 1.4; HAF(half angle of view) = 90.5 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 21.21426445 | 0.637 | Glass | 1.801 | 34.97 | −13.522 |
| 2 | | 7.098567039 | 3.344 | | | | |
| 3 | Lens 2 | −40.01728147 | 1.089 | Glass | 1.497 | 81.61 | −8.623 |
| 4 | | 4.854937454 | 2.140 | | | | |
| 5 | Lens 3 | 57.56586305 | 7.880 | Plastic | 1.583 | 30.20 | 7.037 |
| 6 | | −4.220639278 | 0.000 | | | | |
| 7 | Aperture | 1E+18 | 0.172 | | | | |
| 8 | Lens 4 | 5.121166072 | 2.418 | Glass | 1.497 | 81.61 | 7.070 |
| 9 | | −9.506230366 | 0.081 | | | | |
| 10 | Lens 5 | −10.52044003 | 0.643 | Plastic | 1.661 | 20.40 | −3.864 |
| 11 | | 3.495895793 | 0.663 | | | | |
| 12 | Lens 6 | 4.584419122 | 1.783 | Plastic | 1.565 | 58.00 | 6.136 |
| 13 | | −12.38252563 | 0.450 | | | | |
| 14 | Infrared filter | 1E+18 | 0.850 | BK_7 | 1.517 | 64.13 | |
| 15 | | 1E+18 | 2.839 | | | | |
| 16 | Image Plane | 1E+18 | 0.005 | | | | |

Reference Wavelength = 555 nm

TABLE 4

The Aspheric Coefficients of the Second Embodiment
Table 4: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 1.433715E+01 | −3.415751E+00 | 0.000000E+00 |
| A4 | 0.000000E+00 | 0.000000E+00 | 0.000000E+00 | 0.000000E+00 | −1.619398E−03 | −1.586338E−03 | 0.000000E+00 |
| A6 | 0.000000E+00 | 0.000000E+00 | 0.000000E+00 | 0.000000E+00 | −2.037085E−05 | 6.397220E−05 | 0.000000E+00 |
| A8 | 0.000000E+00 | 0.000000E+00 | 0.000000E+00 | 0.000000E+00 | −1.513534E−06 | −1.957446E−06 | 0.000000E+00 |
| A10 | 0.000000E+00 | 0.000000E+00 | 0.000000E+00 | 0.000000E+00 | 1.093331E−07 | 2.843206E−08 | 0.000000E+00 |

| Surface No | 9 | 10 | 11 | 12 | 13 |
|---|---|---|---|---|---|
| k | 0.000000E+00 | 5.878792E+00 | −5.376623E+00 | 5.292625E−02 | −1.984098E+01 |
| A4 | 0.000000E+00 | 6.207822E−03 | 4.712338E−03 | −7.905408E−03 | 2.855748E−03 |
| A6 | 0.000000E+00 | −7.068782E−04 | 5.332094E−05 | 1.449747E−03 | 1.128060E−04 |
| A8 | 0.000000E+00 | 4.977536E−05 | −5.356103E−05 | −9.808073E−05 | 8.715307E−05 |
| A10 | 0.000000E+00 | −1.297946E−06 | 4.050652E−06 | 2.928074E−06 | −3.709981E−06 |

-continued

Second Embodiment (Primary reference wavelength = 555 nm)

| TP3 | TP3/TP4 | InRS61 | InRS62 | \|InRS61\|/TP6 | \|InRS62\|/TP6 |
|---|---|---|---|---|---|
| 0.13822 | 3.25891 | 1.26536 | 0.34972 | 0.70976 | 0.19616 |
| PSTA | PLTA | NSTA | NLTA | SSTA | SLTA |
| −0.001 mm | 0.007 mm | 0.001 mm | 0.001 mm | 0.00039 mm | 0.001 mm |

The values pertaining to the outline curve lengths are obtainable according to the data in Table 3 and Table 4:

Second Embodiment (Primary reference wavelength = 587.5 nm)

| ARE | ½(HEP) | ARE value | ARE − ½(HEP) | 2(ARE/HEP) % | TP | ARE/TP (%) |
|---|---|---|---|---|---|---|
| 11 | 0.970 | 0.970 | 0.00007 | 100.01% | 0.637 | 152.40% |
| 12 | 0.970 | 0.973 | 0.00278 | 100.29% | 0.637 | 152.83% |
| 21 | 0.970 | 0.970 | −0.00017 | 99.98% | 1.089 | 89.06% |
| 22 | 0.970 | 0.977 | 0.00630 | 100.65% | 1.089 | 89.66% |
| 31 | 0.970 | 0.970 | −0.00024 | 99.98% | 7.880 | 12.31% |
| 32 | 0.970 | 0.978 | 0.00785 | 100.81% | 7.880 | 12.41% |
| 41 | 0.970 | 0.976 | 0.00563 | 100.58% | 2.418 | 40.36% |
| 42 | 0.970 | 0.972 | 0.00142 | 100.15% | 2.418 | 40.19% |
| 51 | 0.970 | 0.971 | 0.00081 | 100.08% | 0.643 | 151.02% |
| 52 | 0.970 | 0.981 | 0.01088 | 101.12% | 0.643 | 152.58% |
| 61 | 0.970 | 0.976 | 0.00618 | 100.64% | 1.783 | 54.77% |
| 62 | 0.970 | 0.971 | 0.00050 | 100.05% | 1.783 | 54.45% |
| ARS | EHD | ARS value | ARS − EHD | (ARS/EHD)% | TP | ARS/TP (%) |
| 11 | 8.195 | 8.414 | 0.21870 | 102.67% | 0.637 | 1321.49% |
| 12 | 5.692 | 6.604 | 0.91232 | 116.03% | 0.637 | 1037.30% |
| 21 | 5.556 | 5.574 | 0.01785 | 100.32% | 1.089 | 511.74% |
| 22 | 3.796 | 4.357 | 0.56082 | 114.77% | 1.089 | 399.97% |
| 31 | 3.783 | 3.810 | 0.02750 | 100.73% | 7.880 | 48.35% |
| 32 | 3.574 | 3.860 | 0.28584 | 108.00% | 7.880 | 48.98% |
| 41 | 3.159 | 3.404 | 0.24497 | 107.75% | 2.418 | 140.79% |
| 42 | 3.105 | 3.163 | 0.05756 | 101.85% | 2.418 | 130.81% |
| 51 | 3.009 | 3.025 | 0.01548 | 100.51% | 0.643 | 470.36% |
| 52 | 2.820 | 3.041 | 0.22022 | 107.81% | 0.643 | 472.85% |
| 61 | 3.225 | 3.600 | 0.37515 | 111.63% | 1.783 | 201.93% |
| 62 | 3.020 | 3.159 | 0.13863 | 104.59% | 1.783 | 177.20% |

The following conditional values may be obtained according to the data in Table 3 and Table 4.

Values Related to Inflection Point of Second Embodiment (Primary Reference Wavelength = 555 nm)

| HIF311 | 0.9342 | HIF311/HOI | 0.2389 | SGI311 | 0.0063 | \|SGI311\|/(\|SGI311\| + TP3) | 0.0008 |
|---|---|---|---|---|---|---|---|
| HIF621 | 1.1665 | HIF621/HOI | 0.2983 | SGI621 | −0.0470 | \|SGI621\|/(\|SGI621\| + TP6) | 0.0257 |

Third Embodiment

Figure 3A:
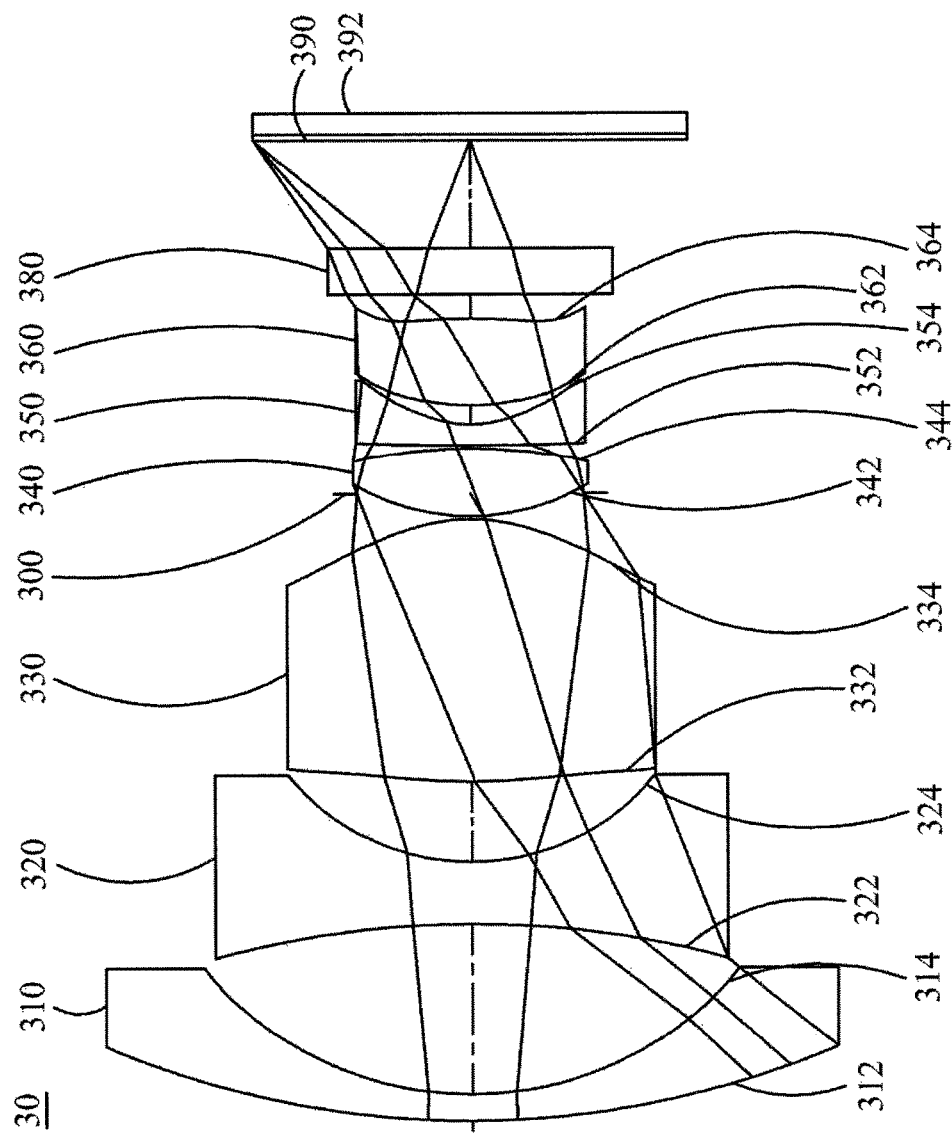
FIG. 3A is a schematic view of the optical image capturing system according to the third embodiment of the present invention.
Figure 3B:
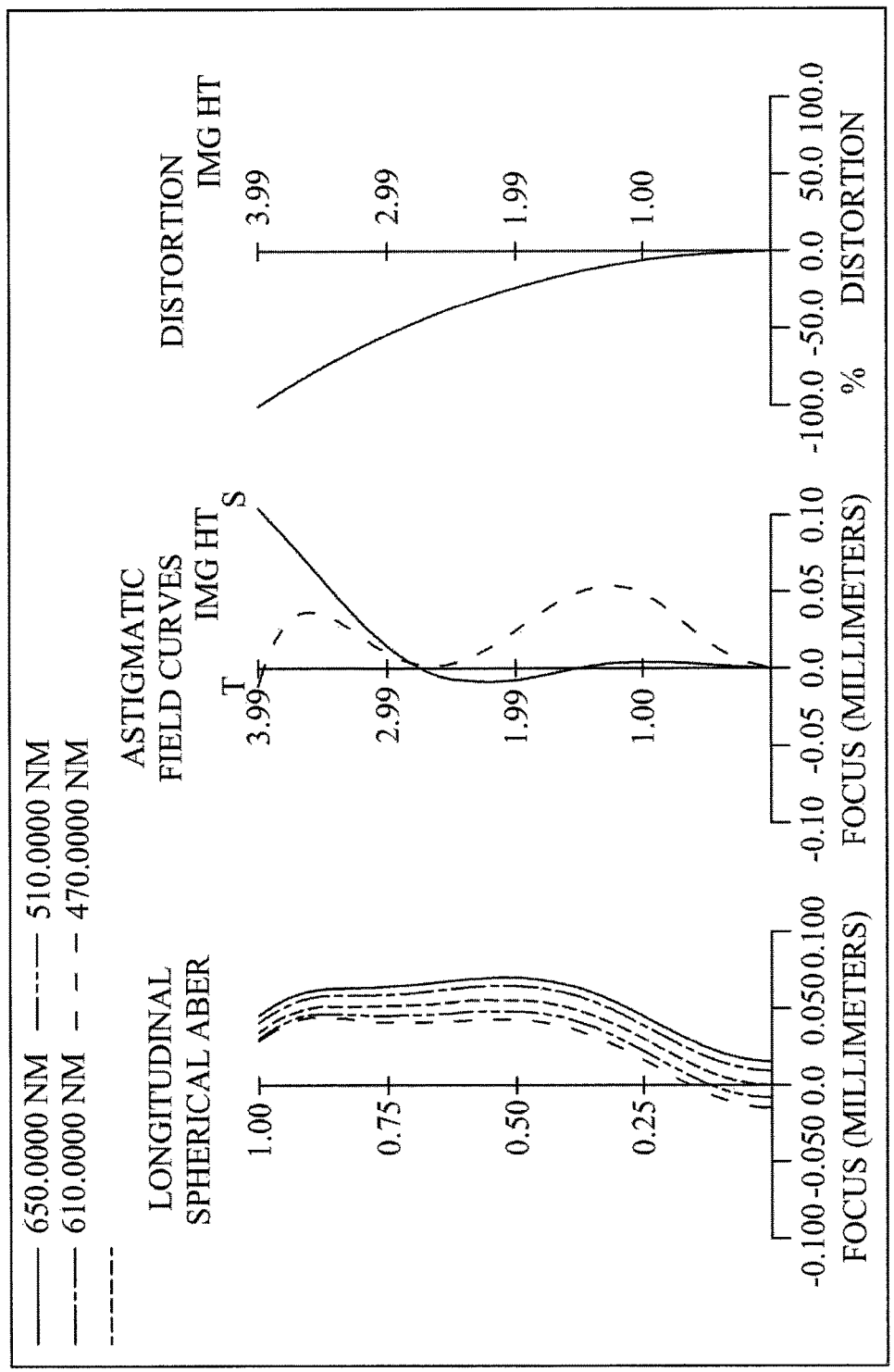
FIG. 3B shows the longitudinal spherical aberration curves, astigmatic field curves, and optical distortion curve of the optical image capturing system in the order from left to right according to the third embodiment of the present invention.
Figure 3C:
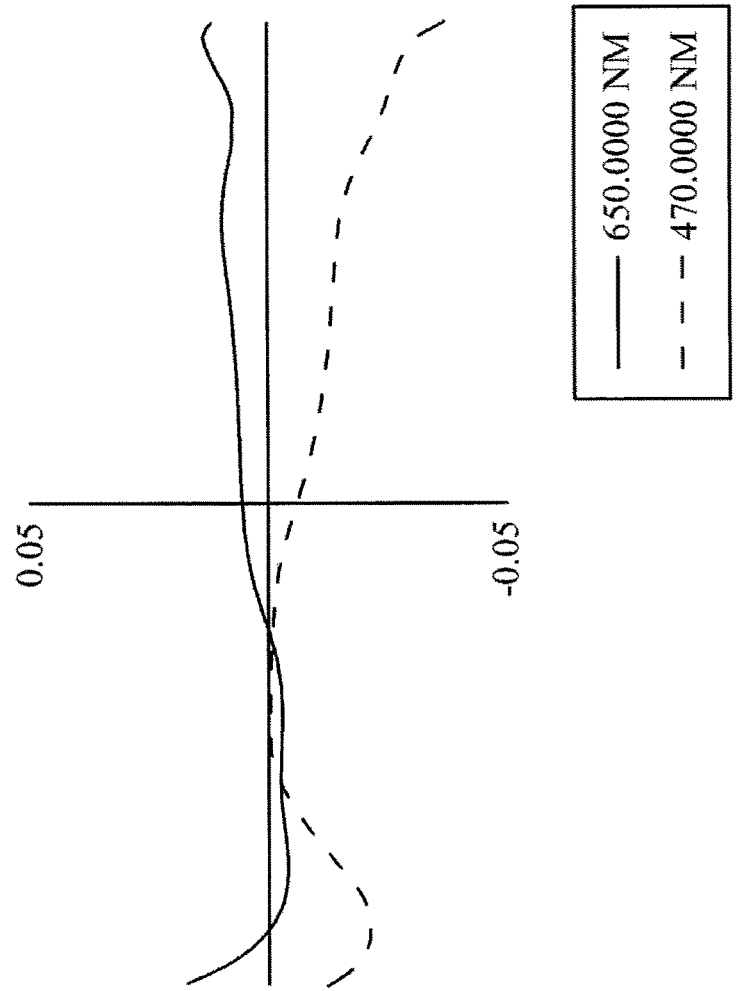
FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the third embodiment of the present disclosure.

Please refer to FIG. 3A and FIG. 3B, wherein FIG. 3A is a schematic view of the optical image capturing system according to the third embodiment of the present invention and FIG. 3B shows the longitudinal spherical aberration curves, astigmatic field curves, and optical distortion curve of the optical image capturing system in the order from left to right according to the third embodiment of the present invention. FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the third embodiment of the present disclosure. As shown in FIG. 3A, in the order from an object-side surface to an image-side surface, the optical image capturing system includes a first lens 310, a second lens 320, a third lens 330, an aperture 300, a fourth lens 340, a fifth lens 350, a sixth lens 360, an Infrared filter 380, an image plane 390, and an image sensing device 392.

The first lens 310 has negative refractive power and is made of glass material. The object-side surface 312 of the first lens 310 is a convex surface and the image-side surface 314 of the first lens 310 is a concave surface.

The second lens 320 has negative refractive power and is made of glass material. The object-side surface 322 of the second lens 320 is a concave surface and the image-side surface 324 of the second lens 320 is a concave surface.

The third lens 330 has positive refractive power and is made of plastic material. The object-side surface 332 of the third lens 330 is a convex surface and the image-side surface 334 of the third lens 330 is a convex surface, and both the object-side surface 332 and the image-side surface 334 are aspheric. Besides, the object-side surface 332 has two inflection points and the image-side surface 334 has one inflection point.

The fourth lens 340 has positive refractive power and is made of glass material. The object-side surface 342 of the fourth lens 340 is a convex surface and the image-side surface 344 of the fourth lens 340 is a convex surface.

The fifth lens 350 has negative refractive power and is made of plastic material. The object-side surface 352 of the fifth lens 350 is a convex surface and the image-side surface 354 of the fifth lens 350 is a concave surface, and both the object-side surface 352 and the image-side surface 354 are aspheric.

The sixth lens 360 has positive refractive power and is made of plastic material. The object-side surface 362 of the sixth lens 360 is a convex surface and the image-side surface 364 of the sixth lens 360 is a convex surface, and both the object-side surface 362 and the image-side surface 364 are aspheric. The image-side surface 364 has one inflection point. Hereby, the configuration is beneficial to shorten the back focal length of the optical image capturing system so as to keep its miniaturization. Besides, the incident angle of the off-axis rays can be reduced effectively, thereby further correcting the off-axis aberration.

The infrared filter 380 is made of glass material and is disposed between the sixth lens 360 and the image plane 390. The infrared filter 380 does not affect the focal length of the optical image capturing system.

The contents in Tables 5 and 6 below should be incorporated into the reference of the present embodiment.

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.23205 | 0.34475 | 0.51413 | 0.39319 | 0.77914 | 0.41874 |
| ΣPPR | ΣNPR | ΣPPR/\|ΣNPR\| | IN12/f | IN56/f | TP4/(IN34 + TP4 + IN45) |
| 0.90732 | 1.50967 | 0.60101 | 1.41517 | 0.15853 | 0.91609 |
| \|f1/f2\| | \|f2/f3\| | (TP1 + IN12)/TP2 | | (TP6 + IN56)/TP5 | |
| 1.48566 | 1.49133 | 3.17819 | | 4.99545 | |
| HOS | InTL | HOS/HOI | InS/HOS | ODT % | TDT % |
| 18.00000 | 14.72360 | 4.71204 | 0.36029 | −90.48770 | 59.41590 |
| HVT51 | HVT52 | HVT61 | HVT62 | HVT62/HOI | HVT62/HOS |

TABLE 5

Lens Parameters for the Third Embodiment
f(focal length) = 2.21938 mm; f/HEP =1.4; HAF(half angle of view) = 90.5 deg

| Surface No | Curvature Radius | Thickness (mm) | Material | Refractive Index | Coefficient of Dispersion | Focal Length |
|---|---|---|---|---|---|---|
| 0 | Object | 1E+18 | 1E+18 | | | |
| 1 | Lens 1 | 15.90247917 | 0.484 | Glass | 2.001 | 29.13 | −9.564 |
| 2 | | 5.907388446 | 3.141 | | | | |
| 3 | Lens 2 | −16.47491131 | 1.141 | Glass | 1.497 | 81.61 | −6.438 |
| 4 | | 4.073408342 | 1.469 | | | | |
| 5 | Lens 3 | 9.953191286 | 4.817 | Plastic | 1.583 | 30.20 | 4.317 |
| 6 | | −2.787911065 | 0.463 | | | | |
| 7 | Aperture | 1E+18 | −0.413 | | | | |
| 8 | Lens 4 | 3.855898542 | 1.234 | Glass | 1.497 | 81.61 | 5.645 |
| 9 | | −9.276809219 | 0.063 | | | | |
| 10 | Lens 5 | 102.004372 | 0.388 | Plastic | 1.661 | 20.40 | −2.849 |
| 11 | | 1.861829133 | 0.352 | | | | |
| 12 | Lens 6 | 4.255547523 | 1.585 | Plastic | 1.565 | 58.00 | 5.300 |
| 13 | | −8.838548876 | 0.450 | | | | |
| 14 | Infrared filter | 1E+18 | 0.850 | BK_7 | 1.517 | 64.13 | |
| 15 | | 1E+18 | 1.933 | | | | |
| 16 | Image Plane | 1E+18 | 0.044 | | | | |

Reference Wavelength = 555 nm

TABLE 6

The Aspheric Coefficients of the Third Embodiment
Table 6: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | −4.164013E+01 | −5.021308E+00 | 0.000000E+00 |
| A4 | 0.000000E+00 | 0.000000E+00 | 0.000000E+00 | 0.000000E+00 | 1.204053E−03 | −4.916971E−03 | 0.000000E+00 |
| A6 | 0.000000E+00 | 0.000000E+00 | 0.000000E+00 | 0.000000E+00 | −6.726454E−04 | 5.713308E−04 | 0.000000E+00 |
| A8 | 0.000000E+00 | 0.000000E+00 | 0.000000E+00 | 0.000000E+00 | 5.631708E−05 | −4.293139E−05 | 0.000000E+00 |
| A10 | 0.000000E+00 | 0.000000E+00 | 0.000000E+00 | 0.000000E+00 | −8.542224E−07 | 1.901180E−06 | 0.000000E+00 |

| Surface No | 9 | 10 | 11 | 12 | 13 |
|---|---|---|---|---|---|
| k | 0.000000E+00 | 5.000000E+01 | −3.222771E+00 | −1.214345E+01 | −5.000000E+01 |
| A4 | 0.000000E+00 | 4.934973E−03 | 2.793600E−03 | 7.062360E−03 | 9.632811E−03 |
| A6 | 0.000000E+00 | −2.437947E−03 | 4.685279E−03 | 6.742068E−03 | 1.194306E−03 |
| A8 | 0.000000E+00 | 4.878069E−04 | −1.528185E−03 | −1.608491E−03 | 1.458487E−03 |
| A10 | 0.000000E+00 | −3.074829E−05 | 1.941443E−04 | 1.141774E−04 | −2.413881E−04 |

-continued

Third Embodiment (Primary Reference Wavelength = 555 nm)

| 0 TP2/TP3 | 0 TP3/TP4 | 0.00000 InRS61 | 1.15217 InRS62 | 0.30162 \|InRS61\|/TP6 | 0.06401 \|InRS62\|/TP6 |
|---|---|---|---|---|---|
| 0.23680 | 3.90189 | 0.56537 | 0.21306 | 0.35676 | 0.13445 |
| PSTA | PLTA | NSTA | NLTA | SSTA | SLTA |
| −0.040 mm | 0.013 mm | −0.013 mm | 0.019 mm | −0.004 mm | 0.002 mm |

The values pertaining to the outline curve lengths are obtainable according to the data in Table 5 and Table 6:

Third Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.793 | 0.792 | −0.00031 | 99.96% | 0.484 | 163.58% |
| 12 | 0.793 | 0.794 | 0.00176 | 100.22% | 0.484 | 164.01% |
| 21 | 0.793 | 0.792 | −0.00033 | 99.96% | 1.141 | 69.46% |
| 22 | 0.793 | 0.797 | 0.00444 | 100.56% | 1.141 | 69.88% |
| 31 | 0.793 | 0.793 | 0.00011 | 100.01% | 4.817 | 16.46% |
| 32 | 0.793 | 0.801 | 0.00861 | 101.09% | 4.817 | 16.63% |
| 41 | 0.793 | 0.798 | 0.00504 | 100.64% | 1.234 | 64.62% |
| 42 | 0.793 | 0.793 | 0.00033 | 100.04% | 1.234 | 64.23% |
| 51 | 0.793 | 0.792 | −0.00062 | 99.92% | 0.388 | 204.31% |
| 52 | 0.793 | 0.812 | 0.01897 | 102.39% | 0.388 | 209.36% |
| 61 | 0.793 | 0.796 | 0.00367 | 100.46% | 1.585 | 50.25% |
| 62 | 0.793 | 0.793 | −0.00002 | 100.00% | 1.585 | 50.02% |
| ARS | EHD | ARS value | ARS − EHD | (ARS/EHD)% | TP | ARS/TP (%) |
| 11 | 6.570 | 6.773 | 0.20281 | 103.09% | 0.484 | 1398.31% |
| 12 | 4.745 | 5.508 | 0.76335 | 116.09% | 0.484 | 1137.19% |
| 21 | 4.647 | 4.710 | 0.06320 | 101.36% | 1.141 | 412.92% |
| 22 | 3.296 | 3.838 | 0.54262 | 116.46% | 1.141 | 336.50% |
| 31 | 3.296 | 3.308 | 0.01196 | 100.36% | 4.817 | 68.67% |
| 32 | 2.983 | 3.213 | 0.22951 | 107.69% | 4.817 | 66.70% |
| 41 | 2.074 | 2.189 | 0.11505 | 105.55% | 1.234 | 177.29% |
| 42 | 2.072 | 2.090 | 0.01757 | 100.85% | 1.234 | 169.27% |
| 51 | 2.031 | 2.031 | −0.00044 | 99.98% | 0.388 | 523.57% |
| 52 | 1.919 | 2.126 | 0.20725 | 110.80% | 0.388 | 548.49% |
| 61 | 2.007 | 2.125 | 0.11838 | 105.90% | 1.585 | 134.12% |
| 62 | 2.052 | 2.113 | 0.06112 | 102.98% | 1.585 | 133.36% |

The following values for the conditional expressions can be obtained from the data in Table 5 and Table 6.

Values Related to Inflection Point of Third Embodiment (Primary Reference Wavelength = 555 nm)

| HIF311 | 1.5150 | HIF311/HOI | 0.3966 | SGI311 | 0.0961 | \|SGI311\|/(\|SGI311\| + TP3) | 0.0196 |
|---|---|---|---|---|---|---|---|
| HIF312 | 2.5926 | HIF312/HOI | 0.6787 | SGI312 | 0.1832 | \|SGI312\|/(\|SGI312\| + TP3) | 0.0366 |
| HIF321 | 2.7043 | HIF321/HOI | 0.7079 | SGI321 | −0.9456 | \|SGI321\|/(\|SGI321\| + TP3) | 0.1641 |
| HIF621 | 0.7058 | HIF621/HOI | 0.1848 | SGI621 | −0.0236 | \|SGI621\|/(\|SGI621\| + TP6) | 0.0147 |

Fourth Embodiment

Figure 4A:
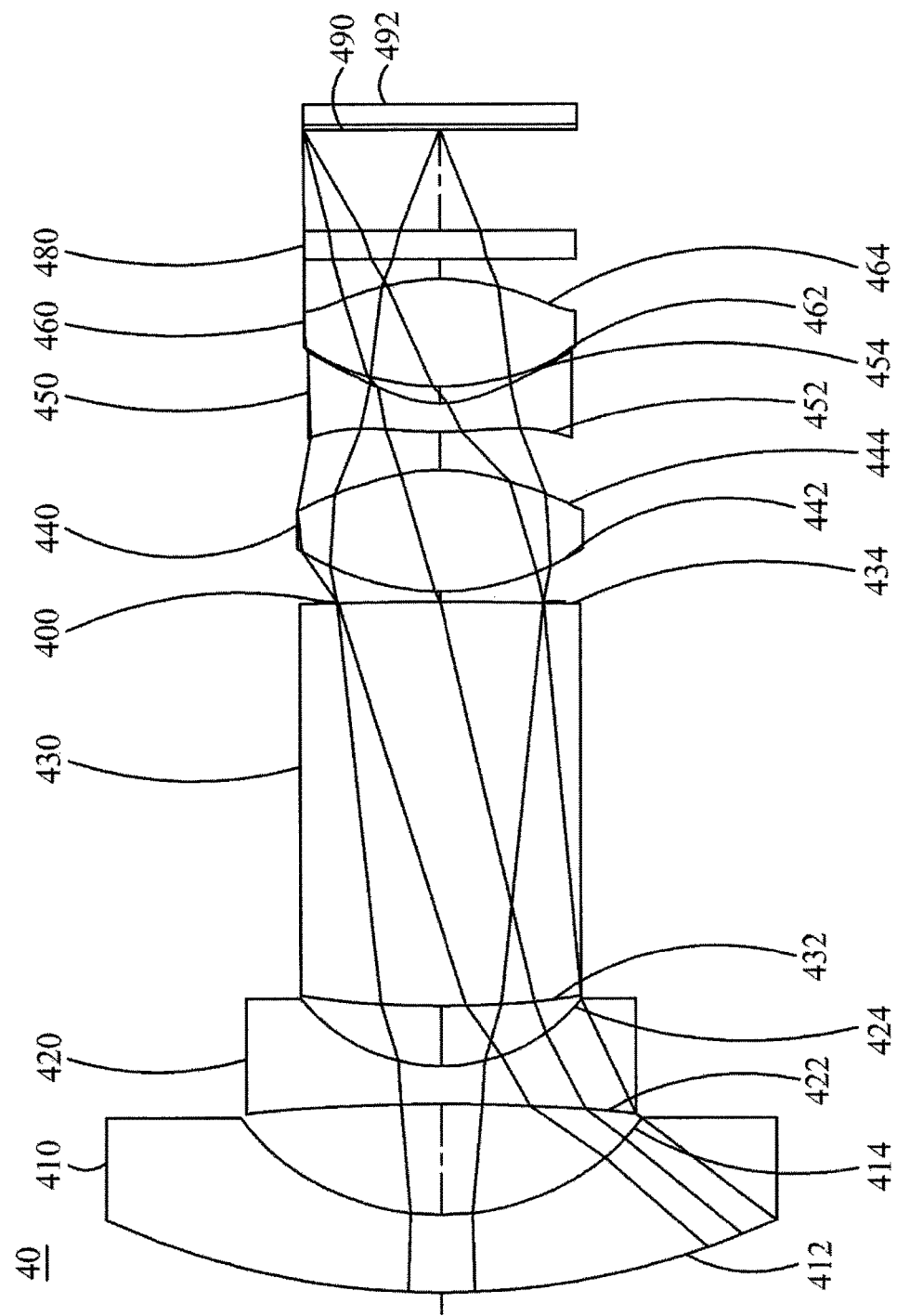
FIG. 4A is a schematic view of the optical image capturing system according to the fourth embodiment of the present invention.
Figure 4B:
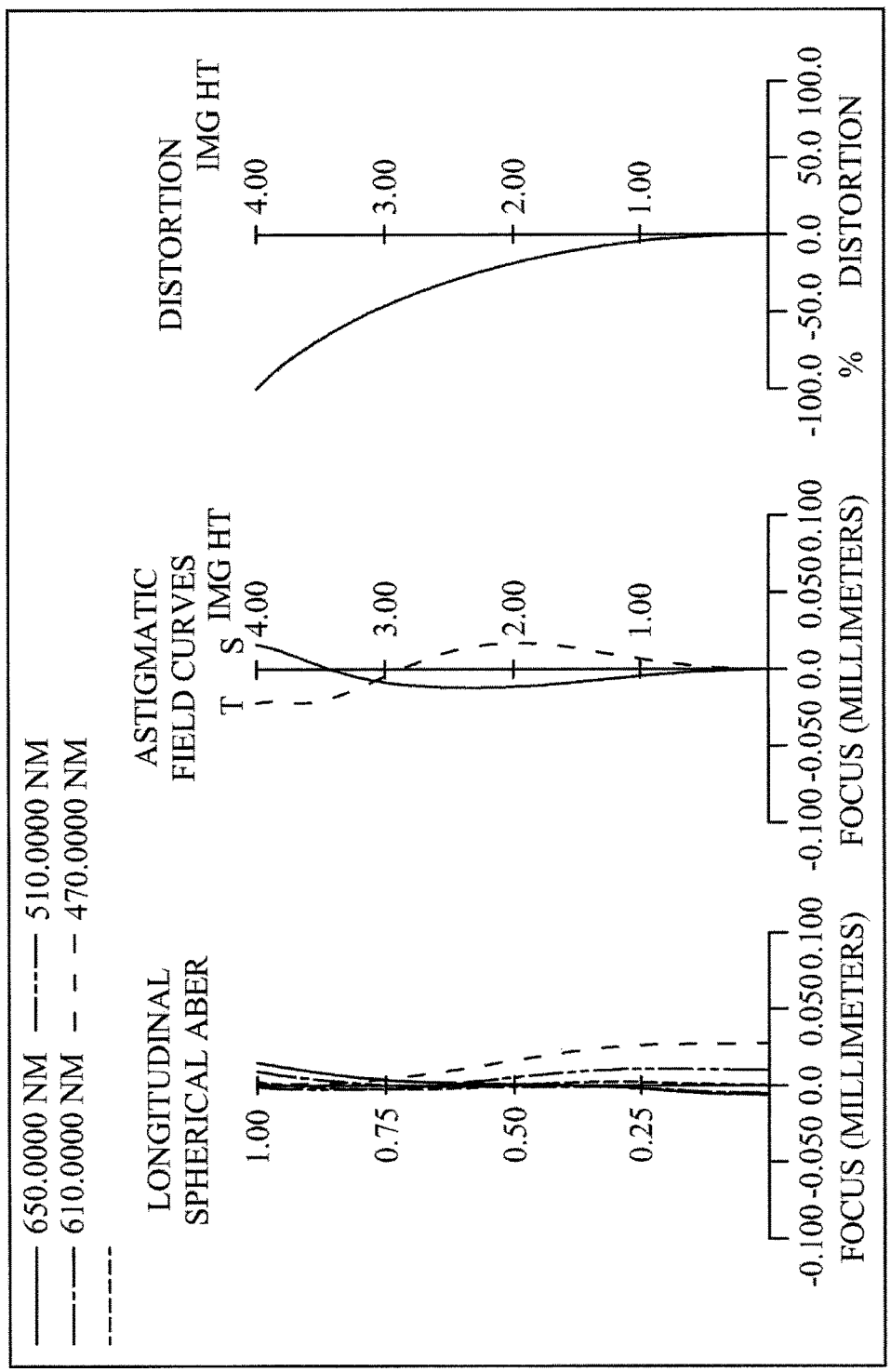
FIG. 4B shows the longitudinal spherical aberration curves, astigmatic field curves, and optical distortion curve of the optical image capturing system in the order from left to right according to the fourth embodiment of the present invention.
Figure 4C:
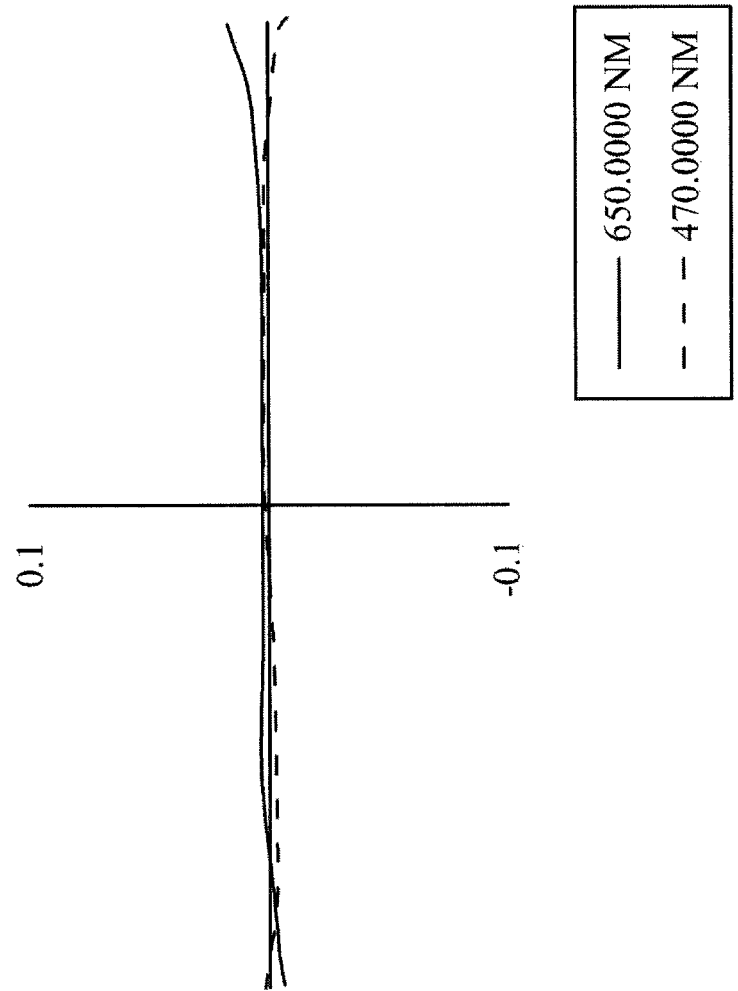
FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fourth embodiment of the present disclosure.

Please refer to FIG. 4A and FIG. 4B, wherein FIG. 4A is a schematic view of the optical image capturing system according to the fourth embodiment of the present invention and FIG. 4B shows the longitudinal spherical aberration curves, astigmatic field curves, and optical distortion curve of the optical image capturing system in the order from left to right according to the fourth embodiment of the present invention. FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fourth embodiment of the present disclosure. As shown in FIG. 4A, in the order from an object-side surface to an image-side surface, the optical image capturing system includes a first lens 410, a second lens 420, a third lens 430, an aperture 400, a fourth lens 440, a fifth lens 450, a sixth lens 460, an Infrared filter 480, an image plane 490, and an image sensing device 492.

The first lens 410 has negative refractive power and is made of glass material. The object-side surface 412 of the first lens 410 is a convex surface and the image-side surface 414 of the first lens 410 is a concave surface.

The second lens 420 has negative refractive power and is made of glass material. The object-side surface 422 of the second lens 420 is a concave surface and the image-side surface 424 of the second lens 420 is a concave surface.

The third lens 430 has positive refractive power and is made of glass material. The object-side surface 432 of the third lens 430 is a convex surface and the image-side surface 434 of the third lens 430 is a convex surface, and both the object-side surface 432 and the image-side surface 434 are aspheric.

The fourth lens 440 has positive refractive power and is made of plastic material. The object-side surface 442 of the fourth lens 440 is a convex surface and the image-side surface 444 of the fourth lens 440 is a convex surface, and both the object-side surface 442 and the image-side surface 444 are aspheric. The object-side surface 442 has one inflection point.

The fifth lens 450 has negative refractive power and is made of plastic material. The object-side surface 452 of the fifth lens 450 is a convex surface and the image-side surface 454 of the fifth lens 450 is a concave surface, and both the object-side surface 452 and the image-side surface 454 are aspheric. The object-side surface 452 has one inflection point.

The sixth lens 460 has positive refractive power and is made of plastic material. The object-side surface 462 of the sixth lens 460 is a convex surface and the image-side surface 464 of the sixth lens 460 is a convex surface, and both the object-side surface 462 and the image-side surface 464 are aspheric. Wherein the image-side surface 464 has one inflection point. Hereby, the configuration is beneficial to shorten the back focal distance of the optical image capturing system so as to keep its miniaturization. Besides, it can reduce the incident angle of the off-axis rays effectively, and thereby further correcting the off-axis aberration.

The infrared filter 480 is made of glass material and is disposed between the sixth lens 460 and the image plane 490. The infrared filter 480 does not affect the focal length of the optical image capturing system.

The contents in Tables 7 and 8 below should be incorporated into the reference of the present embodiment.

TABLE 7

Lens Parameters for the Fourth Embodiment
f(focal length) = 2.669 mm; f/HEP = 1.4; HAF(half angle of view) = 90.5 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 22.56335462 | 2.355 | Glass | 2.001 | 29.13 | −11.512 |
| 2 | | 7.257912803 | 3.320 | | | | |
| 3 | Lens 2 | −56.42036002 | 1.153 | Glass | 1.639 | 44.87 | −7.172 |
| 4 | | 5.052486688 | 1.798 | | | | |
| 5 | Lens 3 | 27.2758751 | 12.183 | Glass | 2.003 | 19.32 | 22.865 |
| 6 | | −118.2829267 | 0.000 | | | | |
| 7 | Aperture | 1E+18 | 0.314 | | | | |
| 8 | Lens 4 | 6.696359777 | 3.638 | Plastic | 1.565 | 58.00 | 5.512 |
| 9 | | −4.705558577 | 1.157 | | | | |
| 10 | Lens 5 | 10.84987481 | 0.866 | Plastic | 1.661 | 20.40 | −5.527 |
| 11 | | 2.663142219 | 0.509 | | | | |
| 12 | Lens 6 | 6.736754475 | 3.225 | Plastic | 1.565 | 58.00 | 6.193 |
| 13 | | −6.058371473 | 0.600 | | | | |
| 14 | Infrared filter | 1E+18 | 0.850 | BK_7 | 1.517 | 64.13 | |
| 15 | | 1E+18 | 3.033 | | | | |
| 16 | Image Plane | 1E+18 | −0.001 | | | | |

Reference Wavelength = 555 nm

TABLE 8

The Aspheric Coefficients of the Fourth Embodiment
Table 8: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | −3.768106E+00 |
| A4 | 0.000000E+00 | 0.000000E+00 | 0.000000E+00 | 0.000000E+00 | 0.000000E+00 | 0.000000E+00 | 1.426978E−03 |
| A6 | 0.000000E+00 | 0.000000E+00 | 0.000000E+00 | 0.000000E+00 | 0.000000E+00 | 0.000000E+00 | −5.741288E−05 |
| A8 | 0.000000E+00 | 0.000000E+00 | 0.000000E+00 | 0.000000E+00 | 0.000000E+00 | 0.000000E+00 | 2.968082E−06 |
| A10 | 0.000000E+00 | 0.000000E+00 | 0.000000E+00 | 0.000000E+00 | 0.000000E+00 | 0.000000E+00 | −1.105026E−07 |

| Surface No | 9 | 10 | 11 | 12 | 13 |
|---|---|---|---|---|---|
| k | −7.148326E+00 | 1.569736E+00 | −3.073345E+00 | −3.792272E+00 | −1.443619E+00 |
| A4 | −7.532314E−04 | −6.068092E−03 | −2.108387E−03 | −6.282872E−04 | −7.283171E−05 |
| A6 | 2.355865E−05 | 1.080458E−04 | 2.098155E−04 | 2.613959E−04 | 3.417008E−05 |
| A8 | 6.197066E−07 | 5.072393E−07 | −7.900326E−06 | −1.405833E−05 | −8.470292E−07 |
| A10 | −8.317662E−08 | 8.884934E−09 | 1.017507E−07 | 2.615049E−07 | 2.025144E−07 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| |f/f1| | |f/f2| | |f/f3| | |f/f4| | |f/f5| | |f/f6| |
| 0.23184 | 0.37216 | 0.11673 | 0.48421 | 0.48291 | 0.43100 |
| ΣPPR | ΣNPR | |ΣNPR|/ΣPPR | IN12/f | IN56/f | TP4/(IN34 + TP4 + IN45) |
| 1.89999 | 0.60400 | 3.14566 | 1.24387 | 0.19077 | 0.71199 |
| |f1/f2| | |f2/f3| | (TP1 + IN12)/TP2 | | (TP6 + IN56)/TP5 | |
| 1.60520 | 0.31366 | 4.92241 | | 4.31292 | |
| HOS | InTL | HOS/HOI | InS/HOS | ODT % | TDT % |
| 35.00000 | 30.51840 | 9.02062 | 0.40547 | −90.71950 | 64.40160 |
| HVT51 | HVT52 | HVT61 | HVT62 | HVT62/HOI | HVT62/HOS |
| 2.14021 | 0 | 0.00000 | 0.00000 | 0.00000 | 0.00000 |
| TP2/TP3 | TP3/TP4 | InRS61 | InRS62 | |InRS61|/TP6 | |InRS62|/TP6 |
| 0.09463 | 3.34897 | 1.14155 | −0.97805 | 0.35394 | 0.30325 |
| PSTA | PLTA | NSTA | NLTA | SSTA | SLTA |
| −0.009 mm | 0.018 mm | 0.002 mm | −0.007 mm | −0.00032 mm | 0.003 mm |

The values pertaining to the outline curve lengths are obtainable according to the data in Table 7 and Table 8:

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.953 | 0.953 | 0.00006 | 100.01% | 2.355 | 40.48% |
| 12 | 0.953 | 0.956 | 0.00254 | 100.27% | 2.355 | 40.58% |
| 21 | 0.953 | 0.953 | −0.00018 | 99.98% | 1.153 | 82.66% |
| 22 | 0.953 | 0.959 | 0.00552 | 100.58% | 1.153 | 83.16% |
| 31 | 0.953 | 0.953 | −0.00003 | 100.00% | 12.183 | 7.82% |
| 32 | 0.953 | 0.953 | −0.00021 | 99.98% | 12.183 | 7.82% |
| 41 | 0.953 | 0.956 | 0.00301 | 100.32% | 3.638 | 26.29% |
| 42 | 0.953 | 0.959 | 0.00552 | 100.58% | 3.638 | 26.35% |
| 51 | 0.953 | 0.954 | 0.00070 | 100.07% | 0.866 | 110.17% |
| 52 | 0.953 | 0.970 | 0.01672 | 101.75% | 0.866 | 112.02% |
| 61 | 0.953 | 0.956 | 0.00281 | 100.29% | 3.225 | 29.64% |
| 62 | 0.953 | 0.957 | 0.00367 | 100.39% | 3.225 | 29.67% |
| ARS | EHD | ARS value | ARS − EHD | (ARS/EHD)% | TP | ARS/TP (%) |
| 11 | 9.808 | 10.147 | 0.33807 | 103.45% | 2.355 | 430.82% |
| 12 | 5.831 | 6.770 | 0.93928 | 116.11% | 2.355 | 287.44% |
| 21 | 5.711 | 5.721 | 0.00960 | 100.17% | 1.153 | 496.21% |
| 22 | 4.072 | 4.734 | 0.66217 | 116.26% | 1.153 | 410.60% |
| 31 | 4.070 | 4.085 | 0.01497 | 100.37% | 12.183 | 33.53% |
| 32 | 2.984 | 2.984 | −0.00017 | 99.99% | 12.183 | 24.50% |
| 41 | 4.004 | 4.230 | 0.22652 | 105.66% | 3.638 | 116.29% |
| 42 | 4.135 | 4.353 | 0.21855 | 105.29% | 3.638 | 119.66% |
| 51 | 3.742 | 3.773 | 0.03141 | 100.84% | 0.866 | 435.79% |
| 52 | 3.820 | 4.174 | 0.35372 | 109.26% | 0.866 | 482.07% |
| 61 | 3.892 | 4.125 | 0.23359 | 106.00% | 3.225 | 127.91% |
| 62 | 3.929 | 4.076 | 0.14752 | 103.76% | 3.225 | 126.38% |

The following values for the conditional expressions can be obtained from the data in Table 7 and Table 8.

| Values Related to Inflection Point of fourth Embodiment (Primary Reference Wavelength = 555 nm) | | | | | | |
|---|---|---|---|---|---|---|
| HIF411 | 3.8336 | HIF411/HOI | 0.9880 | SGI411 | 1.1104 |SGI411|/(|SGI411| + TP4) | 0.2339 |
| HIF511 | 1.1905 | HIF511/HOI | 0.3068 | SGI511 | 0.0539 |SGI511|/(|SGI511| + TP5) | 0.0587 |
| HIF621 | 2.9464 | HIF621/HOI | 0.7594 | SGI621 | −0.6766 |SGI621|/(|SGI621| + TP6) | 0.1734 |

Fifth Embodiment

Figure 5A:
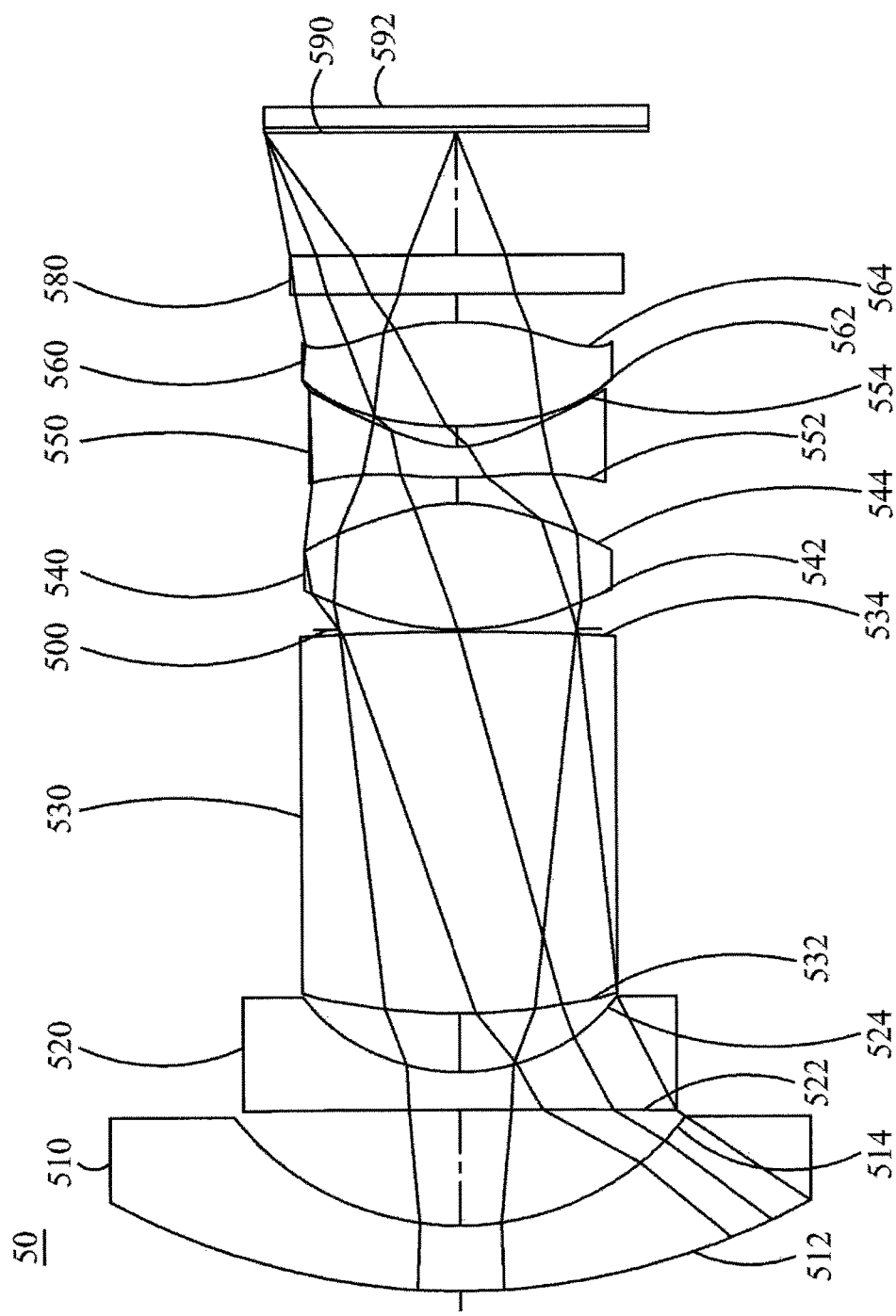
FIG. 5A is a schematic view of the optical image capturing system according to the fifth embodiment of the present invention.
Figure 5B:
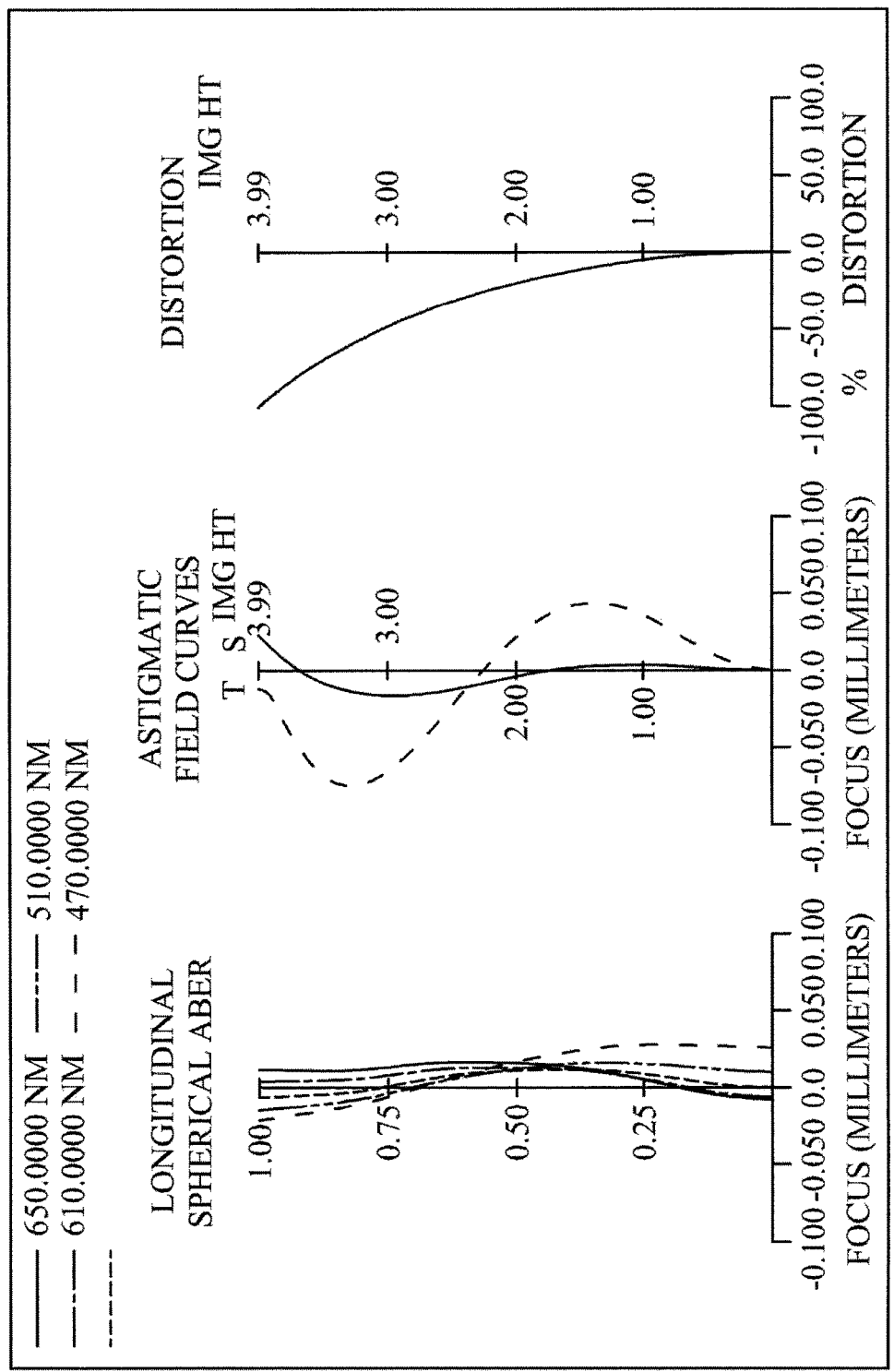
FIG. 5B shows the longitudinal spherical aberration curves, astigmatic field curves, and optical distortion curve of the optical image capturing system in the order from left to right according to the fifth embodiment of the present invention.

Please refer to FIG. 5A and FIG. 5B, wherein FIG. 5A is a schematic view of the optical image capturing system according to the fifth embodiment of the present invention and FIG. 5B shows the longitudinal spherical aberration curves, astigmatic field curves, and optical distortion curve of the optical image capturing system in the order from left to right according to the fifth embodiment of the present invention. FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fifth embodiment of the present disclosure. As shown in FIG. 5A, in the order from an object-side surface to an image-side surface, the optical image capturing system includes a first lens 510, a second lens 520, a third lens 530, an aperture 500, a fourth lens 540, a fifth lens 550, a sixth lens 560, an Infrared filter 580, an image plane 590, and an image sensing device 592.

The first lens 510 has negative refractive power and is made of glass material. The object-side surface 512 of the first lens 510 is a convex surface and the image-side surface 514 of the first lens 510 is a concave surface.

The second lens 520 has negative refractive power and is made of glass material. The object-side surface 522 of the second lens 520 is a concave surface and the image-side surface 524 of the second lens 520 is a concave surface.

The third lens 530 has positive refractive power and is made of glass material. The object-side surface 532 of the third lens 530 is a convex surface and the image-side surface 534 of the third lens 530 is a convex surface, and both object-side surface 532 and image-side surface 534 are aspheric.

The fourth lens 540 has positive refractive power and is made of plastic material. The object-side surface 542 of the fourth lens 540 is a convex surface and the image-side surface 544 of the fourth lens 540 is a convex surface, and both object-side surface 542 and image-side surface 544 are aspheric. The object-side surface 542 of the fourth lens 540 has one inflection point.

The fifth lens 550 has negative refractive power and is made of plastic material. The object-side surface 552 of the fifth lens 550 is a convex surface and the image-side surface 554 of the fifth lens 550 is a concave surface, and both object-side surface 552 and image-side surface 554 are aspheric. The object-side surface 552 of the fifth lens 550 has one inflection point.

The sixth lens 560 has positive refractive power and is made of plastic material. The object-side surface 562 of the sixth lens 560 is a convex surface and the image-side surface 564 of the sixth lens 560 is a convex surface, and both object-side surface 562 and image-side surface 564 are aspheric. The image-side surface 564 has one inflection point. Hereby, the configuration is beneficial to shorten the back focal distance of the optical image capturing system so as to keep its miniaturization. Besides, it can reduce the incident angle of the off-axis rays effectively, and thereby further correcting the off-axis aberration.

The infrared filter 580 is made of glass material and is disposed between the sixth lens 560 and the image plane 590. The infrared filter 580 does not affect the focal length of the optical image capturing system.

The contents in Tables 9 and 10 below should be incorporated into the reference of the present embodiment.

TABLE 9

Lens Parameters for the Fifth Embodiment
f(focal length) = 2.496 mm; f/HEP = 1.4; HAF(half angle of view) = 90.5 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 14.6420241 | 1.398 | Glass | 2.001 | 29.13 | −10.501 |
| 2 | | 5.846671567 | 2.494 | | | | |
| 3 | Lens 2 | −308.4207879 | 0.830 | Glass | 1.850 | 32.27 | −4.687 |
| 4 | | 4.06565063 | 1.275 | | | | |
| 5 | Lens 3 | 12.76666487 | 8.232 | Glass | 2.003 | 19.32 | 10.666 |
| 6 | | −47.2085332 | 0.050 | | | | |
| 7 | Aperture | 1E+18 | 0.000 | | | | |
| 8 | Lens 4 | 5.692773045 | 2.732 | Plastic | 1.565 | 58.00 | 4.045 |
| 9 | | −3.171774212 | 0.558 | | | | |
| 10 | Lens 5 | 9.552531801 | 0.664 | Plastic | 1.661 | 20.40 | −4.105 |
| 11 | | 2.068505092 | 0.438 | | | | |
| 12 | Lens 6 | 6.629269297 | 2.235 | Plastic | 1.565 | 58.00 | 5.470 |
| 13 | | −5.113316213 | 0.600 | | | | |
| 14 | Infrared filter | 1E+18 | 0.850 | BK_7 | 1.517 | 64.13 | |
| 15 | | 1E+18 | 2.643 | | | | |
| 16 | Image Plane | 1E+18 | 0.000 | | | | |

Reference Wavelength = 555 nm

TABLE 10

The Aspheric Coefficients of the Fifth Embodiment
Table 10: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 1.051654E+00 |
| A4 | 0.000000E+00 | 0.000000E+00 | 0.000000E+00 | 0.000000E+00 | 0.000000E+00 | 0.000000E+00 | −6.823109E−04 |
| A6 | 0.000000E+00 | 0.000000E+00 | 0.000000E+00 | 0.000000E+00 | 0.000000E+00 | 0.000000E+00 | −1.686991E−04 |
| A8 | 0.000000E+00 | 0.000000E+00 | 0.000000E+00 | 0.000000E+00 | 0.000000E+00 | 0.000000E+00 | 1.429560E−05 |
| A10 | 0.000000E+00 | 0.000000E+00 | 0.000000E+00 | 0.000000E+00 | 0.000000E+00 | 0.000000E+00 | −1.547541E−06 |

| Surface No | 9 | 10 | 11 | 12 | 13 |
|---|---|---|---|---|---|
| k | −7.849277E+00 | 1.310465E+00 | −4.245057E+00 | −3.044783E+01 | −2.442910E+00 |
| A4 | −1.954580E−03 | −9.587133E−03 | 3.998934E−04 | 5.604758E−03 | −7.205413E−04 |
| A6 | 8.317525E−06 | −3.230370E−04 | −1.343557E−04 | 3.133386E−04 | 3.361519E−04 |
| A8 | 1.669924E−05 | 1.103120E−04 | 2.773608E−05 | −6.368741E−05 | −1.237284E−05 |
| A10 | −1.648698E−06 | −5.142187E−06 | −1.180183E−06 | 3.274685E−06 | 2.710031E−06 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.23766 | 0.53243 | 0.23398 | 0.61702 | 0.60794 | 0.45627 |
| ΣPPR | ΣNPR | \|ΣNPR\| | IN12/f | IN56/f | ΣPPR/ TP4/ (IN34 + TP4 + IN45) |
| 1.30726 | 1.37803 | 0.94865 | 0.99940 | 0.17546 | 0.81798 |
| \|f1/f2\| | \|f2/f3\| | (TP1 + IN12)/TP2 | | (TP6 + IN56)/TP5 | |
| 2.24033 | 0.43945 | 4.68948 | | 4.02704 | |
| HOS | InTL | HOS/HOI | InS/HOS | ODT % | TDT % |
| 25.00000 | 20.90650 | 6.47668 | 0.42884 | −90.26980 | 62.98400 |
| HVT51 | HVT52 | HVT61 | HVT62 | HVT62/HOI | HVT62/HOS |
| 1.6947 | 0 | 0.00000 | 2.81943 | 0.73042 | 0.11278 |
| TP2/TP3 | TP3/TP4 | InRS61 | InRS62 | \|InRS61\|/TP6 | \|InRS62\|/ TP6 |
| 0.10084 | 3.01276 | 0.96241 | −0.48689 | 0.43052 | 0.21781 |
| PSTA | PLTA | NSTA | NLTA | SSTA | SLTA |
| −0.046 mm | 0.036 mm | 0.003 mm | −0.012 mm | −0.002 mm | 0.010 mm |

The values pertaining to the outline curve lengths are obtainable according to the data in Table 9 and Table 10:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.891 | 0.892 | 0.00022 | 100.03% | 1.398 | 63.76% |
| 12 | 0.891 | 0.894 | 0.00316 | 100.35% | 1.398 | 63.97% |
| 21 | 0.891 | 0.891 | −0.00033 | 99.96% | 0.830 | 107.34% |
| 22 | 0.891 | 0.898 | 0.00696 | 100.78% | 0.830 | 108.22% |
| 31 | 0.891 | 0.892 | 0.00040 | 100.04% | 8.232 | 10.83% |
| 32 | 0.891 | 0.891 | −0.00027 | 99.97% | 8.232 | 10.82% |
| 41 | 0.891 | 0.895 | 0.00335 | 100.38% | 2.732 | 32.74% |
| 42 | 0.891 | 0.900 | 0.00879 | 100.99% | 2.732 | 32.94% |
| 51 | 0.891 | 0.892 | 0.00057 | 100.06% | 0.664 | 134.35% |
| 52 | 0.891 | 0.911 | 0.01989 | 102.23% | 0.664 | 137.26% |
| 61 | 0.891 | 0.893 | 0.00208 | 100.23% | 2.235 | 39.97% |
| 62 | 0.891 | 0.895 | 0.00409 | 100.46% | 2.235 | 40.06% |
| ARS | EHD | ARS value | ARS − EHD | (ARS/EHD)% | TP | ARS/TP (%) |
| 11 | 7.327 | 7.672 | 0.34566 | 104.72% | 1.398 | 548.70% |
| 12 | 4.694 | 5.449 | 0.75523 | 116.09% | 1.398 | 389.73% |
| 21 | 4.535 | 4.534 | −0.00037 | 99.99% | 0.830 | 546.25% |
| 22 | 3.272 | 3.803 | 0.53053 | 116.21% | 0.830 | 458.13% |
| 31 | 3.275 | 3.312 | 0.03673 | 101.12% | 8.232 | 40.23% |
| 32 | 2.490 | 2.490 | 0.00055 | 100.02% | 8.232 | 30.25% |
| 41 | 3.027 | 3.157 | 0.12947 | 104.28% | 2.732 | 115.54% |
| 42 | 3.189 | 3.386 | 0.19691 | 106.18% | 2.732 | 123.91% |
| 51 | 3.016 | 3.030 | 0.01456 | 100.48% | 0.664 | 456.50% |
| 52 | 3.067 | 3.338 | 0.27059 | 108.82% | 0.664 | 502.83% |
| 61 | 3.235 | 3.477 | 0.24152 | 107.47% | 2.235 | 155.52% |
| 62 | 3.164 | 3.243 | 0.07982 | 102.52% | 2.235 | 145.09% |

The following values for the conditional expressions can be obtained from the data in Table 9 and Table 10.

| Values Related to Inflection Point of Fifth Embodiment (Primary Reference Wavelength = 555 nm) | | | | | | |
|---|---|---|---|---|---|---|
| HIF411 | 2.7607 | HIF411/HOI | 0.7152 | SGI411 | 0.6728 \|SGI411\|/(\|SGI411\| + TP4) | 0.1976 |
| HIF511 | 0.9542 | HIF511/HOI | 0.2472 | SGI511 | 0.0398 \|SGI511\|/(\|SGI511\| + TP5) | 0.0566 |
| HIF621 | 2.0003 | HIF621/HOI | 0.5182 | SGI621 | −0.3621 \|SGI621\|/(\|SGI621\| + TP6) | 0.1394 |

Sixth Embodiment

Figure 6A:
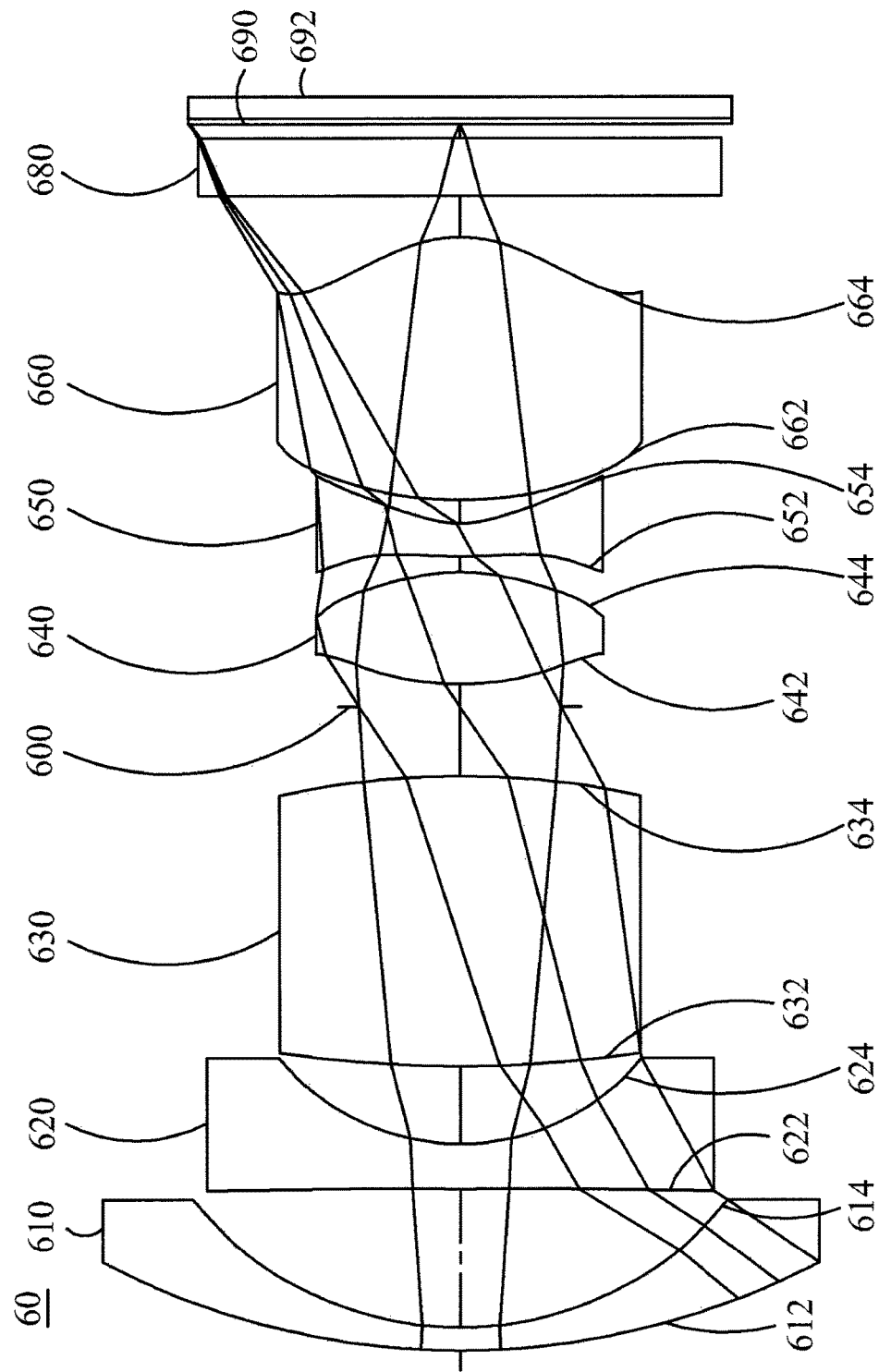
FIG. 6A is a schematic view of the optical image capturing system according to the sixth embodiment of the present invention.
Figure 6B:
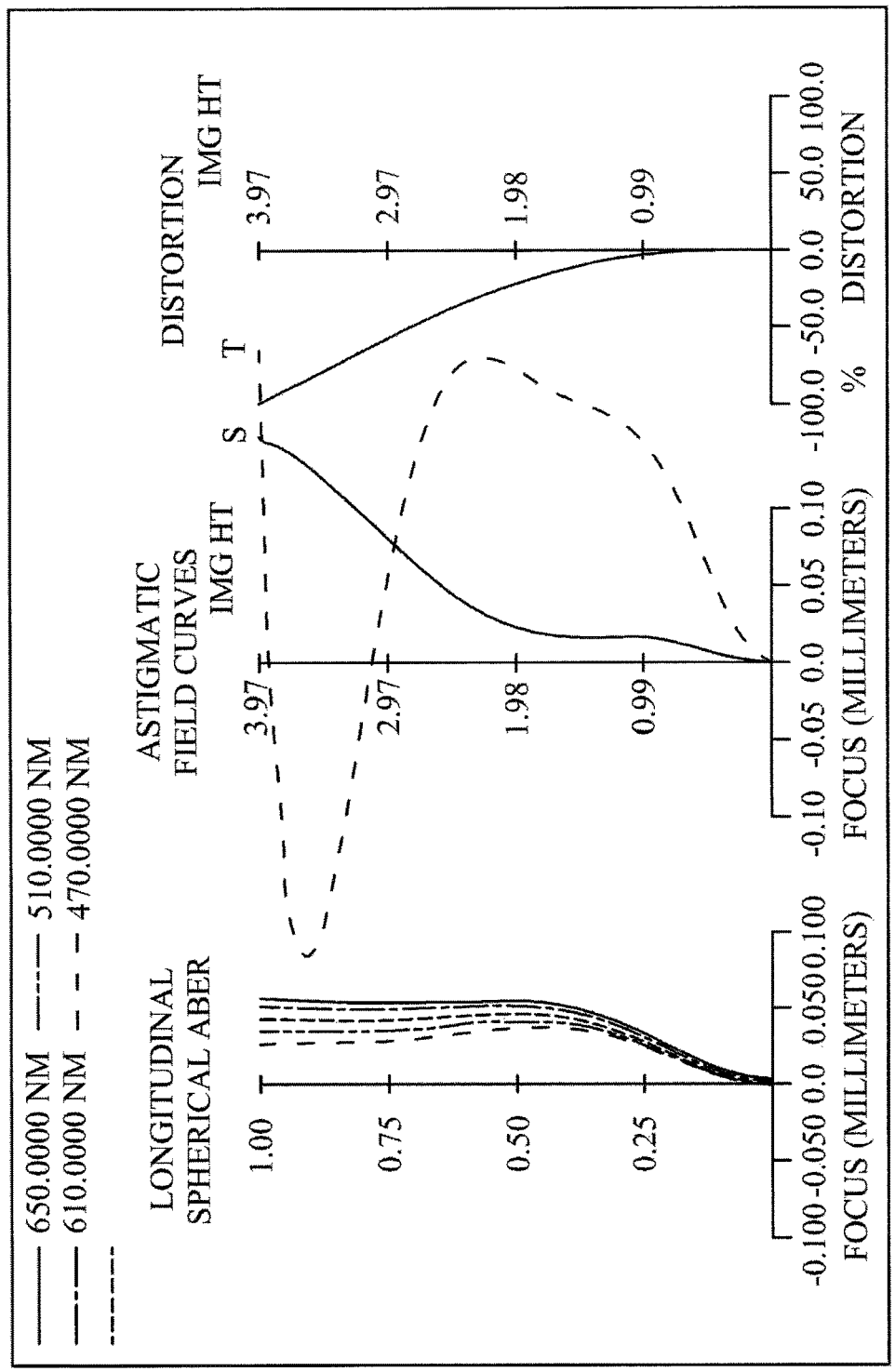
FIG. 6B shows the longitudinal spherical aberration curves, astigmatic field curves, and optical distortion curve of the optical image capturing system in the order from left to right according to the sixth embodiment of the present invention.
Figure 6C:
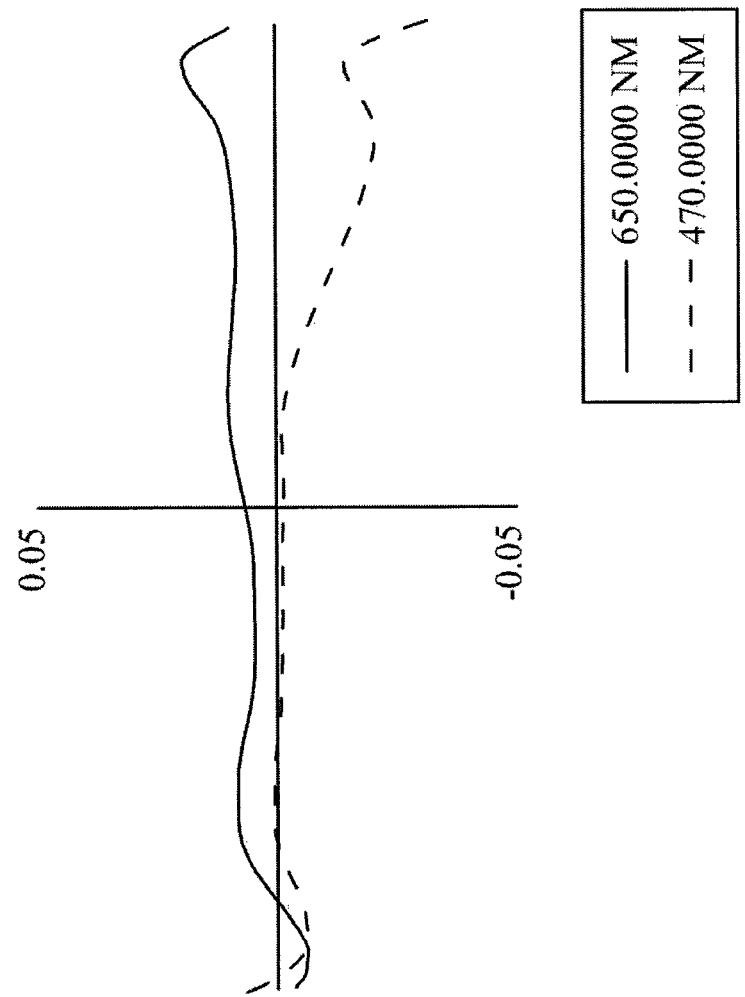
FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the sixth embodiment of the present disclosure.

Please refer to FIG. 6A and FIG. 6B, wherein FIG. 6A is a schematic view of the optical image capturing system according to the sixth embodiment of the present invention and FIG. 6B shows the longitudinal spherical aberration curves, astigmatic field curves, and optical distortion curve of the optical image capturing system in the order from left to right according to the sixth embodiment of the present invention. FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the sixth embodiment of the present disclosure. As shown in FIG. 6A, in the order from an object-side surface to an image-side surface, the optical image capturing system includes a first lens 610, a second lens 620, a third lens 630, an aperture 600, a fourth lens 640, a fifth lens 650, a sixth lens 660, an Infrared filter 680, an image plane 690, and an image sensing device 692.

The first lens 610 has negative refractive power and is made of glass material. The object-side surface 612 of the first lens 610 is a convex surface and the image-side surface 614 of the first lens 610 is a concave surface.

The second lens 620 has negative refractive power and is made of glass material. The object-side surface 622 of the second lens 620 is a concave surface and the image-side surface 624 of the second lens 620 is a concave surface, and both the object-side surface 622 and the image-side surface 624 are aspheric. The image-side surface 624 of the second lens 620 has one inflection point.

The third lens 630 has positive refractive power and is made of glass material. The object-side surface 632 of the third lens 630 is a convex surface and the image-side surface 634 of the third lens 630 is a convex surface.

The fourth lens 640 has positive refractive power and is made of plastic material. The object-side surface 642 of the fourth lens 640 is a convex surface and the image-side surface 644 of the fourth lens 640 is a convex surface, and both the object-side surface 642 and the image-side surface 644 are aspheric. The object-side surface 642 has one inflection point.

The fifth lens 650 has negative refractive power and is made of plastic material. The object-side surface 652 of the fifth lens 650 is a convex surface and the image-side surface 654 of the fifth lens 650 is a concave surface, and both the object-side surface 652 and the image-side surface 654 are aspheric. The object-side surface 652 thereof has two inflection points.

The sixth lens 660 has positive refractive power and is made of plastic material. The object-side surface 662 of the sixth lens 660 is a convex surface and the image-side surface 664 of the sixth lens 660 is a convex surface, and both the object-side surface 662 and the image-side surface 664 are aspheric. The image-side surface 664 has one inflection point. Hereby, the configuration is beneficial to shorten the back focal length of the optical image capturing system so as to keep its miniaturization. Besides, the incident angle of the off-axis rays can be reduced effectively, and thereby further correcting the off-axis aberration.

The infrared filter 680 is made of glass material and is disposed between the sixth lens 660 and the image plane 690. The infrared filter 680 does not affect the focal length of the optical image capturing system.

The contents in Tables 11 and 12 below should be incorporated into the reference of the present embodiment.

TABLE 11

Lens Parameters for the Sixth Embodiment
f(focal length) = 1.575 mm; f/HEP = 1.4; HAF(half angle of view) = 90.5 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 10.49062545 | 0.338 | Glass | 2.001 | 29.13 | −8.794 |
| 2 | | 4.724875394 | 2.038 | | | | |
| 3 | Lens 2 | −221.1542778 | 0.654 | Glass | 1.723 | 37.99 | −4.330 |
| 4 | | 3.197115305 | 1.152 | | | | |
| 5 | Lens 3 | 16.98008002 | 4.256 | Glass | 2.003 | 19.32 | 7.327 |
| 6 | | −11.50431367 | 1.031 | | | | |
| 7 | Aperture | 1E+18 | 0.330 | | | | |
| 8 | Lens 4 | 4.189945832 | 1.636 | Plastic | 1.565 | 58.00 | 2.980 |
| 9 | | −2.430327777 | 0.229 | | | | |
| 10 | Lens 5 | 8.001760904 | 0.483 | Plastic | 1.661 | 20.40 | −2.944 |
| 11 | | 1.538333861 | 0.340 | | | | |
| 12 | Lens 6 | 4.934855537 | 3.857 | Plastic | 1.565 | 58.00 | 2.880 |
| 13 | | −1.749177391 | 0.600 | | | | |
| 14 | Infrared filter | 1E+18 | 0.850 | BK_7 | 1.517 | 64.13 | |
| 15 | | 1E+18 | 0.175 | | | | |
| 16 | Image Plane | 1E+18 | 0.032 | | | | |

Reference Wavelength = 555 nm

TABLE 12

The Aspheric Coefficients of the Sixth Embodiment
Table 12: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | −7.536046E+00 |
| A4 | 0.000000E+00 | 0.000000E+00 | 0.000000E+00 | 0.000000E+00 | 0.000000E+00 | 0.000000E+00 | 1.867491E−02 |
| A6 | 0.000000E+00 | 0.000000E+00 | 0.000000E+00 | 0.000000E+00 | 0.000000E+00 | 0.000000E+00 | −4.455075E−03 |
| A8 | 0.000000E+00 | 0.000000E+00 | 0.000000E+00 | 0.000000E+00 | 0.000000E+00 | 0.000000E+00 | 1.020740E−03 |
| A10 | 0.000000E+00 | 0.000000E+00 | 0.000000E+00 | 0.000000E+00 | 0.000000E+00 | 0.000000E+00 | −2.049160E−04 |

| Surface No | 9 | 10 | 11 | 12 | 13 |
|---|---|---|---|---|---|
| k | −1.316038E+01 | −1.078571E+01 | −5.136630E+00 | −5.000000E+01 | −2.733542E+00 |
| A4 | −1.390296E−02 | −3.353055E−02 | 1.627205E−03 | 1.903945E−02 | −4.360384E−04 |
| A6 | 2.154424E−03 | −3.720661E−03 | −1.716470E−03 | 6.639612E−04 | 2.743716E−04 |
| A8 | −5.103363E−04 | 1.338729E−03 | 1.522211E−04 | −9.992523E−04 | 2.848728E−04 |
| A10 | −1.619845E−05 | −9.732565E−06 | 5.436569E−05 | 1.170148E−04 | −1.656552E−05 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12.

| Sixth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.17909 | 0.36367 | 0.21492 | 0.52842 | 0.53490 | 0.54690 |
| ΣPPR | ΣNPR | ΣPPR/\|ΣNPR\| | IN12/f | IN56/f | TP4/(IN34 + TP4 + IN45) |
| 1.73451 | 0.54275 | 3.19576 | 1.29386 | 0.21593 | 0.50722 |
| \|f1/f2\| | \|f2/f3\| | (TP1 + IN12)/TP2 | | (TP6 + IN56)/TP5 | |
| 2.03064 | 0.59099 | 3.63337 | | 8.68229 | |
| HOS | InTL | HOS/HOI | InS/HOS | ODT % | TDT % |
| 18.00000 | 16.34340 | 4.97238 | 0.47399 | −84.86800 | 57.28780 |
| HVT51 | HVT52 | HVT61 | HVT62 | HVT62/HOI | HVT62/HOS |
| 0.900934 | 0 | 0.00000 | 2.36751 | 0.65401 | 0.13153 |
| TP2/TP3 | TP3/TP4 | InRS61 | InRS62 | \|InRS61\|/TP6 | \|InRS62\|/TP6 |
| 0.15359 | 2.60132 | 0.45202 | −0.80592 | 0.11720 | 0.20896 |
| PSTA | PLTA | NSTA | NLTA | SSTA | SLTA |
| −0.034 mm | 0.011 mm | 0.007 mm | −0.004 mm | −0.008 mm | 0.003 mm |

The values pertaining to the outline curve lengths are obtainable according to the data in Table 11 and Table 12:

| Sixth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.562 | 0.562 | −0.00018 | 99.97% | 0.338 | 166.57% |
| 12 | 0.562 | 0.563 | 0.00089 | 100.16% | 0.338 | 166.88% |
| 21 | 0.562 | 0.562 | −0.00045 | 99.92% | 0.654 | 85.97% |
| 22 | 0.562 | 0.565 | 0.00249 | 100.44% | 0.654 | 86.42% |
| 31 | 0.562 | 0.562 | −0.00035 | 99.94% | 4.256 | 13.21% |
| 32 | 0.562 | 0.562 | −0.00022 | 99.96% | 4.256 | 13.21% |
| 41 | 0.562 | 0.564 | 0.00131 | 100.23% | 1.636 | 34.46% |
| 42 | 0.562 | 0.566 | 0.00340 | 100.60% | 1.636 | 34.58% |
| 51 | 0.562 | 0.562 | −0.00017 | 99.97% | 0.483 | 116.32% |
| 52 | 0.562 | 0.571 | 0.00896 | 101.59% | 0.483 | 118.21% |
| 61 | 0.562 | 0.563 | 0.00060 | 100.11% | 3.857 | 14.60% |
| 62 | 0.562 | 0.571 | 0.00819 | 101.46% | 3.857 | 14.80% |
| ARS | EHD | ARS value | ARS − EHD | (ARS/EHD)% | TP | ARS/TP (%) |
| 11 | 5.107 | 5.334 | 0.22655 | 104.44% | 0.338 | 1580.12% |
| 12 | 3.793 | 4.403 | 0.61014 | 116.09% | 0.338 | 1304.44% |
| 21 | 3.641 | 3.640 | −0.00047 | 99.99% | 0.654 | 556.84% |
| 22 | 2.571 | 2.987 | 0.41554 | 116.16% | 0.654 | 456.92% |
| 31 | 2.566 | 2.575 | 0.00892 | 100.35% | 4.256 | 60.50% |
| 32 | 2.057 | 2.068 | 0.01094 | 100.53% | 4.256 | 48.59% |
| 41 | 1.895 | 1.954 | 0.05851 | 103.09% | 1.636 | 119.41% |
| 42 | 2.033 | 2.179 | 0.14583 | 107.17% | 1.636 | 133.18% |
| 51 | 1.944 | 1.977 | 0.03304 | 101.70% | 0.483 | 408.99% |
| 52 | 2.021 | 2.155 | 0.13399 | 106.63% | 0.483 | 445.81% |
| 61 | 2.132 | 2.204 | 0.07208 | 103.38% | 3.857 | 57.16% |
| 62 | 2.596 | 2.767 | 0.17177 | 106.62% | 3.857 | 71.75% |

The following values for the conditional expressions can be obtained from the data in Table 11 and Table 12:

| Values Related to Inflection Point of Sixth Embodiment (Primary Reference Wavelength = 555 nm) | | | | | | |
|---|---|---|---|---|---|---|
| HIF411 | 1.5733 | HIF411/HOI | 0.4346 | SGI411 | 0.3137 | \|SGI411\|/(\|SGI411\| + TP4) | 0.1609 |
| HIF511 | 0.5243 | HIF511/HOI | 0.1448 | SGI511 | 0.0144 | \|SGI511\|/(\|SGI511\| + TP5) | 0.0289 |
| HIF512 | 1.7881 | HIF512/HOI | 0.4939 | SGI512 | −0.1477 | \|SGI512\|/(\|SGI512\| + TP5) | 0.2341 |
| HIF621 | 1.4915 | HIF621/HOI | 0.4120 | SGI621 | −0.5011 | \|SGI621\|/(\|SGI621\| + TP6) | 0.1150 |

Seventh Embodiment

Figure 7A:
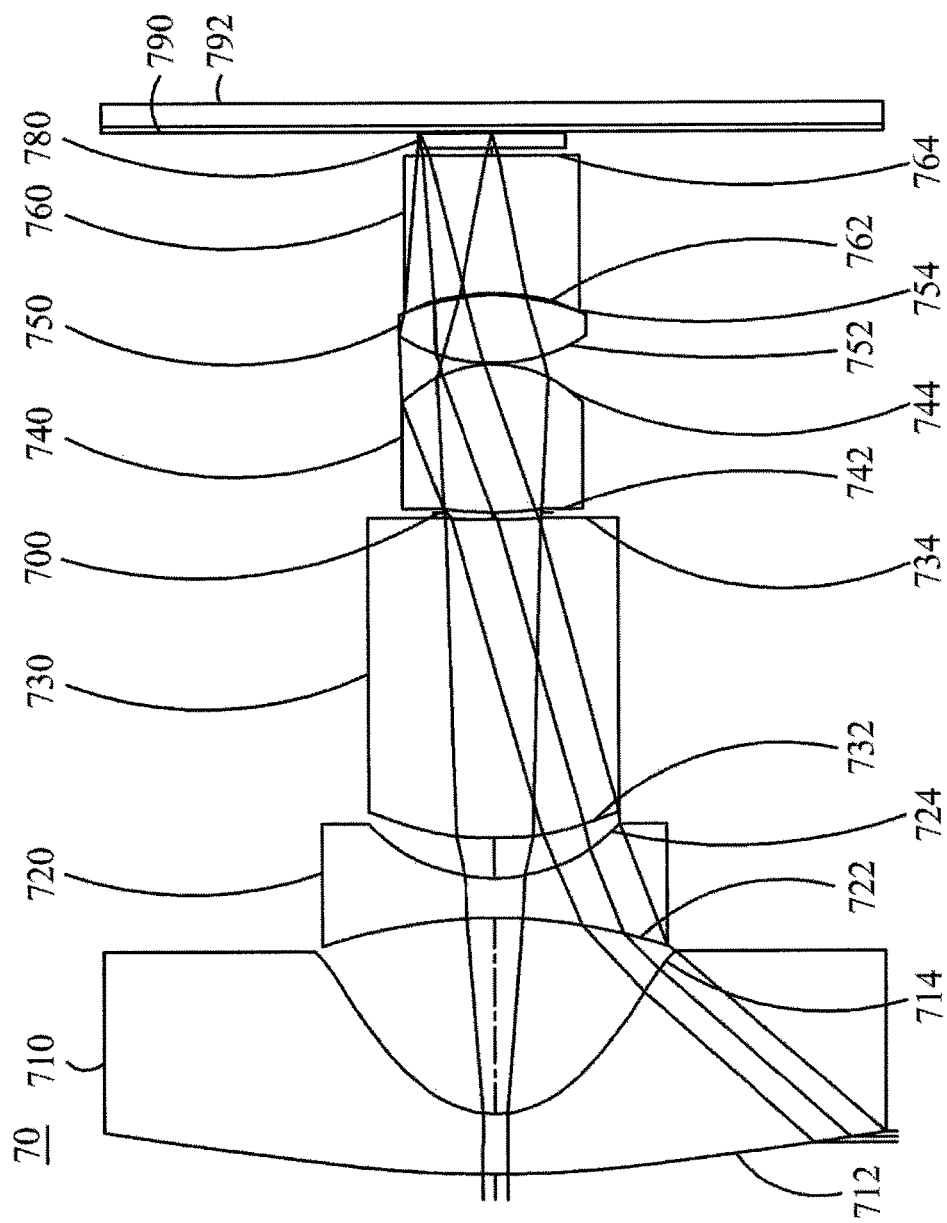
FIG. 7A is a schematic view of the optical image capturing system according to the seventh embodiment of the present invention.
Figure 7B:
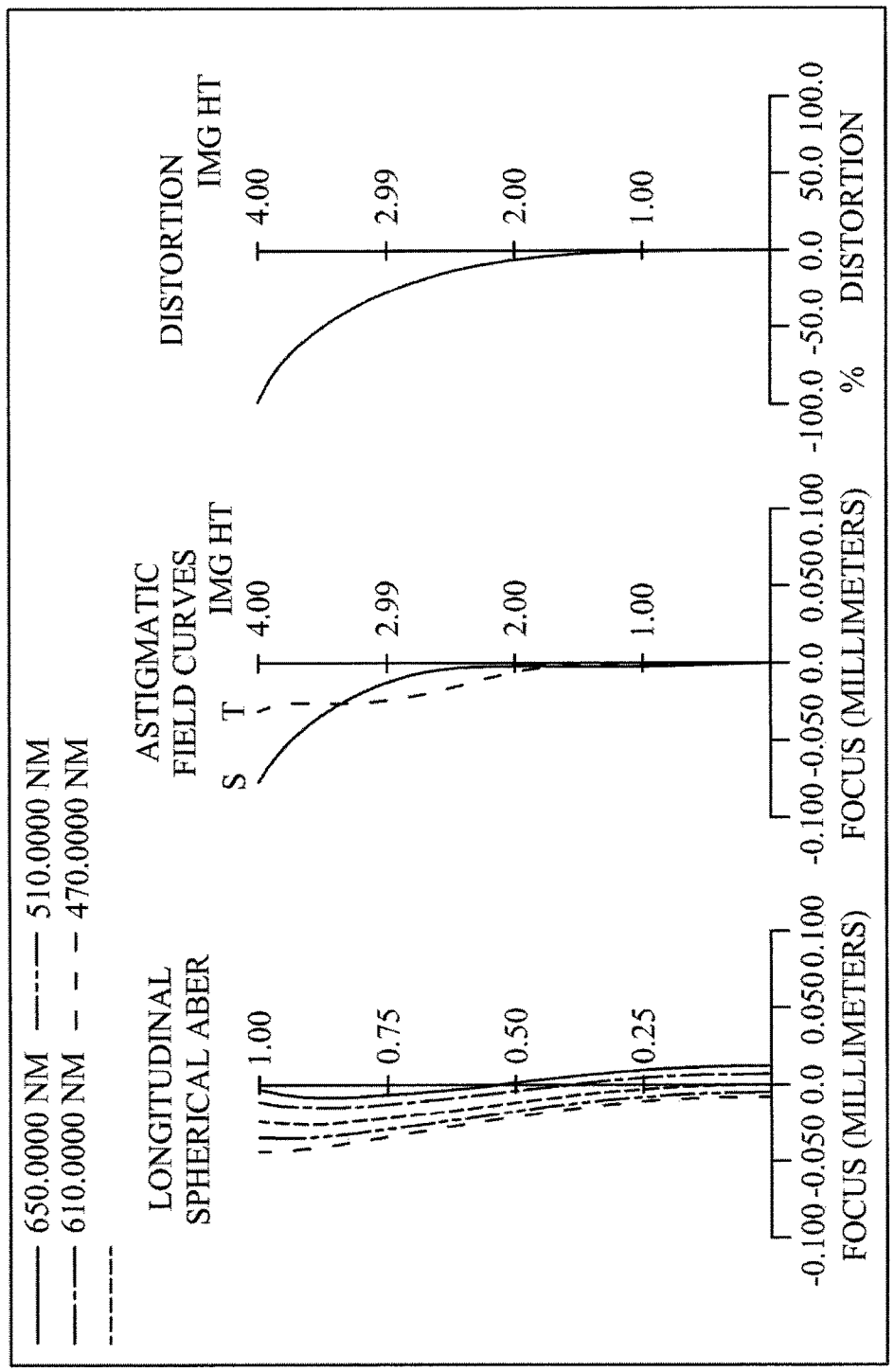
FIG. 7B shows the longitudinal spherical aberration curves, astigmatic field curves, and optical distortion curve of the optical image capturing system in the order from left to right according to the seventh embodiment of the present invention.
Figure 7C:
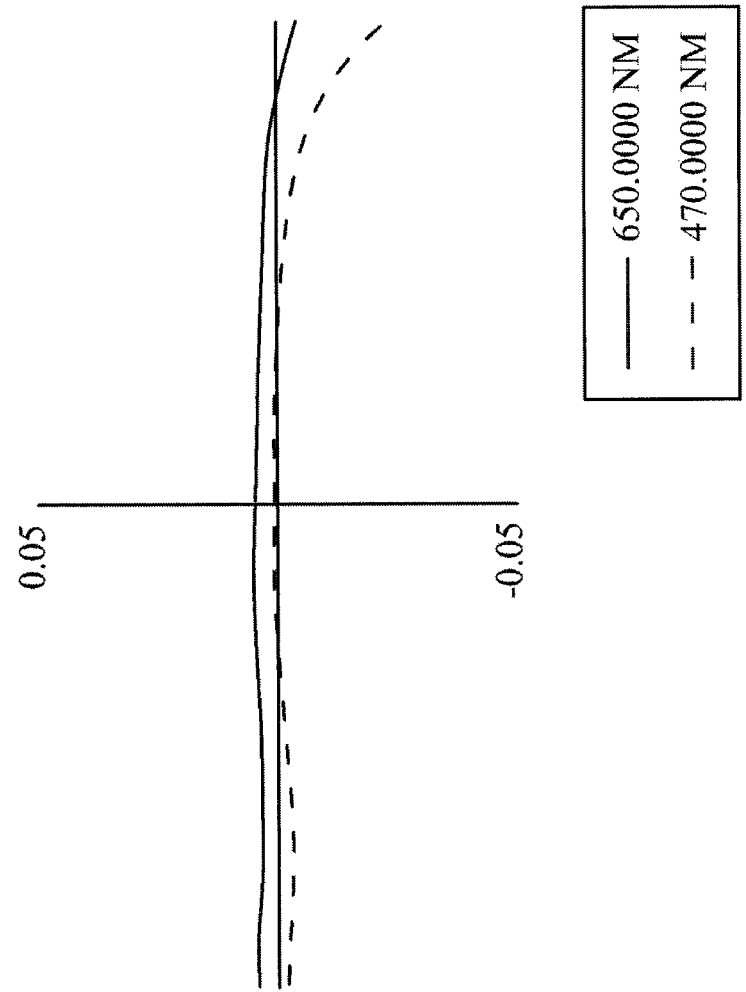
FIG. 7C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the seventh embodiment of the present disclosure.

Please refer to FIG. 7A and FIG. 7B, wherein FIG. 7A is a schematic view of the optical image capturing system according to the seventh embodiment of the present invention and FIG. 7B shows the longitudinal spherical aberration curves, astigmatic field curves, and optical distortion curve of the optical image capturing system in the order from left to right according to the seventh embodiment of the present invention. FIG. 7C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the seventh embodiment of the present disclosure. As shown in FIG. 7A, in the order from an object-side surface to an image-side surface, the optical image capturing system includes a first lens 710, a second lens 720, a third lens 730, an aperture 700, a fourth lens 740, a fifth lens 750, a sixth lens 760, an Infrared filter 780, an image plane 790, and an image sensing device 792.

The first lens 710 has negative refractive power and is made of plastic material. The object-side surface 712 of the first lens 710 is a convex surface and the image-side surface 714 of the first lens 710 is a concave surface. Both the object-side surface 712 and the image-side surface 714 are aspheric. Besides, the image-side surface 714 has one inflection point.

The second lens 720 has positive refractive power and is made of glass material. The object-side surface 722 of the second lens 720 is a concave surface and the image-side surface 724 of the second lens 720 is a concave surface.

The third lens 730 has positive refractive power and is made of glass material. The object-side surface 732 of the third lens 730 is a convex surface and the image-side surface 734 of the third lens 730 is a concave surface.

The fourth lens 740 has negative refractive power and is made of plastic material. The object-side surface 742 of the fourth lens 740 is a convex surface and the image-side surface 744 of the fourth lens 740 is a convex surface, and both the object-side surface 742 and the image-side surface 744 are aspheric. The object-side surface 742 has one inflection point.

The fifth lens 750 has positive refractive power and is made of glass material. The object-side surface 752 of the fifth lens 750 is a convex surface and the image-side surface 754 of the fifth lens 750 is a convex surface.

The sixth lens 760 has positive refractive power and is made of glass material. The object-side surface 762 of the sixth lens 760 is a concave surface and the image-side surface 764 of the sixth lens 760 is a concave surface. Hereby, the configuration is beneficial to shorten the back focal length of the optical image capturing system so as to keep its miniaturization. Besides, the incident angle of the off-axis rays can be reduced effectively, and thereby further correcting the off-axis aberration.

The infrared filter 780 is made of glass material and is disposed between the sixth lens 760 and the image plane 790. The infrared filter 780 does not affect the focal length of the optical image capturing system.

The contents in Tables 13 and 14 below should be incorporated into the reference of the present embodiment.

TABLE 13

Lens Parameters for the Seventh Embodiment
f(focal length) = 1.998 mm; f/HEP = 1.4; HAF(half angle of view) = 90 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 61.62430692 | 3.444 | Plastic | 1.565 | 58.00 | −9.927 |
| 2 | | 5.051306475 | 11.307 | | | | |
| 3 | Lens 2 | −29.30807508 | 2.332 | Glass | 1.497 | 81.61 | −13.858 |
| 4 | | 9.268775637 | 2.317 | | | | |
| 5 | Aperture | 16.62741983 | 18.310 | | | | |
| 6 | Lens 3 | 42.53643586 | 0.407 | Glass | 2.003 | 19.32 | 19.901 |
| 7 | | 1E+18 | 0.000 | | | | |
| 8 | Lens 4 | 15.89888189 | 8.589 | Plastic | 1.565 | 58.00 | 9.350 |
| 9 | | −6.395166287 | 0.063 | | | | |
| 10 | Lens 5 | 9.367929774 | 3.875 | Glass | 1.639 | 44.87 | 8.916 |
| 11 | | −12.33074651 | 0.081 | | | | |
| 12 | Lens 6 | −11.7098406 | 7.950 | Glass | 2.003 | 19.32 | −11.043 |
| 13 | | 328.4082186 | 0.450 | | | | |
| 14 | Infrared filter | 1E+18 | 0.850 | BK_7 | 1.517 | 64.13 | |
| 15 | | 1E+18 | 0.038 | | | | |
| 16 | Image Plane | 1E+18 | −0.012 | | | | |

Reference Wavelength = 555 nm

TABLE 14

The Aspheric Coefficients of the Seventh Embodiment
Table 14: Aspheric Coefficients

| Surface No | 1 | 2 | 3 | 4 | 5 | 6 | 8 |
|---|---|---|---|---|---|---|---|
| k | −1.997475E+01 | −1.066196E+00 | 0.000000E+00 | 0.000000E+00 | 0.000000E+00 | 0.000000E+00 | −4.630995E+01 |
| A4 | −2.443943E−06 | 1.709912E−04 | 0.000000E+00 | 0.000000E+00 | 0.000000E+00 | 0.000000E+00 | 6.564743E−04 |
| A6 | 1.317317E−09 | 1.291454E−07 | 0.000000E+00 | 0.000000E+00 | 0.000000E+00 | 0.000000E+00 | −1.216181E−04 |
| A8 | 2.510950E−12 | −3.628815E−09 | 0.000000E+00 | 0.000000E+00 | 0.000000E+00 | 0.000000E+00 | 6.988306E−06 |
| A10 | −1.268783E−15 | −1.416425E−10 | 0.000000E+00 | 0.000000E+00 | 0.000000E+00 | 0.000000E+00 | −3.062335E−07 |

| Surface No | 9 | 10 | 11 | 12 | 13 |
|---|---|---|---|---|---|
| k | −1.961243E−02 | 0.000000E+00 | 0.000000E+00 | 0.000000E+00 | 0.000000E+00 |
| A4 | 2.520287E−04 | 0.000000E+00 | 0.000000E+00 | 0.000000E+00 | 0.000000E+00 |
| A6 | 6.600830E−06 | 0.000000E+00 | 0.000000E+00 | 0.000000E+00 | 0.000000E+00 |
| A8 | −3.121800E−07 | 0.000000E+00 | 0.000000E+00 | 0.000000E+00 | 0.000000E+00 |
| A10 | 7.205310E−09 | 0.000000E+00 | 0.000000E+00 | 0.000000E+00 | 0.000000E+00 |

In the seventh embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 13 and Table 14.

| Seventh Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.20128 | 0.14418 | 0.10040 | 0.21371 | 0.22410 | 0.18094 |
| Σ PPR | Σ NPR | Σ PPR/\|Σ NPR\| | IN12/f | IN56/f | TP4/(IN34 + TP4 + IN45) |
| 0.64962 | 0.41499 | 1.56538 | 5.65903 | 0.04051 | 0.94818 |
| \|f1/f2\| | \|f2/f3\| | (TP1 + IN12)/TP2 | | (TP6 + IN56)/TP5 | |
| 0.71630 | 0.69636 | 6.32668 | | 2.07259 | |
| HOS | InTL | HOS/HOI | InS/HOS | ODT % | TDT % |
| 59.99990 | 58.67370 | 15.42414 | 0.36472 | −83.2267 | 71.992 |
| HVT51 | HVT52 | HVT61 | HVT62 | HVT62/HOI | HVT62/HOS |
| 0 | 0 | 0.00000 | 0.00000 | 0.00000 | 0.00000 |
| TP2/TP3 | TP3/TP4 | InRS61 | InRS62 | \|InRS61\|/TP6 | \|InRS62\|/TP6 |
| 0.12734 | 2.13187 | −1.02890 | 0.02475 | 0.12942 | 0.00311 |
| PSTA | PLTA | NSTA | NLTA | SSTA | SLTA |
| −0.023 mm | −0.004 mm | −0.002 mm | 0.005 mm | 0.009 mm | 0.020 mm |

The values pertaining to the outline curve lengths are obtainable according to the data in Table 13 and Table 14:

| Seventh Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.714 | 0.713 | −0.00058 | 99.92% | 3.444 | 20.70% |
| 12 | 0.714 | 0.715 | 0.00176 | 100.25% | 3.444 | 20.77% |
| 21 | 0.714 | 0.713 | −0.00053 | 99.93% | 2.332 | 30.58% |
| 22 | 0.714 | 0.714 | 0.00011 | 100.01% | 2.332 | 30.61% |
| 31 | 0.714 | 0.713 | −0.00038 | 99.95% | 18.310 | 3.90% |
| 32 | 0.714 | 0.713 | −0.00057 | 99.92% | 18.310 | 3.89% |
| 41 | 0.714 | 0.713 | −0.00037 | 99.95% | 8.589 | 8.30% |
| 42 | 0.714 | 0.714 | 0.00088 | 100.12% | 8.589 | 8.32% |
| 51 | 0.714 | 0.714 | 0.00009 | 100.01% | 3.875 | 18.42% |
| 52 | 0.714 | 0.713 | −0.00020 | 99.97% | 3.875 | 18.41% |
| 61 | 0.714 | 0.713 | −0.00016 | 99.98% | 7.950 | 8.97% |
| 62 | 0.714 | 0.713 | −0.00060 | 99.92% | 7.950 | 8.97% |
| ARS | EHD | ARS value | ARS − EHD | (ARS/EHD)% | TP | ARS/TP (%) |
| 11 | 19.500 | 19.626 | 0.125 | 100.64% | 3.444 | 569.83% |
| 12 | 9.475 | 13.497 | 4.022 | 142.45% | 3.444 | 391.89% |
| 21 | 8.448 | 8.570 | 0.121 | 101.44% | 2.332 | 367.54% |
| 22 | 6.523 | 7.235 | 0.712 | 110.91% | 2.332 | 310.28% |
| 31 | 6.511 | 6.689 | 0.178 | 102.74% | 18.310 | 36.53% |
| 32 | 2.830 | 2.831 | 0.002 | 100.05% | 18.310 | 15.46% |
| 41 | 2.852 | 2.859 | 0.008 | 100.27% | 8.589 | 33.29% |
| 42 | 5.043 | 5.664 | 0.621 | 112.32% | 8.589 | 65.95% |
| 51 | 5.121 | 5.418 | 0.297 | 105.80% | 3.875 | 139.83% |
| 52 | 4.802 | 4.931 | 0.130 | 102.70% | 3.875 | 127.27% |
| 61 | 4.730 | 4.868 | 0.138 | 102.92% | 7.950 | 61.23% |
| 62 | 3.953 | 3.952 | −0.000 | 99.99% | 7.950 | 49.71% |

The following values for the conditional expressions can be obtained from the data in Table 13 and Table 14:

| Values Related to Inflection Point of Seventh Embodiment (Primary Reference Wavelength = 555 nm) | | | | | | | |
|---|---|---|---|---|---|---|---|
| HIF121 | 8.1563 | HIF121/HOI | 2.0967 | SGI121 | 6.8621 | \|SGI121\|/(\|SGI121\| + TP1) | 0.6658 |
| HIF411 | 2.2881 | HIF411/HOI | 0.5882 | SGI411 | 0.1422 | \|SGI411\|/(\|SGI411\| + TP4) | 0.0163 |

Eighth Embodiment

Figure 8A:
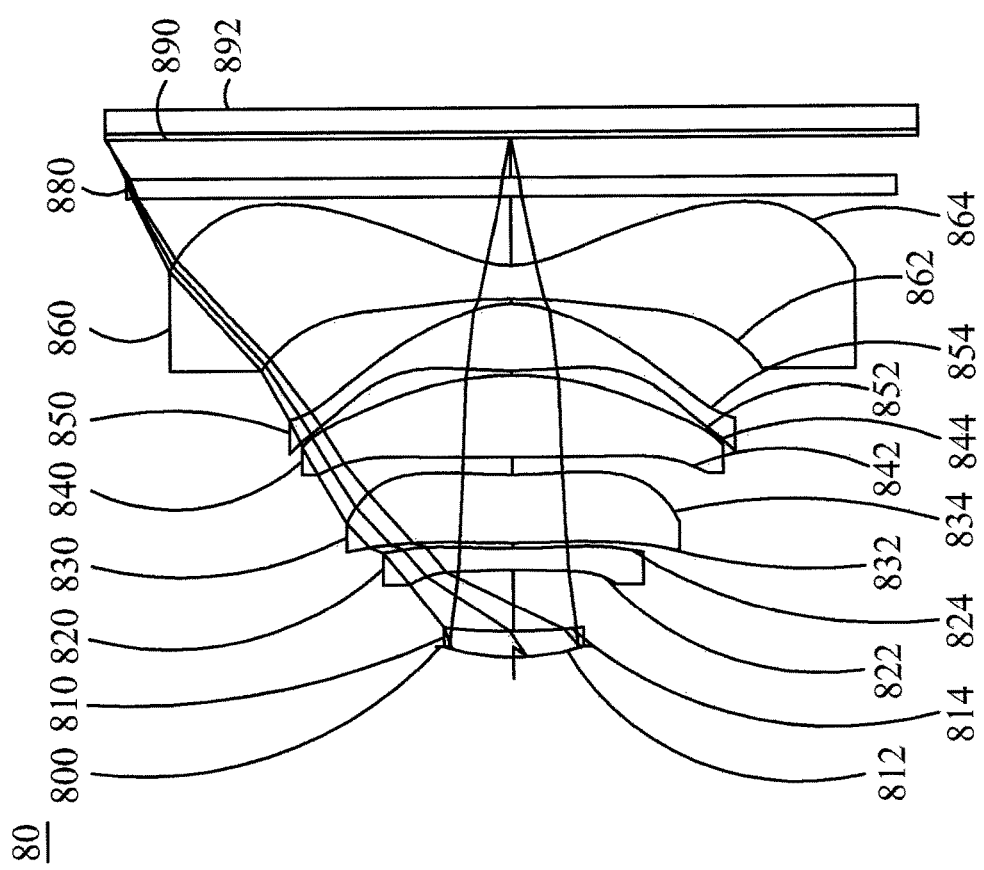
FIG. 8A is a schematic view of the optical image capturing system according to the eighth embodiment of the present invention.
Figure 8B:
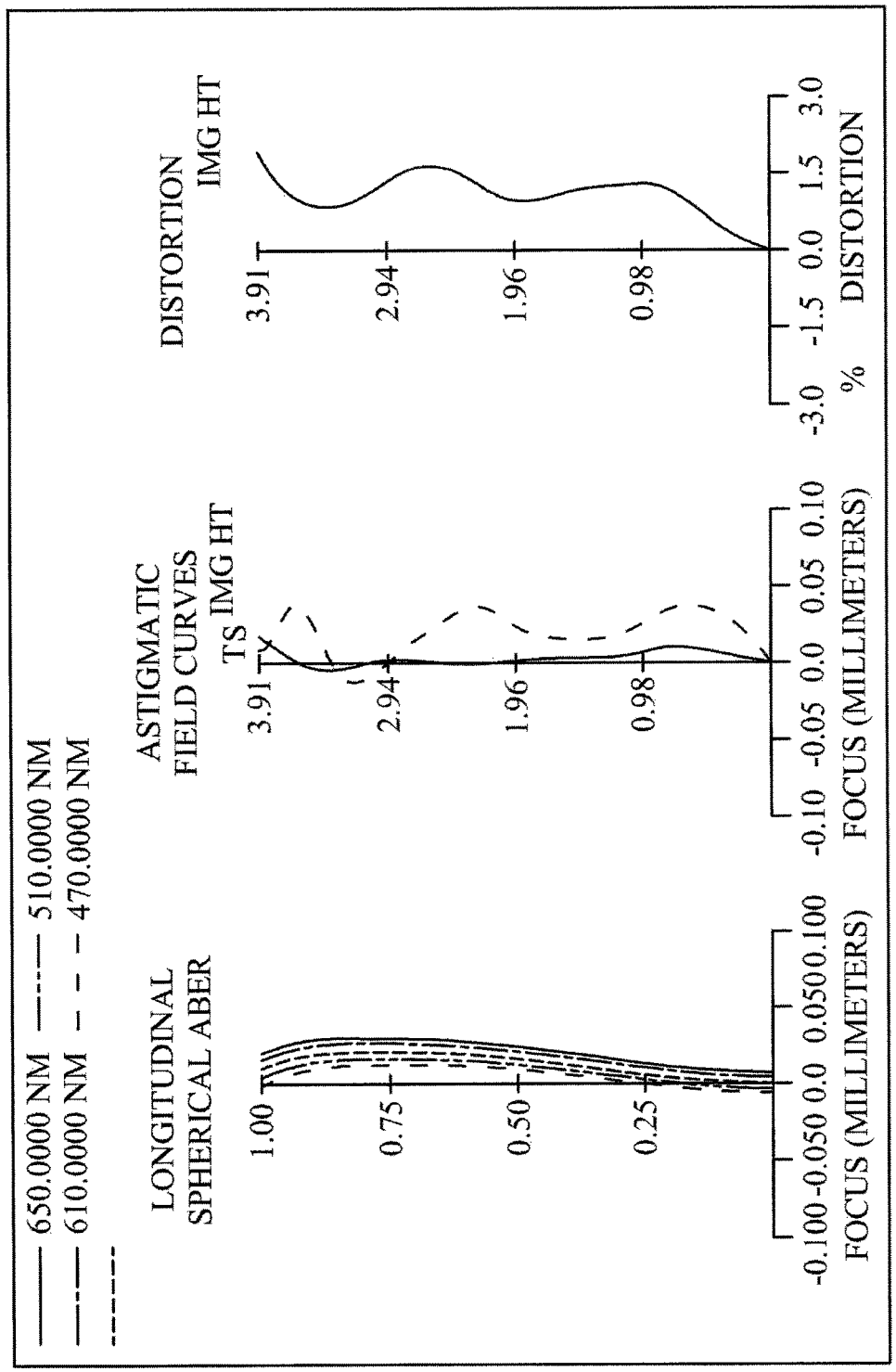
FIG. 8B shows the longitudinal spherical aberration curves, astigmatic field curves, and optical distortion curve of the optical image capturing system in the order from left to right according to the eighth embodiment of the present invention.
Figure 8C:
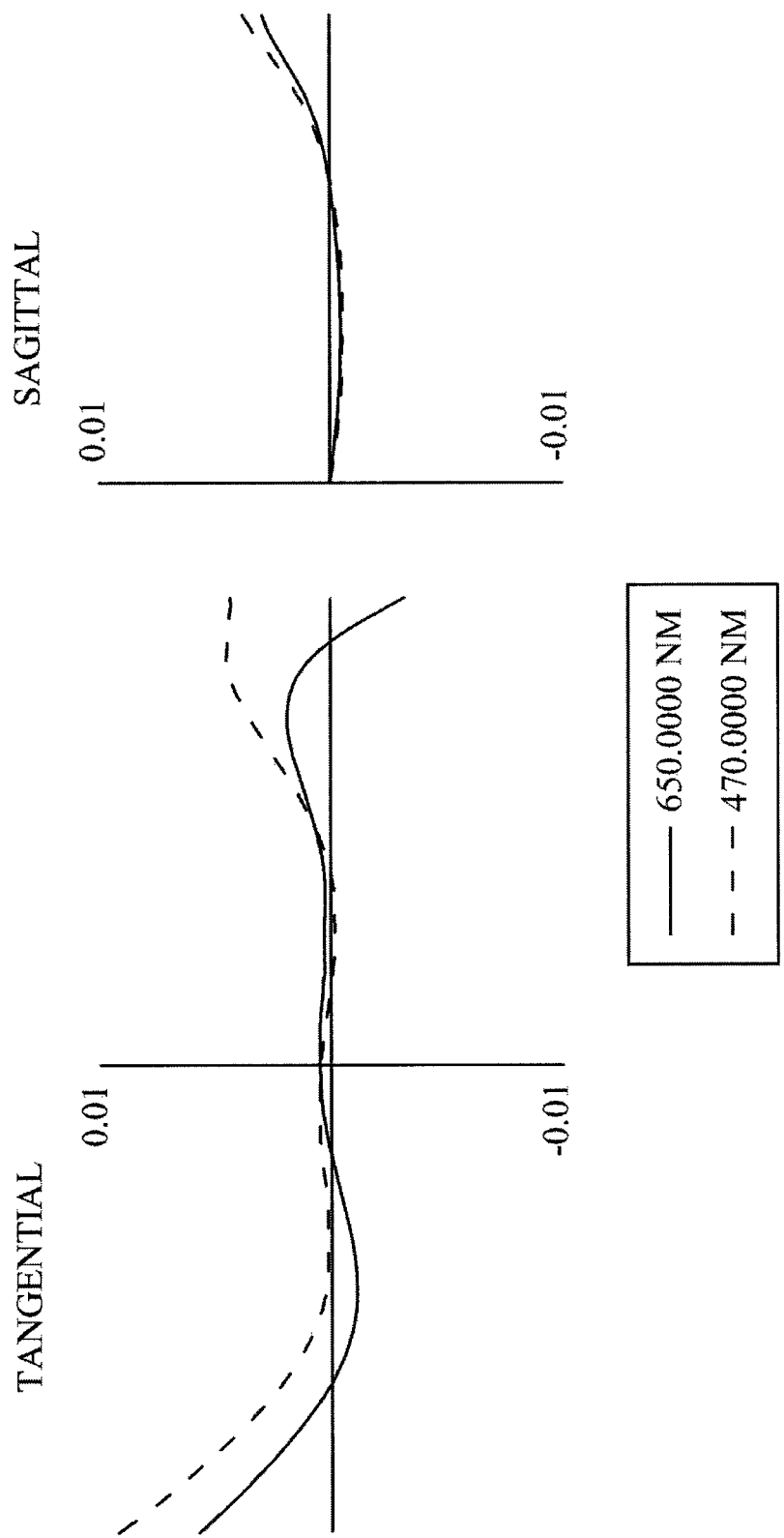
FIG. 8C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the eighth embodiment of the present disclosure.

Please refer to FIG. 8A and FIG. 8B, wherein FIG. 8A is a schematic view of the optical image capturing system according to the eighth embodiment of the present invention and FIG. 8B shows the longitudinal spherical aberration curves, astigmatic field curves, and optical distortion curve of the optical image capturing system in the order from left to right according to the eighth embodiment of the present invention. FIG. 8C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the eighth embodiment of the present disclosure. As shown in FIG. 8A, in the order from an object-side surface to an image-side surface, the optical image capturing system includes an aperture 800, a first lens 810, a second lens 820, a third lens 830, a fourth lens 840, a fifth lens 850, a sixth lens 860, an Infrared filter 880, an image plane 890, and an image sensing device 892.

The first lens 810 has positive refractive power and is made of plastic material. The object-side surface 812 of the first lens 810 is a convex surface and the image-side surface 814 of the first lens 810 is a concave surface. Both the object-side surface 812 and the image-side surface 814 are aspheric. The image-side surface 814 has one inflection point.

The second lens 820 has negative refractive power and is made of plastic material. The object-side surface 822 of the second lens 820 is a concave surface and the image-side surface 824 of the second lens 820 is a concave surface, and both the object-side surface 822 and the image-side surface 824 are aspheric. The image-side surface 824 of the second lens 820 has two inflection points.

The third lens 830 has negative refractive power and is made of plastic material. The object-side surface 832 of the third lens 830 is a convex surface and the image-side surface 834 of the third lens 830 is a concave surface. Both the object-side surface 832 and the image-side surface 834 are aspheric. Each of the object-side surface 832 and the image-side surface 834 has one inflection point.

The fourth lens 840 has positive refractive power and is made of plastic material. The object-side surface 842 of the fourth lens 840 is a concave surface and the image-side surface 844 of the fourth lens 840 is a convex surface, and both the object-side surface 842 and the image-side surface 844 are aspheric. The object-side surface 842 has three inflection points.

The fifth lens 850 has positive refractive power and is made of plastic material. The object-side surface 852 of the fifth lens 850 is a convex surface and the image-side surface 854 of the fifth lens 850 is a convex surface, and both the object-side surface 852 and the image-side surface 854 are aspheric. The object-side surface 852 has three inflection points and the image-side surface 854 has one inflection point.

The sixth lens 860 has negative refractive power and is made of plastic material. The object-side surface 862 of the sixth lens 860 is a concave surface and the image-side surface 864 of the sixth lens 860 is a concave surface. The object-side surface 862 has two inflection points and the image-side surface 864 has one inflection point. Hereby, the configuration is beneficial to shorten the back focal length of the optical image capturing system so as to keep its miniaturization. Besides, the incident angle of the off-axis rays can be reduced effectively, and thereby further correcting the off-axis aberration.

The infrared filter 880 is made of glass material and is disposed between the sixth lens 860 and the image plane 890. The infrared filter 880 does not affect the focal length of the optical image capturing system.

In the eighth embodiment of the optical image capturing system, a sum of the focal lengths of all lenses with positive refractive power is denoted as ΣPP, and the conditions as follows are satisfied: ΣPP=12.785 mm and f5/ΣPP=0.10. Hereby, it is helpful to appropriately distribute the positive refractive power of a single lens to other lenses with positive refractive power, so as to restrain occurrences of significant aberration during the transmission of incident light.

In the eighth embodiment of the optical image capturing system, a sum of the focal lengths of all lenses with negative refractive power is denoted as ΣNP, and the conditions as follows are satisfied: ΣNP=−112.117 mm and f6/ΣNP=0.009. Hereby, it is helpful to appropriately distribute the negative refractive power of the sixth lens to other lenses with negative refractive power.

The contents in Tables 15 and 16 below should be incorporated into the reference of the present embodiment.

TABLE 15

Lens Parameters for the Eighth Embodiment
f(focal length) = 3.213 mm; f/HEP = 2.4; HAF(half angle of view) = 50.015 deg

| Surface No | | Curvature Radius | Thickness (mm) | Material | Refractive Index | Coefficient of Dispersion | Focal Length |
|---|---|---|---|---|---|---|---|
| 0 | Object | Plane | Infinite | | | | |
| 1 | Shield | Plane | 0.000 | | | | |
| 2 | Aperture | Plane | −0.108 | | | | |
| 3 | Lens 1 | 2.117380565 | 0.267 | Plastic | 1.565 | 58.00 | 6.003 |
| 4 | | 5.351202213 | 0.632 | | | | |
| 5 | Lens 2 | −70.37596785 | 0.230 | Plastic | 1.517 | 21.40 | −11.326 |
| 6 | | 8.30936549 | 0.050 | | | | |
| 7 | Lens 3 | 7.333171865 | 0.705 | Plastic | 1.565 | 58.00 | −99.749 |
| 8 | | 6.265499794 | 0.180 | | | | |
| 9 | Lens 4 | −71.32533363 | 0.832 | Plastic | 1.565 | 58.00 | 5.508 |
| 10 | | −3.003657909 | 0.050 | | | | |
| 11 | Lens 5 | 3.397431079 | 0.688 | Plastic | 1.583 | 30.20 | 1.274 |
| 12 | | −0.886432266 | 0.050 | | | | |
| 13 | Lens 6 | −3.715425702 | 0.342 | Plastic | 1.650 | 21.40 | −1.042 |
| 14 | | 0.867623637 | 0.700 | | | | |
| 15 | Infrared filter | Plane | 0.200 | | 1.517 | 64.13 | |
| 16 | | Plane | 0.407 | | | | |
| 17 | Image Plane | Plane | | | | | |

Reference Wavelength = 555 nm; Shield Position: The 1st surface with effective aperture = 0.640 mm

TABLE 16

The Aspheric Coefficients of the Eighth Embodiment
Table 16: Aspheric Coefficients

| Surface No | 3 | 4 | 5 | 6 | 7 | 8 | 9 |
|---|---|---|---|---|---|---|---|
| k | −1.486403E+00 | 2.003790E+01 | −4.783682E+01 | −2.902431E+01 | −5.000000E+01 | −5.000000E+01 | −5.000000E+01 |
| A4 | 2.043654E−02 | −2.642626E−02 | −6.237485E−02 | −4.896336E−02 | −7.363667E−02 | −5.443257E−02 | 3.105497E−02 |
| A6 | −2.231403E−04 | −4.147746E−02 | −8.137705E−02 | −1.981368E−02 | 1.494245E−02 | 1.263891E−04 | −1.532514E−02 |
| A8 | −1.387235E−02 | 2.901026E−02 | 4.589961E−02 | 3.312952E−03 | 6.252296E−03 | −9.655324E−03 | −6.443603E−04 |
| A10 | −3.431740E−02 | −9.512960E−02 | −5.485574E−02 | 5.634445E−03 | −2.226544E−03 | 1.318692E−03 | 4.321089E−04 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface No | 10 | 11 | 12 | 13 | 14 |
|---|---|---|---|---|---|
| k | 8.520005E−01 | −5.000000E+01 | −4.524978E+00 | −5.000000E+01 | −4.286435E+00 |
| A4 | −6.786287E−03 | −9.520247E−02 | −4.666187E−02 | 5.856863E−03 | −2.635928E−02 |
| A6 | 6.693976E−03 | −5.507560E−05 | 3.849227E−03 | 2.442214E−03 | 3.694093E−03 |
| A8 | 8.220809E−04 | 1.932773E−03 | 1.041053E−03 | −2.201034E−03 | −1.355873E−04 |
| A10 | −2.798394E−04 | 3.346274E−04 | 4.713339E−06 | −1.065215E−04 | −5.321575E−05 |
| A12 | 0.000000E+00 | 1.125736E−05 | −2.834871E−06 | 1.227641E−04 | 6.838440E−06 |
| A14 | 0.000000E+00 | −1.671951E−05 | −2.293810E−06 | −1.181115E−05 | −2.530792E−07 |

In the eighth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 15 and Table 16.

Eighth Embodiment (Primary Reference Wavelength = 555 nm)

| |f/f1| | |f/f2| | |f/f3| | |f/f4| | |f/f5| | |f/f6| |
|---|---|---|---|---|---|
| 0.53529 | 0.28371 | 0.03221 | 0.58335 | 2.52139 | 3.08263 |

| ΣPPR | ΣNPR | ΣPPR/|ΣNPR| | IN12/f | IN56/f | TP4/(IN34 + TP4 + IN45) |
|---|---|---|---|---|---|
| 6.72266 | 0.84594 | 7.94700 | 0.19680 | 0.01556 | 0.78362 |

Eighth Embodiment (Primary Reference Wavelength = 555 nm)

| |f1/f2| | |f2/f3| | (TP1 + IN12)/TP2 | (TP6 + IN56)/TP5 | | |
|---|---|---|---|---|---|
| 0.53001 | 0.11354 | 3.90947 | 0.56888 | | |
| HOS | InTL | HOS/HOI | InS/HOS | ODT % | TDT % |
| 5.33002 | 4.02576 | 1.36178 | 0.97981 | 1.92371 | 1.09084 |
| HVT51 | HVT52 | HVT61 | HVT62 | HVT62/HOI | HVT62/HOS |
| 0.67483 | 0 | 0.00000 | 2.23965 | 0.57222 | 0.42020 |
| TP2/TP3 | TP3/TP4 | InRS61 | InRS62 | |InRS61|/TP6 | |InRS62|/TP6 |
| 0.32631 | 0.84713 | −0.74088 | −0.06065 | 2.16896 | 0.17755 |
| PLTA | PSTA | NLTA | NSTA | SLTA | SSTA |
| 0.005 mm | −0.003 mm | 0.010 mm | 0.006 mm | 0.004 mm | 0.003 mm |

The values pertaining to the outline curve lengths are obtainable according to the data in Table 15 and Table 16:

Eighth Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.648 | 0.658 | 0.01023 | 101.58% | 0.267 | 246.73% |
| 12 | 0.670 | 0.670 | 0.00041 | 100.06% | 0.267 | 251.19% |
| 21 | 0.670 | 0.670 | 0.00002 | 100.00% | 0.230 | 291.24% |
| 22 | 0.670 | 0.669 | −0.00064 | 99.90% | 0.230 | 290.95% |
| 31 | 0.670 | 0.669 | −0.00063 | 99.91% | 0.705 | 94.94% |
| 32 | 0.670 | 0.669 | −0.00046 | 99.93% | 0.705 | 94.97% |
| 41 | 0.670 | 0.669 | −0.00082 | 99.88% | 0.832 | 80.40% |
| 42 | 0.670 | 0.675 | 0.00511 | 100.76% | 0.832 | 81.12% |
| 51 | 0.670 | 0.670 | −0.00003 | 100.00% | 0.688 | 97.31% |
| 52 | 0.670 | 0.702 | 0.03243 | 104.84% | 0.688 | 102.02% |
| 61 | 0.670 | 0.671 | 0.00099 | 100.15% | 0.342 | 196.39% |
| 62 | 0.670 | 0.699 | 0.02890 | 104.31% | 0.342 | 204.56% |

| ARS | EHD | ARS value | ARS − EHD | (ARS/EHD)% | TP | ARS/TP (%) |
|---|---|---|---|---|---|---|
| 11 | 0.648 | 0.658 | 0.01023 | 101.58% | 0.267 | 246.73% |
| 12 | 0.697 | 0.697 | 0.00042 | 100.06% | 0.267 | 261.33% |
| 21 | 0.994 | 1.026 | 0.03192 | 103.21% | 0.230 | 446.16% |
| 22 | 1.255 | 1.259 | 0.00315 | 100.25% | 0.230 | 547.21% |
| 31 | 1.383 | 1.385 | 0.00192 | 100.14% | 0.705 | 196.48% |
| 32 | 1.604 | 1.816 | 0.21279 | 113.27% | 0.705 | 257.68% |
| 41 | 1.876 | 1.908 | 0.03181 | 101.70% | 0.832 | 229.32% |
| 42 | 2.027 | 2.193 | 0.16648 | 108.21% | 0.832 | 263.61% |
| 51 | 2.038 | 2.282 | 0.24376 | 111.96% | 0.688 | 331.49% |
| 52 | 2.144 | 2.485 | 0.34081 | 115.89% | 0.688 | 361.03% |
| 61 | 2.411 | 2.624 | 0.21261 | 108.82% | 0.342 | 768.18% |
| 62 | 3.309 | 3.686 | 0.37664 | 111.38% | 0.342 | 1078.99% |

The following values for the conditional expressions can be obtained from the data in Table 15 and Table 16:

Values Related to Inflection Point of Eighth Embodiment
(Primary Reference Wavelength = 555 nm)

| | | | | | | |
|---|---|---|---|---|---|---|
| HIF121 | 0.57452 | HIF121/HOI | 0.14679 | SGI121 | 0.02858 | \|SGI121\|/(\|SGI121\| + TP1) | 0.09675 |
| HIF221 | 0.40206 | HIF221/HOI | 0.10272 | SGI221 | 0.00821 | \|SGI221\|/(\|SGI221\| + TP2) | 0.03448 |
| HIF222 | 1.11769 | HIF222/HOI | 0.28556 | SGI222 | −0.02234 | \|SGI222\|/(\|SGI222\| + TP2) | 0.08853 |
| HIF311 | 0.37391 | HIF311/HOI | 0.09553 | SGI311 | 0.00785 | \|SGI311\|/(\|SGI311\| + TP3) | 0.01102 |
| HIF321 | 0.42061 | HIF321/HOI | 0.10746 | SGI321 | 0.01170 | \|SGI321\|/(\|SGI321\| + TP3) | 0.01633 |
| HIF411 | 0.19878 | HIF411/HOI | 0.05079 | SGI411 | −0.00023 | \|SGI411\|/(\|SGI411\| + TP4) | 0.00028 |
| HIF412 | 0.87349 | HIF412/HOI | 0.22317 | SGI412 | 0.00583 | \|SGI412\|/(\|SGI412\| + TP4) | 0.00695 |
| HIF413 | 1.87638 | HIF413/HOI | 0.47940 | SGI413 | −0.17360 | \|SGI413\|/(\|SGI413\| + TP4) | 0.17263 |
| HIF511 | 0.36373 | HIF511/HOI | 0.09293 | SGI511 | 0.015644 | \|SGI511\|/(\|SGI511\| + TP5) | 0.02222 |
| HIF512 | 1.7159 | HIF512/HOI | 0.43840 | SGI512 | −0.446747 | \|SGI512\|/(\|SGI512\| + TP5) | 0.39358 |
| HIF513 | 1.93653 | HIF513/HOI | 0.49477 | SGI513 | −0.638544 | \|SGI513\|/(\|SGI513\| + TP5) | 0.48124 |
| HIF521 | 1.54767 | HIF521/HOI | 0.39542 | SGI521 | −0.792114 | \|SGI521\|/(\|SGI521\| + TP5) | 0.53505 |
| HIF611 | 0.82168 | HIF611/HOI | 0.20993 | SGI611 | −0.060958 | \|SGI611\|/(\|SGI611\| + TP6) | 0.15143 |
| HIF612 | 0.98146 | HIF612/HOI | 0.25076 | SGI612 | −0.07785 | \|SGI612\|/(\|SGI612\| + TP6) | 0.18561 |
| HIF621 | 0.79476 | HIF621/HOI | 0.20306 | SGI621 | 0.238143 | \|SGI621\|/(\|SGI621\| + TP6) | 0.41079 |

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with negative refractive power;
   a second lens with refractive power;
   a third lens with refractive power;
   a fourth lens with refractive power;
   a fifth lens with refractive power;
   a sixth lens with refractive power; and
   an image plane;
   wherein the optical image capturing system comprises six lenses with refractive power, at least one lens of the six lenses is made of glasses, the optical image capturing system has a maximum image height HOI on the image plane, at least one among the second lens to the sixth lens has positive refractive power, focal lengths of the first lens to the sixth lens are f1, f2, f3, f4, f5 and f6 respectively, a focal length of the optical image capturing system is f, an entrance pupil diameter of the optical image capturing system is HEP, a distance on an optical axis from an object-side surface of the first lens to the image plane is HOS, a distance on the optical axis from the object-side surface of the first lens to an image-side surface of the sixth lens is InTL, a half maximum angle, of a view of the optical image capturing system is HAF, an outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10.0, 0 deg<HAF≤150 deg, 0.5≤HOS/f≤30 and 0.9≤2(ARE/HEP)≤2.0.

2. The optical image capturing system of claim 1, wherein a correlation formula as follows is satisfied: 0.5≤HOS/HOI≤15.

3. The optical image capturing system of claim 1, wherein there are air gaps between all of the six lenses.

4. The optical image capturing system of claim 1, wherein the image plane is selectively a plane surface or a curved surface.

5. The optical image capturing system of claim 1, wherein a TV distortion for image formation in the optical image capturing system is TDT, the optical image capturing system has a maximum image height HOI perpendicular to the optical axis on the image plane, a transverse aberration of a longest operation wavelength of a visible light of a positive direction tangential fan of the optical image capturing system passing through an edge of an entrance pupil and striking at a position of 0.7 HOI on the image plane is denoted as PLTA, a transverse aberration of a shortest operation wavelength of the visible light of the positive direction tangential fan of the optical image capturing system passing through the edge of the entrance pupil and striking at the position of 0.7 HOI on the image plane is denoted as PSTA, a transverse aberration of the longest operation wavelength of the visible light of a negative direction tangential fan of the optical image capturing system passing through the edge of the entrance pupil and striking at the position of 0.7 HOI on the image plane is denoted as NLTA, a transverse aberration of the shortest operation wavelength of the visible light of the negative direction tangential fan of the optical image capturing system passing through the edge of the entrance pupil and striking at the position of 0.7 HOI on the image plane is denoted as NSTA, a transverse aberration of the longest operation wavelength of the visible light of a sagittal fan of the optical image capturing system passing through the edge of the entrance pupil and striking at the position of 0.7 HOI on the image plane is denoted as SLTA, a transverse aberration of the shortest operation wavelength of the visible light of the sagittal fan of the optical image capturing system passing through the edge of the entrance pupil and striking at the position of 0.7 HOI on the image plane is denoted as SSTA, and conditions as follows are satisfied: PLTA≤100 μm, PSTA≤100 μm, NLTA≤100 μm, NSTA≤100 μm, SLTA≤100 μm, SSTA≤100 μm and |TDT|<250%.

6. The optical image capturing system of claim 1, wherein a maximum effective half diameter of any surface of any one of the six lenses is denoted as EHD, an outline curve starting from an intersection point of the optical axis and any surface of any one of the six lenses, travelling along an outline of the surface, and ending at a point which defines the maximum effective half diameter, has an outline curve length denoted as ARS, and a condition as follows is satisfied: 0.9≤ARS/EHD≤2.0.

7. The optical image capturing system of claim 1, wherein an outline curve starting from an intersection point of the optical axis and an object-side surface of the sixth lens, travelling along an outline of the surface, and ending at a coordinate point on the surface which has a vertical height of ½ entrance pupil diameter from the optical axis, has an outline curve length denoted as ARE61, an outline curve starting from an intersection point of the optical axis and the image-side surface of the sixth lens, travelling along an outline of the surface, and ending at a coordinate point on the surface which has a vertical height of ½ entrance pupil diameter from the optical axis, has an outline curve length denoted as ARE62, a central thickness of the sixth lens on the optical axis is denoted as TP6, and conditions as follows are satisfied: 0.05≤ARE61/TP63≤5, and 0.05≤ARE62/TP6≤35.

8. The optical image capturing system of claim 1, wherein an outline curve starting from an intersection point of the optical axis and an object-side surface of the fifth lens, travelling along an outline of the surface, and ending at a coordinate point on the surface which has a vertical height of ½ entrance pupil diameter from the optical axis, has an outline curve length denoted as ARE51, an outline curve starting from an intersection point of the optical axis and an image-side surface of the fifth lens, travelling along an outline of the surface, and ending at a coordinate point on the surface which has a vertical height of ½ entrance pupil diameter from the optical axis, has an outline curve length denoted as ARE52, a central thickness of the fifth lens on the optical axis is denoted as TP5, and conditions as follows are satisfied: 0.05≤ARE51/TP5≤35, and 0.05≤ARE52/TP5≤35.

9. The optical image capturing system of claim 1, further comprising an aperture, wherein a distance on the optical axis from the aperture to the image plane is InS, and a condition as follows is satisfied: 0.1≤InS/HOS≤1.1.

10. An optical image capturing system, from an object side to an image side, comprising:
a first lens with negative refractive power;
a second lens with refractive power;
a third lens with refractive power;
a fourth lens with refractive power;
a fifth lens with refractive power;
a sixth lens with refractive power; and
an image plane;
wherein the optical image capturing system comprises six lenses with refractive power, the optical image capturing system has a maximum image height HOI perpendicular to an optical axis on the image plane, at least one lens among the first lens to the sixth lens is made of glasses, at least one lens among the first lens to the sixth lens is made of plastics, at least one lens among the second lens to the sixth lens has positive refractive power, focal lengths of the first lens to the sixth lens are f1, f2, f3, f4, f5 and f6 respectively, a focal length of the optical image capturing system is f, an entrance pupil diameter of the optical image capturing system is HEP, a distance on the optical axis from an object-side surface of the first lens to the image plane is HOS, a distance on the optical axis from the object-side surface of the first lens to an image-side surface of the sixth lens is InTL, a half maximum angle of view of the optical image capturing system is HAF, an outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10.0, 0 deg<HAF≤150 deg, 0.5≤HOS/f≤30 and 0.9≤2(ARE/HEP)≤2.0.

11. The optical image capturing system of claim 10, wherein there are air gaps between all of the six lenses.

12. The optical image capturing system of claim 10, wherein a maximum effective half diameter of any surface of any one of the six lenses is denoted as EHD, an outline curve starting from an intersection point of the optical axis and any surface of any one of the six lenses, travelling along an outline of the surface, and ending at a point which defines the maximum effective half diameter, has an outline curve length denoted as ARS, and a condition as follows is satisfied: 0.9≤ARS/EHD≤2.0.

13. The optical image capturing system of claim 10, wherein the image plane is selectively a plane surface or a curved surface.

14. The optical image capturing system of claim 10, wherein the optical image capturing system has a maximum image height HOI perpendicular to the optical axis on the image plane, a transverse aberration of a longest operation wavelength of a visible light of a positive direction tangential fan of the optical image capturing system passing through an edge of an entrance pupil and striking at a position of 0.7 HOI on the image plane is denoted as PLTA, a transverse aberration of a shortest operation wavelength of the visible light of the positive direction tangential fan of the optical image capturing system passing through the edge of the entrance pupil and striking at the position of 0.7 HOI on the image plane is denoted as PSTA, a transverse aberration of the longest operation wavelength of the visible light of a negative direction tangential fan of the optical image capturing system passing through the edge of the entrance pupil and striking at the position of 0.7 HOI on the image plane is denoted as NLTA, a transverse aberration of the shortest operation wavelength of the visible light of the negative direction tangential fan of the optical image capturing system passing through the edge of the entrance pupil and striking at the position of 0.7 HOI on the image plane is denoted as NSTA, a transverse aberration of the longest operation wavelength of the visible light of a sagittal fan of the optical image capturing system passing through the edge of the entrance pupil and striking at the position of 0.7 HOI on the image plane is denoted as SLTA, a transverse aberration of the shortest operation wavelength of the visible light of the sagittal fan of the optical image capturing system passing through the edge of the entrance pupil and striking at the position of 0.7 HOI on the image plane is denoted as SSTA, and conditions as follows are satisfied: PLTA≤=80 µm, PSTA≤80 µm, NLTA≤80 µm, NSTA≤80 µm, SLTA≤80 µm, SSTA≤80 µm and HOI>1.0 mm.

15. The optical image capturing system of claim 10, wherein a distance between the first lens and the second lens on the optical axis is IN12, and a condition as follows is satisfied: 0≤IN12/f≤5.0.

16. The optical image capturing system of claim 10, wherein a distance between the fifth lens and the sixth lens on the optical axis is IN56, and a condition as follows is satisfied: 0<IN56/f≤3.0.

17. The optical image capturing system of claim 10, wherein a distance between the fifth lens and the sixth lens on the optical axis is IN56, central thicknesses of the fifth lens and the sixth lens on the optical axis are TP5 and TP6 respectively, and a condition as follows is satisfied: 0.1≤(TP6+IN56)/TP5≤50.

18. The optical image capturing system of claim 10, wherein a distance between the first lens and the second lens on the optical axis is IN12, central thicknesses of the first lens and the second lens on the optical axis are TP1 and TP2 respectively, and a condition as follows is satisfied: 0.1≤(TP1+IN12)/TP2≤10.

19. The optical image capturing system of claim 10, wherein at least one lens among the first, second, third, fourth, fifth and sixth lenses of the optical image capturing system is a light filtering element for filtering light with a wavelength less than 500 nm.

20. An optical image capturing system, from an object side to an image side, comprising:
a first lens with negative refractive power;
a second lens with refractive power;
a third lens with refractive power;
a fourth lens with refractive power;
a fifth lens with refractive power;
a sixth lens with refractive power; and
an image plane;
wherein the optical image capturing system comprises six lenses with refractive power, the optical image capturing system has a maximum image height HOI perpendicular to an optical axis on the image plane, at least three lenses among the first lens to the sixth lens are made of glasses, focal lengths of the first lens to sixth lens are f1, f2, f3, f4, f5 and f6 respectively, a focal length of the optical image capturing system is f, at least one lens among the first lens to the sixth lens has at least one inflection point on at least one surface thereof, an entrance pupil diameter of the optical image capturing system is HEP, a half maximum angle of view of the optical image capturing system is HAF, a distance on the optical axis from an object-side surface of the first lens to the image plane is HOS, a distance on the optical axis from the object-side surface of the first lens to an image-side surface of the sixth lens is InTL, an outline curve starting from an intersection point of the optical axis and any surface of any one of the six lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10.0, 0 deg<HAF≤150 deg, 0.5≤HOS/f≤30, 0.5≤HOS/HOI≤15 and 0.9≤2(ARE/HEP)≤2.0.

21. The optical image capturing system of claim 20, wherein there are air gaps between all of the six lenses.

22. The optical image capturing system of claim 20, wherein a maximum effective half diameter of any surface of any one of the six lenses is denoted as EHD, an outline curve starting from an intersection point of the optical axis and any surface of any one of the six lenses, travelling along an outline of the surface, and ending at a point which defines the maximum effective half diameter, has an outline curve length denoted as ARS, and a condition as follows is satisfied: 0.9≤ARS/EHD≤2.0.

23. The optical image capturing system of claim 20, wherein an outline curve starting from an intersection point of the optical axis and an object-side surface of the sixth lens, travelling along an outline of the surface, and ending at a coordinate point on the surface which has a vertical height of ½ entrance pupil diameter from the optical axis, has an outline curve length denoted as ARE61, an outline curve starting from an intersection point of the optical axis and the image-side surface of the sixth lens, travelling along an outline of the surface, and ending at a coordinate point on the surface which has a vertical height of ½ entrance pupil diameter from the optical axis, has an outline curve length denoted as ARE62, a central thickness of the sixth lens on the optical axis is denoted as TP6, and conditions as follows are satisfied: 0.05≤ARE61/TP6≤35, and 0.05≤ARE62/TP6≤35.

24. The optical image capturing system of claim 20, wherein an outline curve starting from an intersection point of the optical axis and an object-side surface of the fifth lens, travelling along an outline of the surface, and ending at a coordinate point on the surface which has a vertical height of ½ entrance pupil diameter from the optical axis, has an outline curve length denoted as ARE51, an outline curve starting from an intersection point of the optical axis and an image-side surface of the fifth lens, travelling along an outline of the surface, and ending at a coordinate point on the surface which has a vertical height of ½ entrance pupil diameter from the optical axis, has an outline curve length denoted as ARE52, a central thickness of the fifth lens on the optical axis is denoted as TP5, and conditions as follows are satisfied: 0.05≤ARE51/TP5≤35, and 0.05≤ARE52/TP5≤35.

25. The optical image capturing system of claim 20, the optical image capturing system further includes an aperture, an image sensing device and a driving module, and the image sensing device is disposed on the image plane, and a distance on the optical axis from the aperture to the image plane is InS, the driving module is able to be coupled with the six lenses and makes them generate movements, and a formula as follows is satisfied: 0.2≤InS/HOS≤1.1.

* * * * *